US012762786B2

(12) United States Patent
Ogura et al.

(10) Patent No.: US 12,762,786 B2
(45) Date of Patent: *Oct. 13, 2026

(54) IMAGE PRODUCTION SYSTEM AND IMAGE PRODUCTION METHOD TO GENERATE AN OUTPUT IMAGE BASED ON A FREE VIEWPOINT IMAGE

(71) Applicant: SONY GROUP CORPORATION, Tokyo (JP)

(72) Inventors: Sho Ogura, Tokyo (JP); Yoshihiro Yoshioka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 163 days.

This patent is subject to a terminal disclaimer.

(21) Appl. No.: 18/713,224

(22) PCT Filed: Nov. 21, 2022

(86) PCT No.: PCT/JP2022/043000

§ 371 (c)(1),
(2) Date: May 24, 2024

(87) PCT Pub. No.: WO2023/100704

PCT Pub. Date: Jun. 8, 2023

(65) Prior Publication Data

US 2025/0022209 A1 Jan. 16, 2025

(30) Foreign Application Priority Data

Dec. 1, 2021 (JP) ................................ 2021-195213

(51) Int. Cl.
*G06T 15/10* (2011.01)
*G06T 17/20* (2006.01)

(52) U.S. Cl.
CPC .............. *G06T 15/10* (2013.01); *G06T 17/20* (2013.01)

(58) Field of Classification Search
CPC ......... G06T 15/10; G06T 17/20; G06T 17/00; G06T 15/20
See application file for complete search history.

(56) References Cited

U.S. PATENT DOCUMENTS 8,073,190 B2 12/2011 Gloudemans
10,778,951 B2 9/2020 Yoshikawa
(Continued)

FOREIGN PATENT DOCUMENTS

JP 2005-122315 A 5/2005
JP 2014-041259 A 3/2014
(Continued)

OTHER PUBLICATIONS

International Search Report and Written Opinion of PCT Application No. PCT/JP2022/043000, issued on Feb. 14, 2023, 10 pages of ISRWO.

*Primary Examiner* — Maurice L. McDowell, Jr.
(74) *Attorney, Agent, or Firm* — CHIP LAW GROUP

(57) ABSTRACT

The present technology relates to an image production system that includes an estimation information generation unit that generates estimation information regarding a subject on the basis of at least one of a captured image or sensor information, a free viewpoint image generation unit, a three-dimensional image generation unit, and an output image generation unit. The free viewpoint image generation unit generates a three-dimensional model of a subject based on a plurality of pieces of captured image data obtained by simultaneously capturing images from a plurality of viewpoints, and generates a free viewpoint image that is an image of arbitrary viewpoint for the subject using the three-dimensional model. The three-dimensional image generation unit generates a three-dimensional image based on the basis of the estimation information and the three-dimensional model of the subject. The output image generation
(Continued)

unit generates an output image on the basis of the free viewpoint image and the three-dimensional image.

15 Claims, 33 Drawing Sheets

(56) References Cited

U.S. PATENT DOCUMENTS

| | | | | |
|---|---|---|---|---|
| 2013/0238288 | A1* | 9/2013 | Rolleston | G06T 19/00 703/1 |
| 2014/0340404 | A1* | 11/2014 | Wang | H04N 13/279 345/427 |
| 2014/0354777 | A1* | 12/2014 | Lee | H04N 13/286 348/46 |
| 2019/0158801 | A1* | 5/2019 | Matsubayashi | G06T 1/00 |
| 2020/0106968 | A1 | 4/2020 | Shuden | |
| 2020/0137371 | A1* | 4/2020 | Adachi | H04N 13/282 |
| 2020/0344456 | A1* | 10/2020 | Hanamoto | H04N 13/275 |
| 2022/0189106 | A1* | 6/2022 | Maeda | H04N 23/90 |
| 2023/0033201 | A1* | 2/2023 | Ogasawara | G06T 15/205 |

FOREIGN PATENT DOCUMENTS

| | | | | | |
|---|---|---|---|---|---|
| JP | 2021-023401 | A | | 2/2021 | |
| WO | 2017/042873 | A1 | | 3/2017 | |
| WO | 2018/030206 | A1 | | 2/2018 | |
| WO | WO-2018227527 | A1 | * | 12/2018 | G01B 11/00 |
| WO | WO-2019021315 | A1 | * | 1/2019 | A61B 5/1118 |
| WO | WO-2020121844 | A1 | * | 6/2020 | H04N 13/111 |
| WO | 2020/166376 | A1 | | 8/2020 | |
| WO | 2020/213426 | A1 | | 10/2020 | |
| WO | 2021/149526 | A1 | | 7/2021 | |

* cited by examiner

[G1] EPTS + LIVE-ACTION FV

[G4]EPTS+CGFV

[G5]EPTS + α

[G6]EPTS + LIVE-ACTION FV

[G7] EPTS + LIVE-ACTION FV

[G8] EPTS + LIVE-ACTION FV

[G10-1] EPTS + CGFV + LIVE-ACTION FV

[G10-2] EPTS + CGFV + LIVE-ACTION FV

IMAGE PRODUCTION SYSTEM AND IMAGE PRODUCTION METHOD TO GENERATE AN OUTPUT IMAGE BASED ON A FREE VIEWPOINT IMAGE

CROSS REFERENCE TO RELATED APPLICATIONS

This application is a U.S. National Phase of International Patent Application No. PCT/JP2022/043000 filed on Nov. 21, 2022, which claims priority benefit of Japanese Patent Application No. JP 2021-195213 filed in the Japan Patent Office on Dec. 1, 2021. Each of the above-referenced applications is hereby incorporated herein by reference in its entirety.

TECHNICAL FIELD

The present technology relates to an image production system, an image production method, and a program, and particularly relates to a technical field using a free viewpoint image and a three-dimensional (3D) image.

BACKGROUND ART

There is known a technique of generating a free viewpoint image (Volumetric Capturing) corresponding to an observation image from an arbitrary viewpoint on a three-dimensional space on the basis of three-dimensional information representing a subject imaged from multi-viewpoints on the three-dimensional space. This is a technique for generating an image of a free viewpoint without a position constraint from multi-viewpoint images. The free viewpoint image is called "Free View", "Volumetric", or the like. The free viewpoint image is useful as, for example, a replay image of sport broadcast.

For example, Patent Document 1 discloses a technique regarding generation of the camerawork that can be regarded as a movement trajectory of a viewpoint.

Furthermore, Patent Document 2 discloses an image processing technique for intelligibly conveying play contents of table tennis.

Moreover, in recent years, regarding play of soccer, basketball, and the like, there is known a technique for estimating the posture and position of a player and a referee, the position/rotation of a ball, and the like from a designated field from an image by a dedicated camera or information by a sensor (an acceleration sensor or a GPS sensor) attached to the player or the ball as electronic performance and tracking systems (EPTS).

A reproduced image of a play based on the EPTS data can also be generated using computer graphics (CG).

CITATION LIST

Patent Document

Patent Document 1: WO 2018/030206 A

Patent Document 2: Japanese Patent Application Laid-Open No. 2021-23401

SUMMARY OF THE INVENTION

Problems to be Solved by the Invention

Although there are such various image processing technologies, for example, it is considered that new image representation is possible by using a live-action image and a CG image in combination.

Therefore, the present disclosure proposes a technology capable of producing more various and high-quality images using a live-action free viewpoint image and a CG image.

Solutions to Problems

An image production system according to the present technology includes: an estimation information generation unit that generates estimation information regarding a subject on the basis of at least one of a captured image or sensor information; a free viewpoint image generation unit that generates a three-dimensional model of the subject on the basis of a plurality of pieces of captured image data obtained by simultaneously capturing images from a plurality of viewpoints, and generates a free viewpoint image that is an image of an arbitrary viewpoint for the subject using the three-dimensional model; a three-dimensional image generation unit capable of generating a three-dimensional image on the basis of the estimation information and the three-dimensional model of the subject; and an output image generation unit that generates an output image on the basis of the free viewpoint image generated by the free viewpoint image generation unit and the three-dimensional image generated by the three-dimensional image generation unit.

The output image is generated on the basis of a free viewpoint image based on live-action imaging and a three-dimensional image using a virtual three-dimensional model. For example, the output image is generated by switching or fusing the free viewpoint image and the three-dimensional image.

MODE FOR CARRYING OUT THE INVENTION

Hereinafter, embodiments will be described in the following order.

<1. Basic Configuration of Image Production System>

<2. Image Production System having EPTS and Volumetric System>

<3. Free Viewpoint Image>

<4. Example of Produced Image>

<5. Example of Image Production Processing>

<6. Selection/Composition of Live-Action Free Viewpoint Image and CG Image>

<7. Summary and Modifications>

Note that in the present disclosure, an “image” includes both a moving image and a still image. Although moving image content production will be mainly described as an example, the image to be produced is not limited to a moving image, and may be a still image or a slide show using a plurality of still images.

Furthermore, the “image” refers to an image actually displayed on a screen, but the “image” in a signal processing process or a transmission path until being displayed on the screen refers to image data.

1. Basic Configuration of Image Production System

Figure 1:
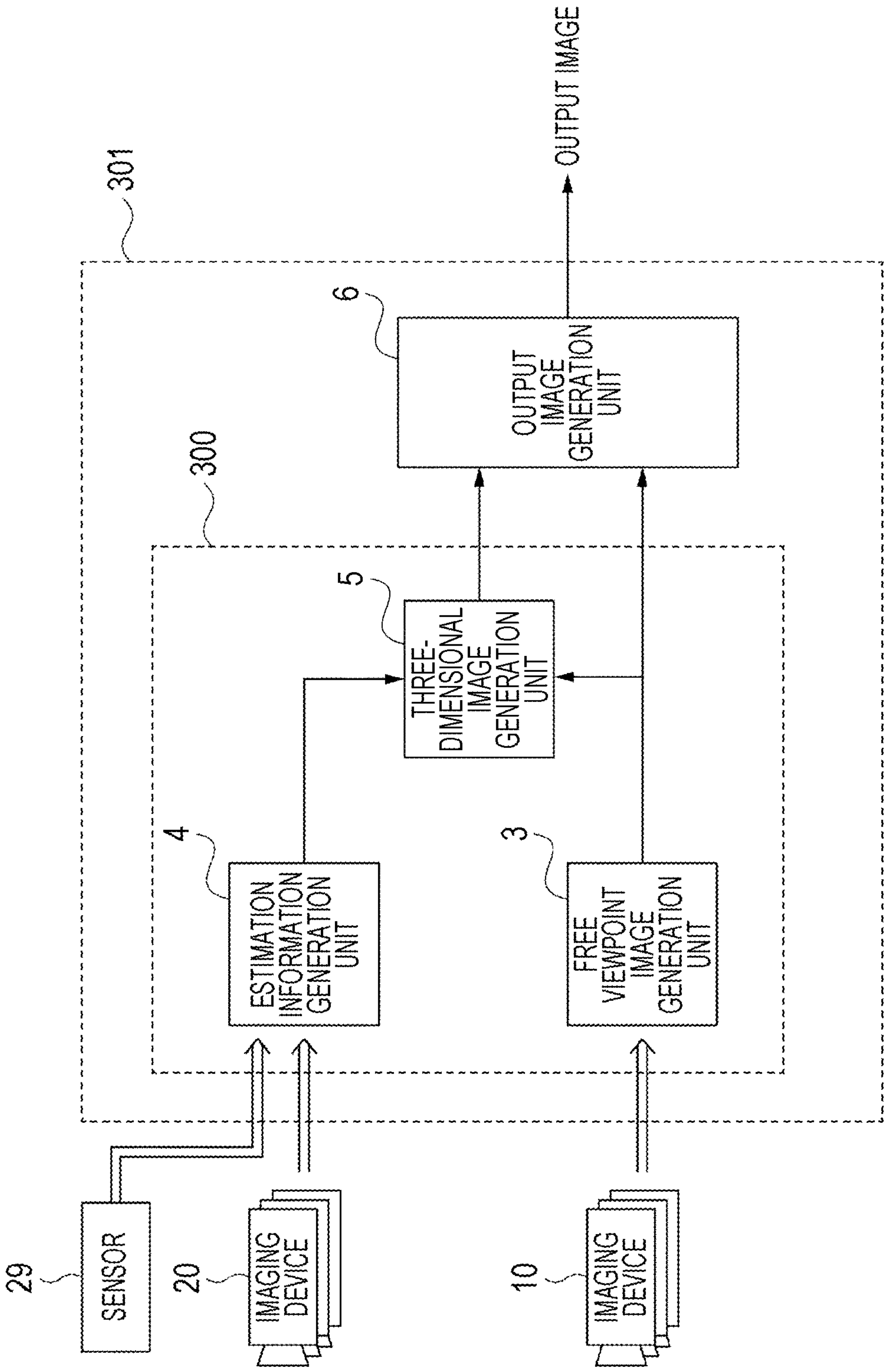
FIG. 1 is a block diagram of an image production system according to an embodiment of the present technology.

FIG. 1 illustrates a configuration example of an image production system 300 (or an image production system 301) according to an embodiment.

The image production system 300 includes a free viewpoint image generation unit 3, an estimation information generation unit 4, and a three-dimensional image generation unit 5.

The free viewpoint image generation unit 3 performs processing of generating a three-dimensional model of a subject on the basis of a plurality of pieces of captured image data obtained by simultaneously capturing images from a plurality of viewpoints, and generating a free viewpoint image that is an image of an arbitrary viewpoint for the subject using the three-dimensional model.

For example, a plurality of imaging devices 10 images an area of a subject in a sports venue or the like, for example, a stadium where a game is being played, from various positions. The free viewpoint image generation unit 3 receives captured images by these imaging devices 10 as an input, and can generate a live-action image including the free viewpoint image.

When such a free viewpoint image is generated, a three-dimensional model of the subject is generated from multi-viewpoint captured images, and an image of an arbitrary viewpoint of the subject is generated using the three-dimensional model. In the present disclosure, a free viewpoint image generated by using a three-dimensional model based on live-action imaging is included in the live-action image in order to be distinguished from a CG image described later.

Therefore, the live-action image referred to in the present disclosure includes a captured image itself by the imaging device 10, an image (clip) in which a free viewpoint image is inserted in a part of a moving image of the captured image, a clip including only a free viewpoint image, or the like. Note that, the “clip” refers to an image of a certain scene created by cutting out from or further processing a recorded image.

The estimation information generation unit 4 generates estimation information regarding the subject on the basis of the captured image. In this case, various types of information are generated from the captured image obtained by an imaging device 20.

The estimation information is, for example, information on the position, posture, and movement of a person (player or the like) or an object (ball or the like) as a subject. For example, EPTS data to be described later corresponds to the estimation information.

For example, a plurality of the imaging devices 20 images a sports venue or the like from various positions. The estimation information generation unit 4 receives captured images by these imaging devices 20 as an input, and can generate the estimation information by performing image analysis processing.

Furthermore, for example, one or more acceleration sensors and/or one or more GPS sensors may be attached to a ball used in sports, a uniform worn by a person performing sports, a shoe or a wristwatch worn by a person, or the like.

The estimation information generation unit 4 receives acceleration information and position information obtained by these sensors 29 as an input, and can generate the estimation information on the basis of these pieces of information.

The three-dimensional image generation unit 5 can generate a three-dimensional image on the basis of the estimation information generated by the estimation information generation unit 4 and the three-dimensional model of the subject.

For example, the three-dimensional image generation unit 5 can create a 3D image of a game by CG by using a virtual three-dimensional (3D) model of a subject (player or the like) created by CG, and by using the position, posture, movement, and the like of each player as estimation information.

Note that the three-dimensional image generation unit 5 can also generate a 3D image using a 3D model based on live-action imaging generated by the free viewpoint image generation unit 3.

Such an image production system 300, which includes the free viewpoint image generation unit 3, the estimation information generation unit 4, and the three-dimensional image generation unit 5 as described above is a system capable of outputting a live-action image including a free viewpoint image and a 3D image. In particular, as the 3D image, a 3D image using a 3D model by CG and a 3D model generated on the basis of live-action imaging can be generated.

In FIG. 1, a configuration in which an output image generation unit 6 is added to the free viewpoint image generation unit 3, the estimation information generation unit 4, and the three-dimensional image generation unit 5 is illustrated as the image production system 301.

The output image generation unit 6 generates an output image on the basis of the free viewpoint image generated by the free viewpoint image generation unit 3 and the three-dimensional image generated by the three-dimensional image generation unit 5.

That is, the image production system 301 is a system that receives, as an input, a live-action image including a free viewpoint image and a 3D image using a 3D model by CG or a 3D model generated on the basis of live-action imaging, and can generate and output an output image by selecting or combining the live-action image or/and the 3D image. For example, the output image is distributed or broadcast as image content.

The output image generation unit 6 integrally handles the live-action image including the free viewpoint image and the 3D image using CG or the 3D model by live-action imaging, so that various images can be distributed as the output image, for example.

2. Image Production System Having EPTS and Volumetric System

Figure 2:
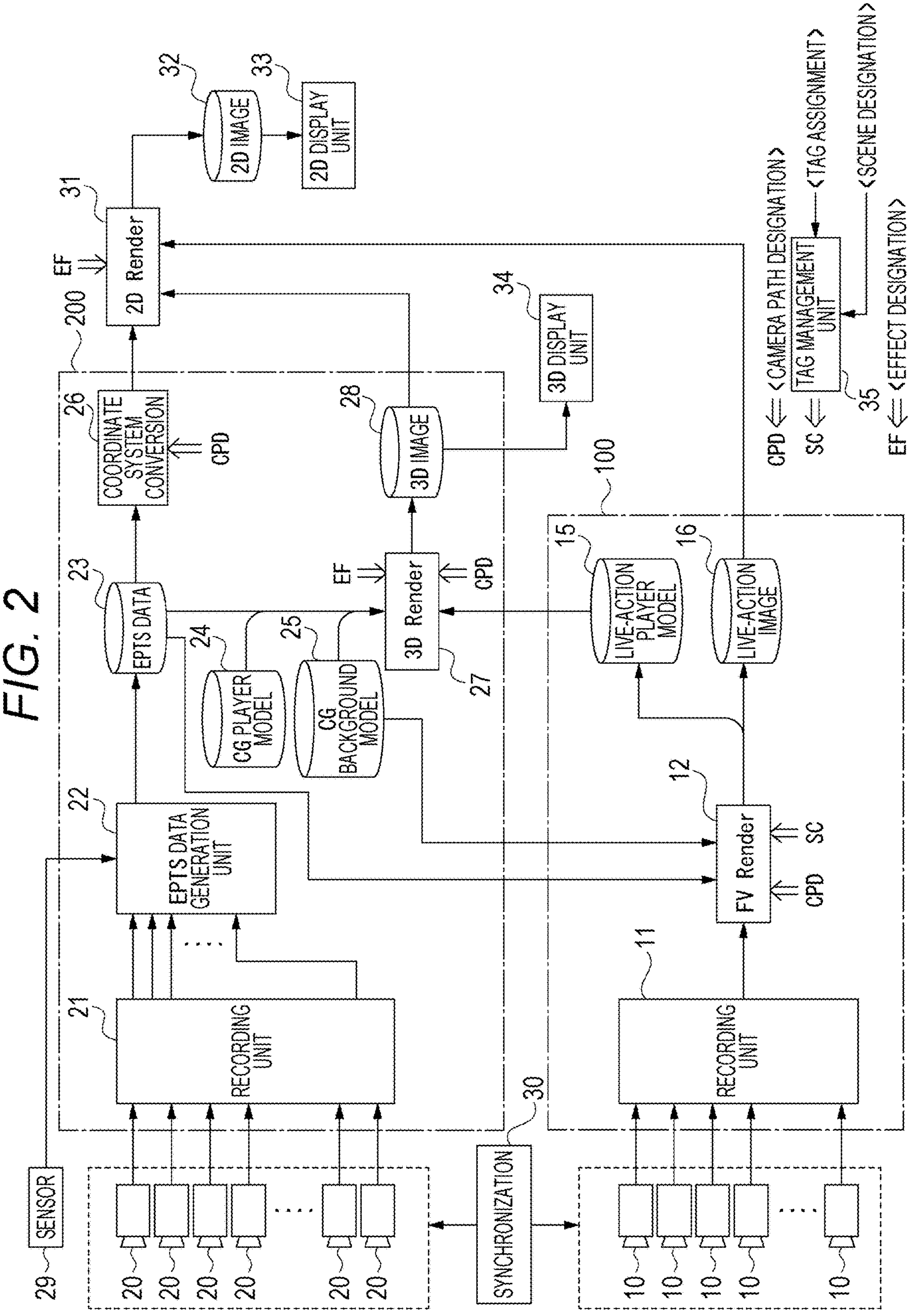
FIG. 2 is a block diagram of an image production system including an EPTS and a volumetric system according to the embodiment.

A more specific configuration example corresponding to the image production system 300 or 301 having the configuration of FIG. 1 will be described with reference to FIG. 2. FIG. 2 is a system configuration example including a volumetric system 100 and an EPTS 200.

The volumetric system 100 corresponds to the free viewpoint image generation unit 3 in FIG. 1. That is, a recording unit 11, an FV render 12, and storages 15 and 16 are specific configuration examples of the free viewpoint image generation unit 3.

The EPTS 200 has the functions of the estimation information generation unit 4 and the three-dimensional image generation unit 5 in FIG. 1. For example, a recording unit 21, an EPTS data generation unit 22, and a storage 23 are specific configuration examples of the estimation information generation unit 4. Furthermore, a 3D render 27 and storages 24, 25, and 28 are specific configuration examples of the three-dimensional image generation unit 5.

Furthermore, FIG. 2 illustrates a 2D render 31, which is an example of the output image generation unit 6 in FIG. 1. However, the present invention is not limited thereto, and the FV render 12 or the 3D render 27 may execute the function as the output image generation unit 6.

The configuration of FIG. 2 will be described. Note that, hereinafter, the term "camera" refers to an imaging device. For example, "camera arrangement" means arrangement of a plurality of imaging devices.

The plurality of imaging devices 10 is configured as, for example, a digital camera device having an imaging element such as a charge coupled devices (CCD) sensor or a complementary metal-oxide-semiconductor (CMOS) sensor, and obtains captured images as digital data. In the present example, each imaging device 10 obtains a captured image as a moving image.

In the present example, each imaging device 10 captures an image of a scene in which a competition such as basketball, soccer, or golf is being held, and each imaging device is arranged in a predetermined direction at a predetermined position in a competition site where the competition is held. The number of the imaging devices 10 is not particularly specified, but the number of the imaging devices 10 is only required to be at least two or more to enable generation of a free viewpoint image. By increasing the number of the imaging devices 10 and imaging a target subject from many angles, the accuracy of 3D model restoration of the subject can be improved, and the image quality of the free viewpoint image can be improved.

Figure 3:
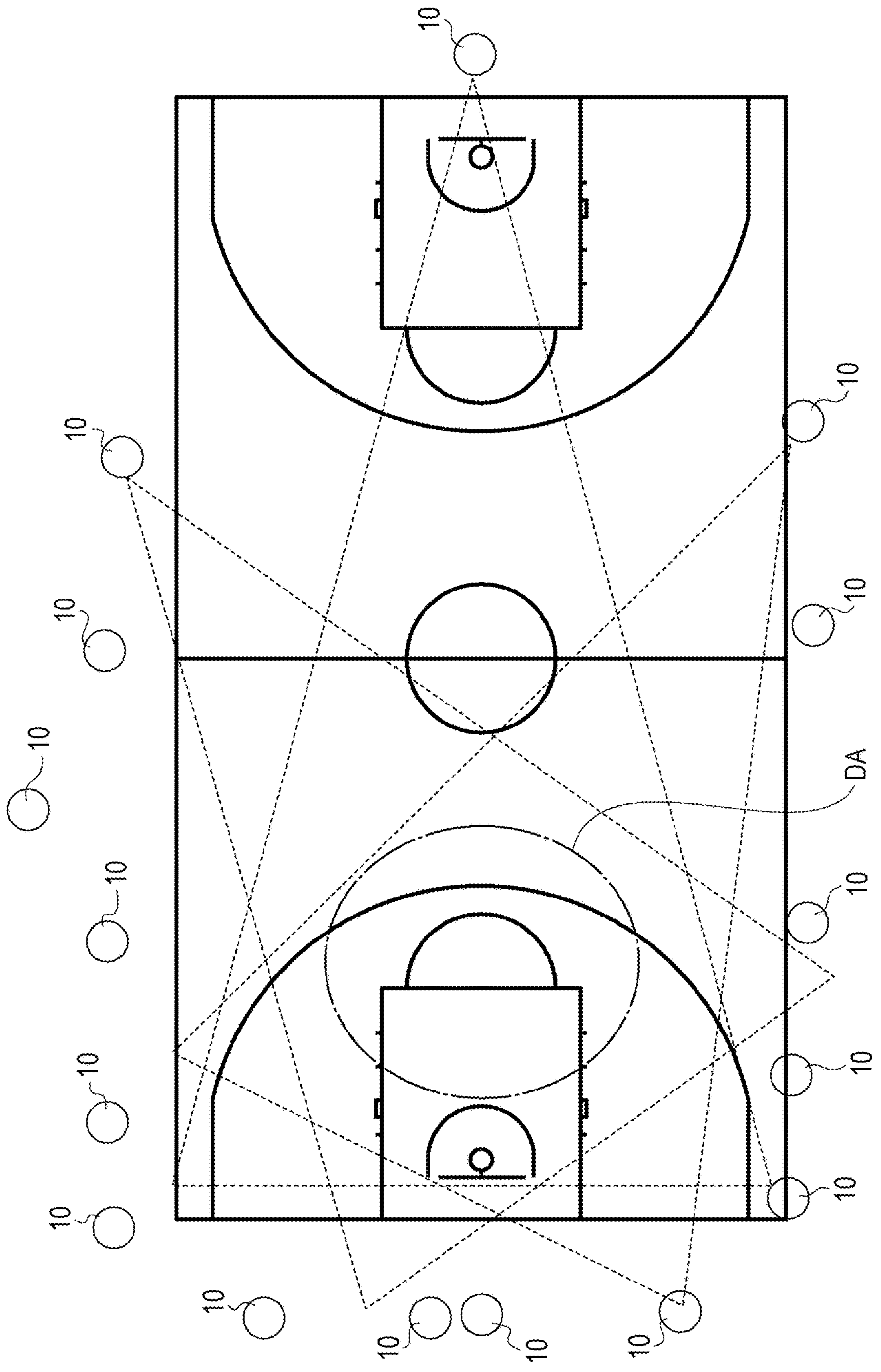
FIG. 3 is an explanatory diagram of an arrangement example of an imaging device according to the embodiment.

FIG. 3 illustrates an arrangement example of the imaging devices 10 around a basketball court. It is assumed that o be the imaging device 10. For example, this is a camera arrangement example in a case where it is desired to mainly image the vicinity of a goal on the left side in the drawing. Needless to say, the arrangement and the number of cameras are examples, and should be set according to the imaging environment, the content or purpose of the image content, and the like.

Furthermore, an event to be a free viewpoint image generation target is not limited to a sports competition such as a basketball competition and includes variety of events.

Furthermore, the plurality of imaging devices 20 is configured as a digital camera device similarly including an imaging element such as a CCD sensor or a CMOS sensor, and obtains captured images as digital data. In the present example, each imaging device 20 obtains a captured image as a moving image and supplies the captured image to the EPTS 200.

The plurality of imaging devices 20 is also arranged at various positions in a basketball court or the like, for example, so that captured images from various viewpoints can be obtained.

Each imaging device 10 and the corresponding imaging device 20 are synchronized by a synchronization unit 30. That is, each imaging device 10 and the corresponding imaging device 20 image each frame at the same timing. This is because the timing relationship between each frame of the image obtained by the volumetric system 100 and the EPTS data obtained by the EPTS 200 is matched.

A configuration of the volumetric system 100 will be described.

The recording unit 11 records each of the captured images by the plurality of imaging devices 10 and supplies a part or all of the captured images to the FV render 12. That is, the recording unit 11 functions as a video server for generating a free viewpoint image.

The FV render 12 performs free viewpoint image generation using the captured image by the imaging device 10 supplied from the recording unit 11. Note that "FV" indicates "Free View", that is, the FV render 12 performs rendering as free viewpoint image generation.

The FV render 12 generates a 3D model of the subject from the multi-viewpoint captured image obtained by each imaging device 10. An image of an arbitrary viewpoint for the subject is generated using this 3D model.

Camera path designation information CPD is input to the FV render 12, for example, in response to designation of a camera path by an operator's operation or automatic control.

Here, the camera path is information including at least information indicating a movement trajectory of a viewpoint in the free viewpoint image. For example, in a case of creating the free viewpoint image in which a position of the viewpoint, a line-of-sight direction, and an angle of view (focal distance) are changed with respect to a subject for which the 3D model has been generated, the camera path information is parameters necessary for defining the movement trajectory of the viewpoint, the changing manner of the line-of-sight direction, and a change mode of the angle of view, and the like.

Furthermore, tag assignment and scene designation may be performed by an operator's operation or automatic control. The tag mentioned here is, for example, information indicating a specific time point (frame) on a moving image, and is information assigned to the timing of a specific scene such as a shot scene in basketball. The operator can perform a tag assignment operation at necessary timing such as start, end, shot, foul, and serve in various sports, for example, and the tag information is managed by the tag management unit 35. For example, a time stamp of tag assignment is stored.

By managing the tag, the tag management unit 35 can set a specific section as a scene using the tag and output the scene designation information SC when the operator designates the scene. For example, the scene designation information SC is information for designating the start timing and the end timing as one scene.

The FV render 12 is configured as an information processing device that actually performs processing of creating a free viewpoint image, for example, a free view (FV) clip to be described later, according to the scene designation information SC and the camera path designation information CPD in the scene.

Details of FV rendering by the FV render 12 will be described later.

The live-action image including the free viewpoint image such as the FV clip generated by the FV render 12 is stored in the storage 16. Note that depth information and camera path information of each subject such as a player and a ball are also stored in the storage 16 in association with the FV clip. The depth information is information on the distance in the depth direction from the imaging device 10, that is, information indicating the anteroposterior relationship of each subject from the viewpoint position (position of the imaging device 10).

Furthermore, the 3D model of live-action imaging generated for generating the free viewpoint image by the FV render 12, particularly, the 3D model based on live-action imaging of a player who is the subject person in this example (referred to as a "live-action player model" for description) is stored in the storage 15.

Note that, in FIG. 2, the storages 15, 16, 23, 24, 25, 28, and 32 are illustrated as storage units of various types of information such as images and 3D models, and these include, for example, a data recording unit such as a solid state drive (SSD) or a hard disk drive (HDD), and a control unit that performs recording/reproducing control of data for the data recording unit.

The EPTS 200 will be described.

The recording unit 21 records each captured image by the plurality of imaging devices 20 and supplies each captured image to the EPTS data generation unit 22.

The EPTS data generation unit 22 performs the analysis processing on each captured image, generates the EPTS data individually, and generates the EPTS data as a whole by integrating all the pieces of individual EPTS data. The EPTS data includes, for example, the position of a player or a ball at each frame timing, the posture of the player or the like, and information of a rotation speed or a rotation direction of the ball.

Furthermore, the EPTS data generation unit 22 may generate the EPTS data by using not only the captured image but also information obtained by the sensor 29, for example, information from an acceleration sensor embedded in a ball or a GPS sensor attached to the uniform of a player.

The EPTS data generation unit 22 can generate, as the EPTS data of the entire game, for example, information that can determine the position and posture of all the players participating in the game at each time point, the position and situation of the ball at each time point, and the like.

The EPTS data generated by the EPTS data generation unit 22 is stored in the storage 23 so as to be referred.

For example, the 3D render 27 can generate images during the game by CG with reference to the EPTS data.

Furthermore, when the FV render 12 performs FV rendering, since the position, posture, and the like at each time point of a player or the like can be more accurately recognized by referring to the EPTS data, a free viewpoint image with higher accuracy can be generated.

The 3D render 27 performs rendering to generate a 3D image by CG using the 3D model.

As the 3D model used by the 3D render 27, a 3D model of each player (referred to as "CG player model" for description) is stored in the storage 24, and a 3D model of the background (referred to as "CG background model" for description) is stored in the storage 25.

The CG player model and the CG background model may be created and stored in the storages 24 and 25 in advance, for example, before a game to be recorded.

By using the CG player model and the CG background model and obtaining information of the position and posture of each player with reference to the EPTS data, the 3D render 27 can generate an image representing a player, a ball, or the like during a game as a 3D image by CG.

For example, a clip as a moving image by CG is generated. Since the clip is generated by CG, it is also possible to generate a clip including a free viewpoint image that is not limited to the arrangement of the imaging device 10.

That is, the 3D render 27 can generate a clip as a game reproduction moving image by a CG image or an FV clip by CG including a free viewpoint video by using the EPTS data.

Note that the 3D render 27 can also generate a 3D image using the live-action player model stored in the storage 15. For example, when a live-action player model for a certain player is generated, the 3D render 27 can switch the image of the player that has been generated using the CG player model to the image generated using the live-action player model.

The 3D images such as clips generated by the 3D render 27 are stored in the storage 28. Furthermore, depth information and camera path information are also stored in association with the clip. The camera path information is information of a virtual viewpoint position when a clip by CG is created.

A 3D display unit 34 in the figure illustrates a display device capable of 3D display. In a case where the 3D display unit 34 is present, the 3D image stored in the storage 28 is supplied to the 3D display unit 34, whereby the 3D video can be displayed.

On the other hand, in a case of considering outputting a 2D image as distribution or broadcasting, the 2D render 31 is provided. The 2D render 31 can receive a live-action image, for example, an FV clip from the storage 16, as an input, and can receive a 3D image, for example, a game reproduction clip by CG or an FV clip by CG from the storage 28, as an input.

Then, the 2D render 31 selects or combines a live-action image including the free viewpoint image or a 3D image input to generate a 2D image for distribution or broadcasting. That is, the processing as the output image generation unit 6 in FIG. 1 is executed.

Furthermore, the 2D render 31 can not only simply select or combine the live-action image and the 3D image, but also combine an additional image or perform an image effect on the basis of the EPTS data.

The 2D render 31 reads the depth information and the camera path information together with the FV clip from the storage 16, and uses the read depth information and camera path information as reference values at the time of image processing for the FV clip.

Furthermore, the 2D render 31 also reads the depth information and the camera path information together with the clip by CG from the storage 28, and uses them as reference values at the time of image processing on the clip by CG.

In order for the 2D render 31 to refer to the EPTS data, the EPTS data stored in the storage 23 is supplied to the 2D render 31 via a coordinate system conversion unit 26.

The coordinate system conversion unit 26 converts the EPTS data, which is information in the 3D space, into values on two-dimensional plane coordinates. The 2D render 31 generates a two-dimensional image, and the two-dimensional image is obtained by dropping a three-dimensional space into a plane viewed from a certain viewpoint position. Therefore, it is necessary to convert the EPTS data indicated in the three-dimensional space into two-dimensional information from a certain viewpoint position. Therefore, the camera path designation information CPD is supplied to the coordinate system conversion unit 26, and coordinate conversion is performed on the basis of the viewpoint position defined by the camera path.

Then, by using the coordinate-converted EPTS data, the 2D render 31 can superimpose an additional image on the position specified by the EPTS data or perform an image effect on the 2D image.

For example, in the present example, the operator can perform an operation of instructing an image effect or composition of additional image composition. In response to this operation, effect designation information EF is input to the 2D render 31. According to the effect designation information EF, the 2D render 31 can perform image effect processing or additional image composition processing on the predetermined position determined by the EPTS data in the 2D image plane.

Note that the effect designation information EF may be supplied to the 3D render 27, and an image effect or an additional image may be combined when the 3D image is generated by the 3D render 27.

As described above, the 2D image generated by the 2D render 31 through processing such as selection and composition of a live-action image and a 3D image, and further composition of an additional image is stored in the storage 32. Then, the image is read from the storage 32, supplied to the 2D display unit 33, and displayed as a 2D image.

Note that such a processing function as described above as the 2D render 31 may be executed in the 3D render 27 or may be executed in the FV render 12.

Figure 4:
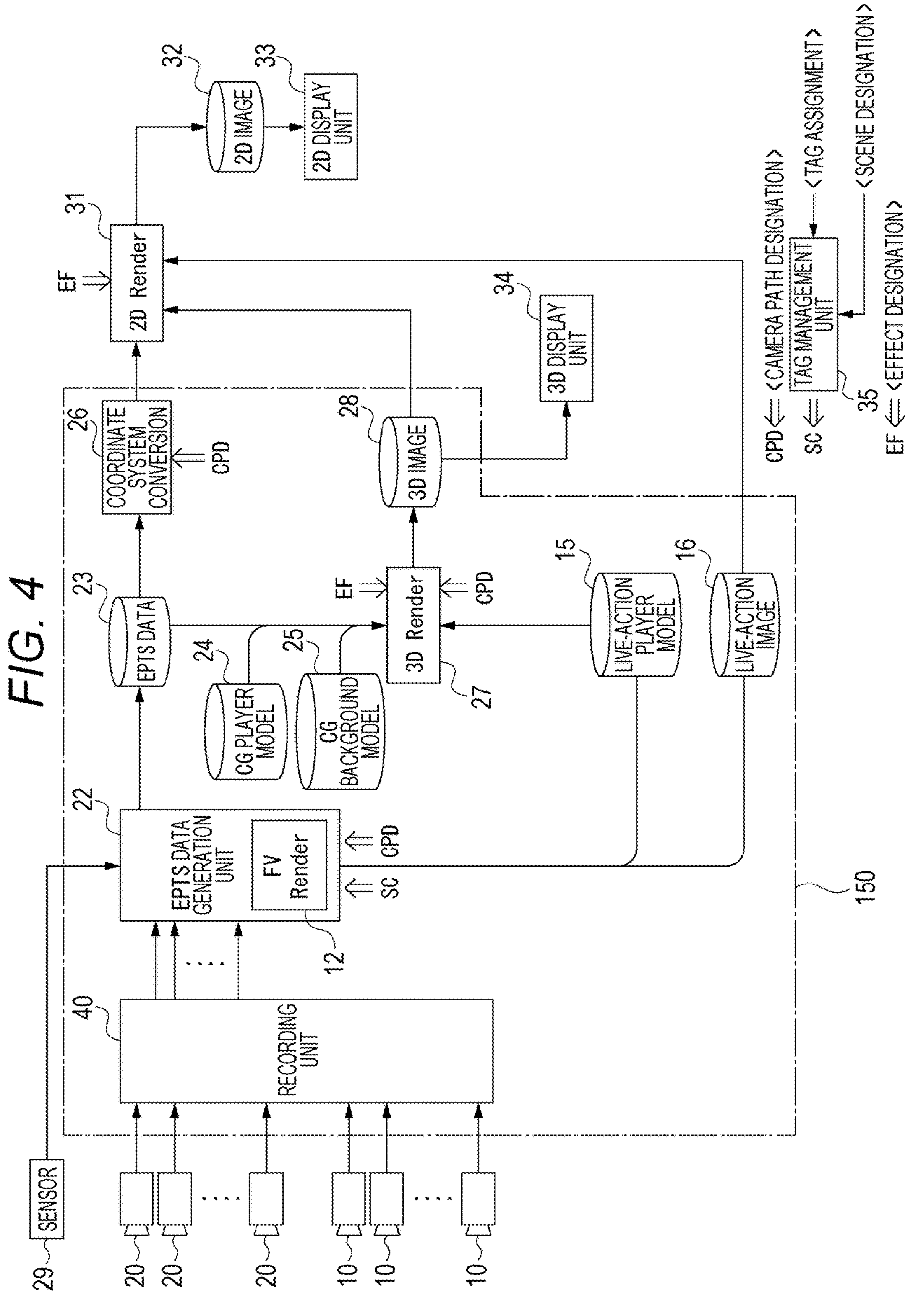
FIG. 4 is a block diagram of another configuration example of the image production system including the EPTS and the volumetric system according to the embodiment.

FIG. 4 is a system example including the EPTS and the volumetric system as in FIG. 2, but is an example including an integrated system 150 in which the EPTS 200 and the volumetric system 100 in FIG. 2 are integrated.

The same portions as those in FIG. 2 are denoted by the same reference numerals, and description thereof will be omitted.

In the example of FIG. 4, captured images by the imaging devices 10 and 20 are recorded by the recording unit 11 and supplied to the EPTS data generation unit 22.

Although an example in which the imaging devices 10 and 20 are distinguished is illustrated in the drawing, the present invention is not limited thereto, and a captured image by one imaging device may be used for both free viewpoint image generation and EPTS data generation.

The EPTS data generation unit 22 performs EPTS data generation processing, and in this case, also has a function as the FV render 12. That is, the information processing device as the EPTS data generation unit 22 in this example also executes processing as the FV render 12.

The EPTS data generated by the EPTS data generation unit 22 is stored in the storage 23 and can be referred to by the 3D render 27.

The live-action image including the free viewpoint image generated by the FV render 12 is stored in the storage 16. Furthermore, the live-action player model generated by the FV render 12 is stored in the storage 15 and can be referred to by the 3D render 27.

Other configurations are similar to those in FIG. 2.

With the configuration of FIG. 4, a hardware configuration more efficient than the configuration of FIG. 2 can be realized.

A configuration of an information processing device 70 used in the above configuration of FIG. 2 or 4 will be described. For example, the FV render 12, the EPTS data generation unit 22, the 3D render 27, the 2D render 31, and the like can be implemented by the information processing device 70 illustrated in FIG. 5 below.

Furthermore, the information processing device 70 can be configured as, for example, a dedicated workstation, a general-purpose personal computer, a mobile terminal device, or the like.

Figure 5:
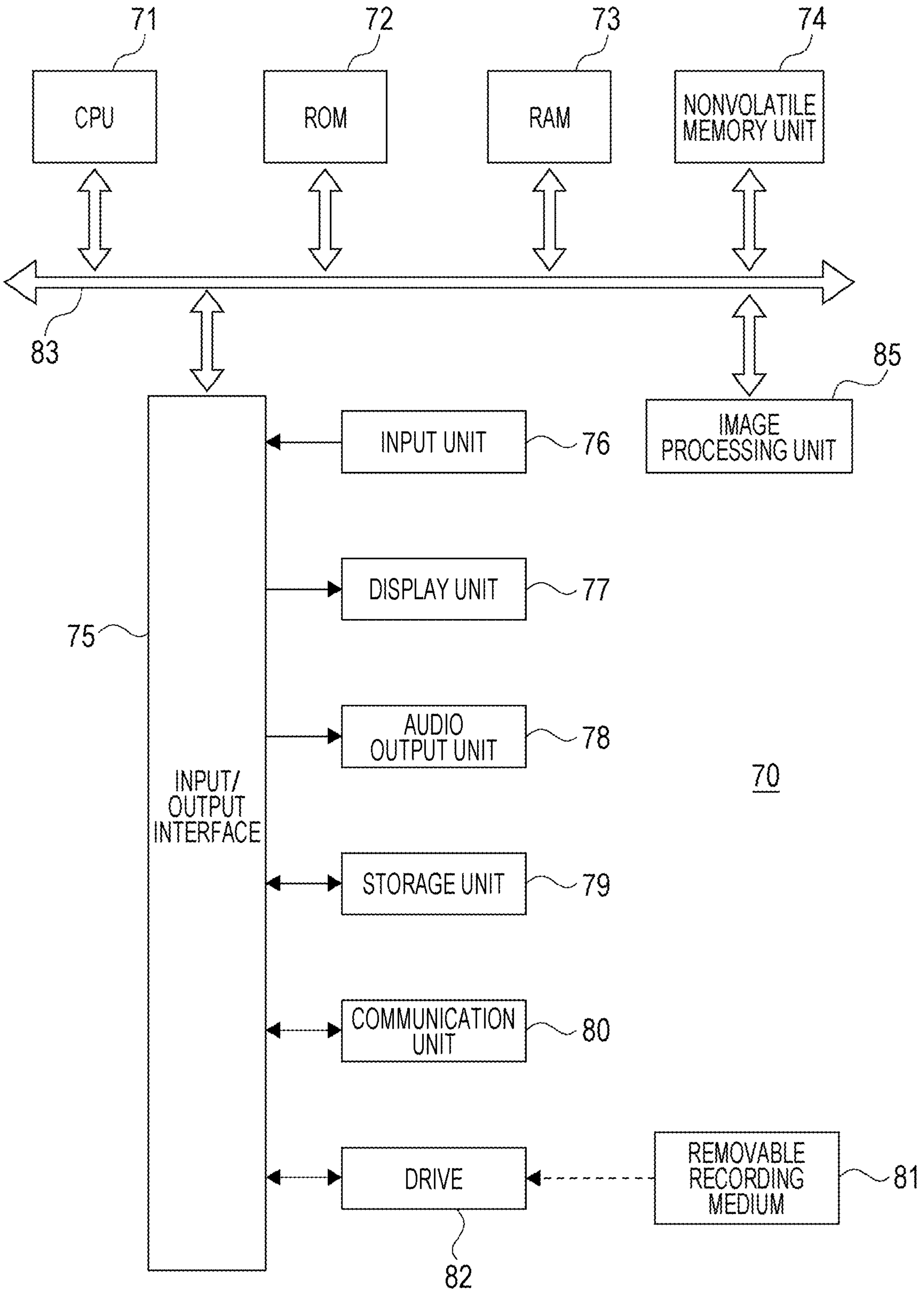
FIG. 5 is a block diagram of an information processing device constituting the image production system according to the embodiment.

A CPU 71 of the information processing device 70 illustrated in FIG. 5 executes various types of processing in accordance with a program stored in a nonvolatile memory unit 74 such as a ROM 72 or, for example, an electrically erasable programmable read-only memory (EEP-ROM), or a program loaded from a storage unit 79 to a RAM 73. The RAM 73 also appropriately stores data and the like necessary for the CPU 71 to execute the various types of processing.

An image processing unit 85 is configured as a processor that performs various types of image processing. For example, the processor is a processor capable of performing any of 3D model generation processing, FV rendering, 3D rendering, 2D rendering, data base (DB) processing, image effect processing, image analysis processing, EPTS data generation processing, and the like.

The image processing unit 85 can be realized by, for example, a CPU that is separate from the CPU 71, a graphics processing unit (GPU), a general-purpose computing on graphics processing units (GPGPU), an artificial intelligence (AI) processor, and the like.

Note that the image processing unit 85 may be provided as a function in the CPU 71.

The CPU 71, the ROM 72, the RAM 73, the nonvolatile memory unit 74, and the image processing unit 85 are connected to one another via a bus 83. An input/output interface 75 is also connected to the bus 83.

An input unit 76 including an operation element and an operation device is connected to the input/output interface 75.

For example, as the input unit 76, various types of operation elements and operation devices such as a keyboard, a mouse, a key, a dial, a touch panel, a touch pad, a remote controller, and the like are assumed.

A user operation is detected by the input unit 76, and a signal corresponding to the input operation is interpreted by the CPU 71.

Furthermore, a display unit 77 including a liquid crystal display (LCD), an organic electro-luminescence (EL) panel, or the like, and an audio output unit 78 including a speaker or the like are integrally or separately connected to the input/output interface 75.

The display unit 77 performs various displays as a user interface. The display unit 77 includes, for example, a display device provided in the housing of the information processing device 70, a separate display device connected to the information processing device 70, or the like.

The display unit 77 executes display of an image for various types of image processing, a moving image to be processed and the like on a display screen on the basis of an instruction of the CPU 71. Furthermore, the display unit 77 displays various types of operation menus, icons, messages and the like, that is, displays as a graphical user interface (GUI) on the basis of an instruction of the CPU 71.

For example, an operator or the like of the image production systems 300 and 301 according to the embodiment can check an image and perform various operations using the display unit 77 and the input unit 76.

There is a case where the storage unit 79 including a hard disk, a solid-state memory and the like, and a communication unit 80 including a modem and the like is connected to the input/output interface 75.

The communication unit 80 executes communication processing via a transmission path such as the Internet or performs wired/wireless communication with various types of devices, and communication using bus communication and the like.

Furthermore, a drive 82 is also connected to the input/output interface 75 as necessary, and a removable recording medium 81 such as a magnetic disk, an optical disk, a magneto-optical disk, or a semiconductor memory is appropriately mounted.

By the drive 82, a data file such as an image file, various computer programs, and the like can be read from the removable recording medium 81. The read data file is stored in the storage unit 79, and images and audio included in the data file are output by the display unit 77 and the audio output unit 78. Furthermore, the computer programs or the like read from the removable recording medium 81 are installed in the storage unit 79, as necessary.

In the information processing device 70, software can be installed through network communication by the communication unit 80 or the removable recording medium 81. Alternatively, the software may be stored in advance in the ROM 72, the storage unit 79 and the like.

Note that the storages 15, 16, 23, 24, 25, 28, and 32 illustrated in FIGS. 2 and 4 may be implemented by the storage unit 79 of the information processing device 70 or may be implemented by a storage device separate from the information processing device 70.

3. Free Viewpoint Image

The free viewpoint image generated by the FV render 12 will be described.

First, the viewpoint of the free viewpoint image will be described with reference to FIGS. 6A and 6B.

Figure 6A:
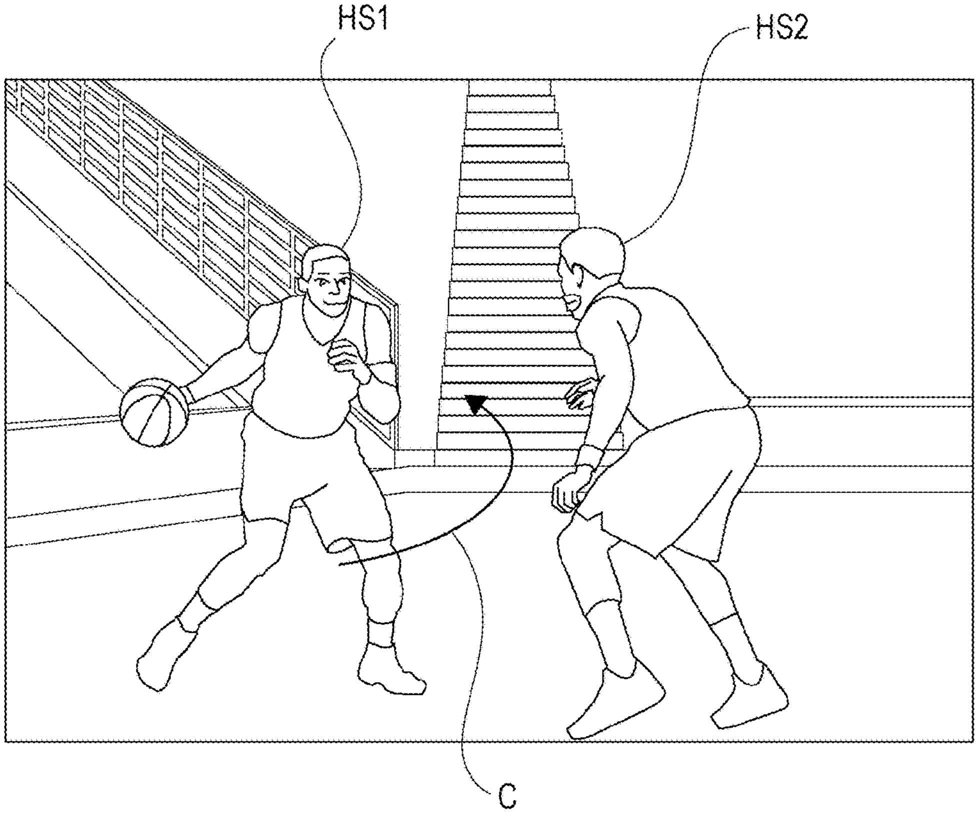
FIGS. 6A and 6B are explanatory diagrams of a viewpoint in a free viewpoint image according to the embodiment.

FIG. 6A illustrates an image diagram of a free viewpoint image capturing a subject from a required viewpoint set in a three-dimensional space. In the free viewpoint image in this case, a subject HS1 is viewed substantially from the front, and a subject HS2 is viewed substantially from the back.

Figure 6B:
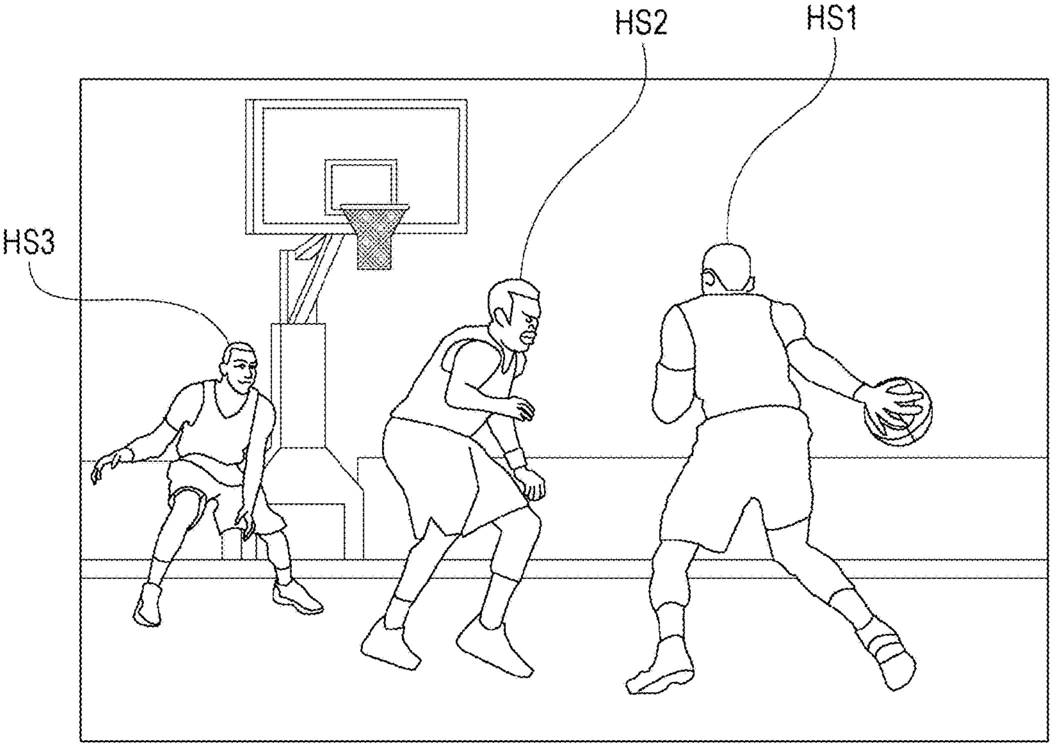

FIG. 6B illustrates an image diagram of a free viewpoint image in a case where the position of the viewpoint is changed in a direction of an arrow C in FIG. 6A and a viewpoint for viewing the subject HS1 substantially from the back is set. In the free viewpoint image in FIG. 6B, the subject HS2 is viewed substantially from the front, and a subject HS3 and a basket goal, which are not viewed in FIG. 6A, are viewed.

For example, an image of about one second to two seconds in which the viewpoint is gradually moved in the direction of the arrow C from the state in FIG. 6A to be the state in FIG. 6B is generated as the free viewpoint image (FV clip). Needless to say, a time length of the FV clip as the free viewpoint image and a trajectory of viewpoint movement can be variously considered.

An output clip including the FV clip as the free viewpoint image will be described.

Figure 7:
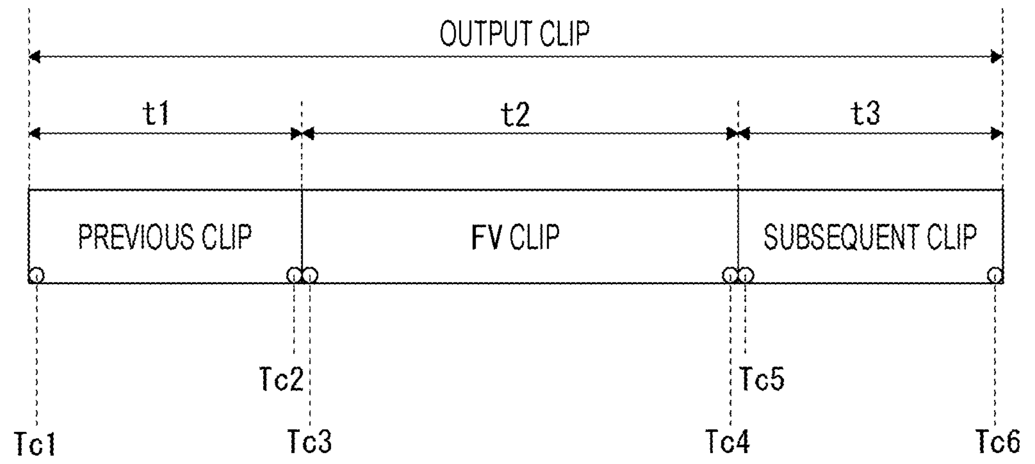
FIG. 7 is an explanatory diagram of an output clip of a free viewpoint image according to the embodiment.

FIG. 7 illustrates a state where the previous clip, the FV clip, and the subsequent clip are combined and configured, as an example of the output clip.

For example, the previous clip is an actual moving image in a section of time codes Tc1 to Tc2 by a certain imaging device 10 among the plurality of imaging devices 10.

Furthermore, the subsequent clip is, for example, an actual moving image in a section of time codes Tc5 to Tc6 in another imaging device 10.

It is normally assumed that the image of the previous clip is image data of the imaging device 10 at the time of the start of the viewpoint movement in the FV clip, and the image of the subsequent clip is image data of the imaging device 10 at the end of the viewpoint movement in the FV clip.

Then, in this example, the previous clip is a moving image having a time length t1, the FV clip is a free viewpoint image having a time length t2, and the subsequent clip is a moving image having a time length t3. A reproduction time length of the entire output clip is t1+t2+t3. For example, the output clip for 5 seconds can have a configuration including a 1.5-second moving image, a two-second free viewpoint image, and a 1.5-second moving image, or the like.

Here, the FV clip is illustrated as a section of a time codes Tc3 to Tc4. However, there is a case where this corresponds or does not correspond to the number of frames of the actual moving image. That is, because the FV clip includes a case where the viewpoint is moved in a state where the time of the moving image is stopped (a case where Tc3=Tc4) and a case where the viewpoint is moved without stopping the time of the moving image (a case where Tc3 #Tc4).

For description, the FV clip in a case where the viewpoint is moved in a state where the time of the moving image is stopped (referred to as "time freeze") is referred to as a "still image FV clip", and the FV clip in a case where the viewpoint is moved without stopping the time of the moving image (referred to as "free run") is referred to as a "moving image FV clip".

Figure 8:
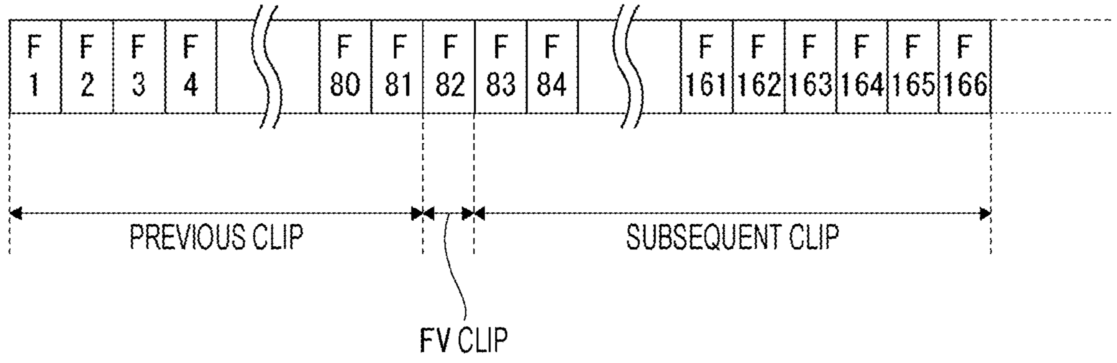
FIG. 8 is an explanatory diagram of an output clip including a still image FV clip of a free viewpoint image according to the embodiment.

FIG. 8 illustrates the still image FV clip with reference to the frames of the moving image. In a case of this example, the time codes Tc1 and Tc2 of the previous clip are respectively time codes of frames F1 and F81, and a time code of the following frame F82 is the time code Tc3 and the time code Tc4 in FIG. 7. Then, the time codes Tc5 and Tc6 of the subsequent clip are time codes of frames F83 and F166.

That is, this is a case of generating a free viewpoint image in which the viewpoint moves with respect to a still image including one frame, which is the frame F82.

Figure 9:
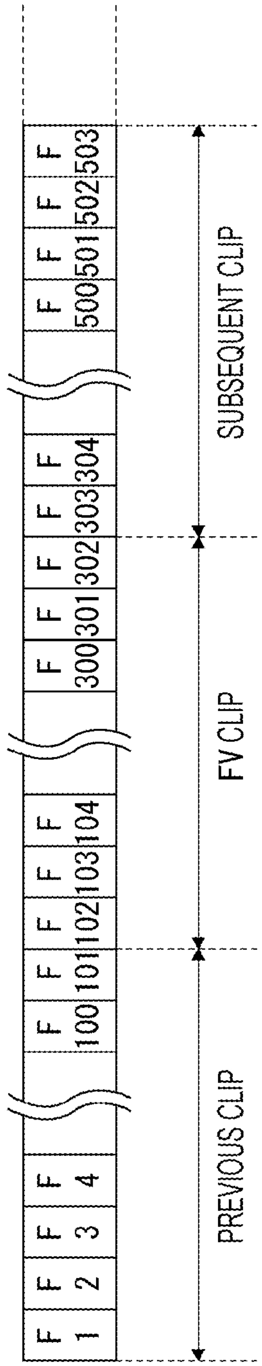
FIG. 9 is an explanatory diagram of an output clip including a moving image FV clip of a free viewpoint image according to the embodiment.

On the other hand, the moving image FV clip is as illustrated in FIG. 9. In a case of this example, the time codes Tc1 and Tc2 of the previous clip are respectively time codes of frames F1 and F101, and time codes of frames F102 and F302 are respectively the time codes Tc3 and Tc4 in FIG. 7. Then, the time codes Tc5 and Tc6 of the subsequent clip are respectively time codes of frames F303 and F503.

That is, this is a case of generating the free viewpoint image in which the viewpoint moves with respect to the moving image in a section of a plurality of frames from the frame F102 to the frame F302.

Figure 10:
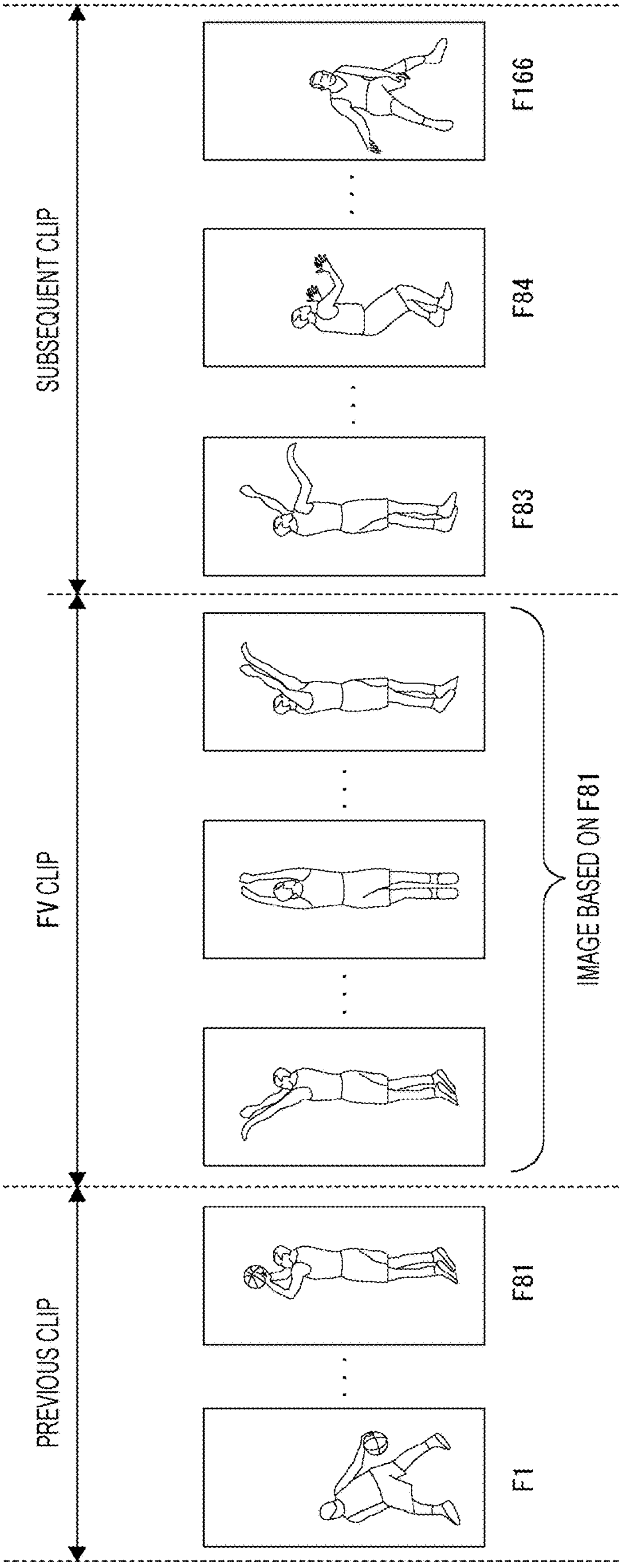
FIG. 10 is an explanatory diagram of an example of an image of an output clip according to the embodiment.

FIG. 10 illustrates an example of image content of the output clip, in the example of the still image FV clip in FIG. 8.

In FIG. 10, the previous clip is an actual moving image from the frame F1 to the frame F81. The FV clip is a virtual image in which a viewpoint is moved in a scene of the frame F82. The subsequent clip is an actual moving image from the frame F83 to the frame F166.

For example, the output clip including the FV clip is generated in this manner and used as an image to be broadcasted.

Free viewpoint image generation processing performed in the FV render 12 will be described with reference to FIG. 11.

For example, the FV render 12 can generate a free viewpoint image by a view dependent player (VDP) method or a view independent player (VIDP) method.

The VDP method is a method for generating a free viewpoint image by pasting a texture image according to a viewpoint, to 3D data generated through visual hull from captured image data of a plurality of viewpoints. In the VDP method, it is necessary to prepare an image for each viewpoint, as the texture image.

The VIDP method is a method for generating a 3D model of a subject as polygon mesh data from captured image data of a plurality of viewpoints and generating a texture image as a UV map texture so as to generate a free viewpoint image by computer graphics (CG) on the basis of the polygon mesh data and the UV map texture. Here, the UV map texture means two-dimensional data obtained by UV developing the 3D model by polygon meshes, which is data indicating color information for each polygon (for example, triangle).

Figure 11:
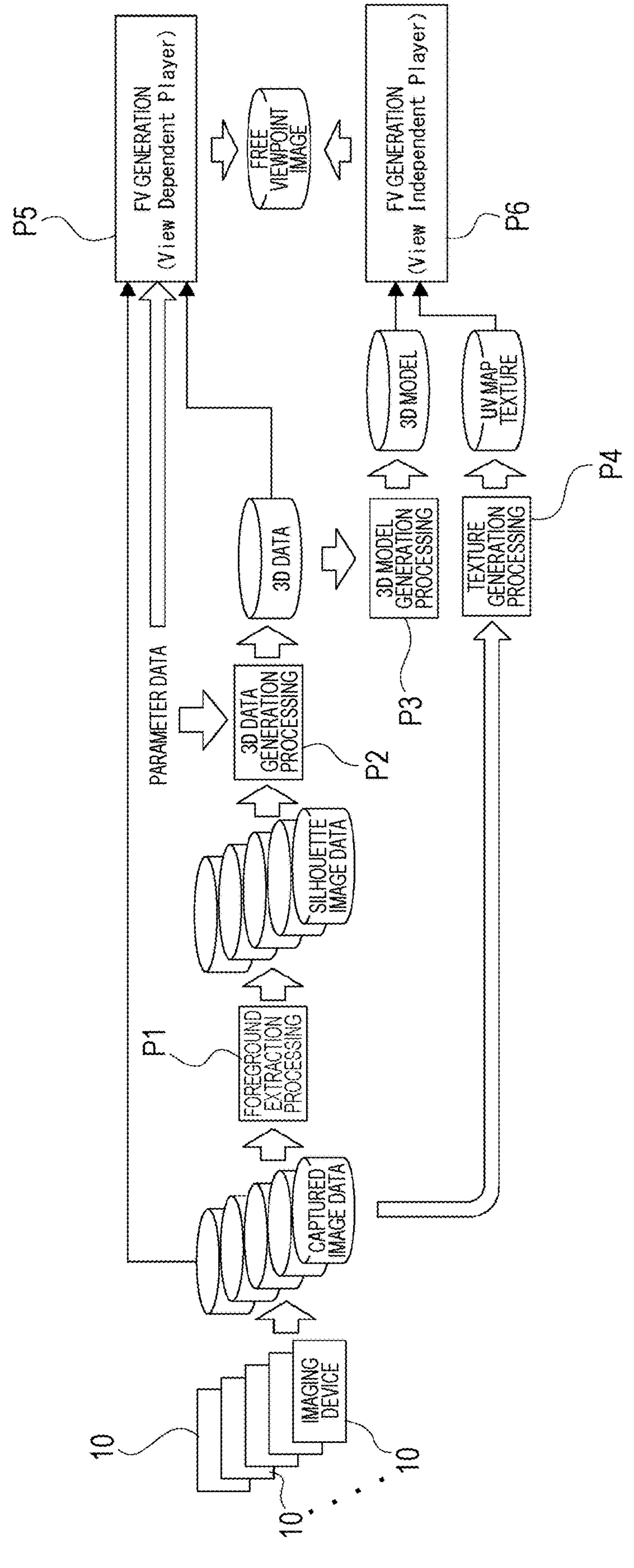
FIG. 11 is an explanatory diagram of free viewpoint image generation processing according to the embodiment.

As illustrated in FIG. 11, the FV render 12 first receives captured image data for each imaging device 10 arranged at each viewpoint as an input.

Here, as the imaging device 10 used to generate the free viewpoint image, there may be an imaging device 10 used to obtain a captured image used to generate 3D data (hereinafter, referred to as "camera for subject sensing") and an imaging device 10 used to obtain a texture image attached to the 3D data when the free viewpoint image is generated (hereinafter, referred to as "camera for texture").

For example, it is considered that some of all the imaging devices 10 used to generate the free viewpoint image are used as the cameras for subject sensing, and the other imaging devices 10 are used as the cameras for texture. Alternatively, the camera for subject sensing and the camera for texture do not necessarily need to be different imaging devices 10, and the single imaging device 10 can be used as both of the camera for subject sensing and the camera for texture. Moreover, all the imaging devices 10 can be used as such dual-use cameras.

When the 3D data is generated, foreground extraction processing P1 is executed and silhouette image data is generated, by using captured image data obtained by each imaging device 10 as the camera for subject sensing (hereinafter, referred to as "captured image data for sensing").

Figure 12:
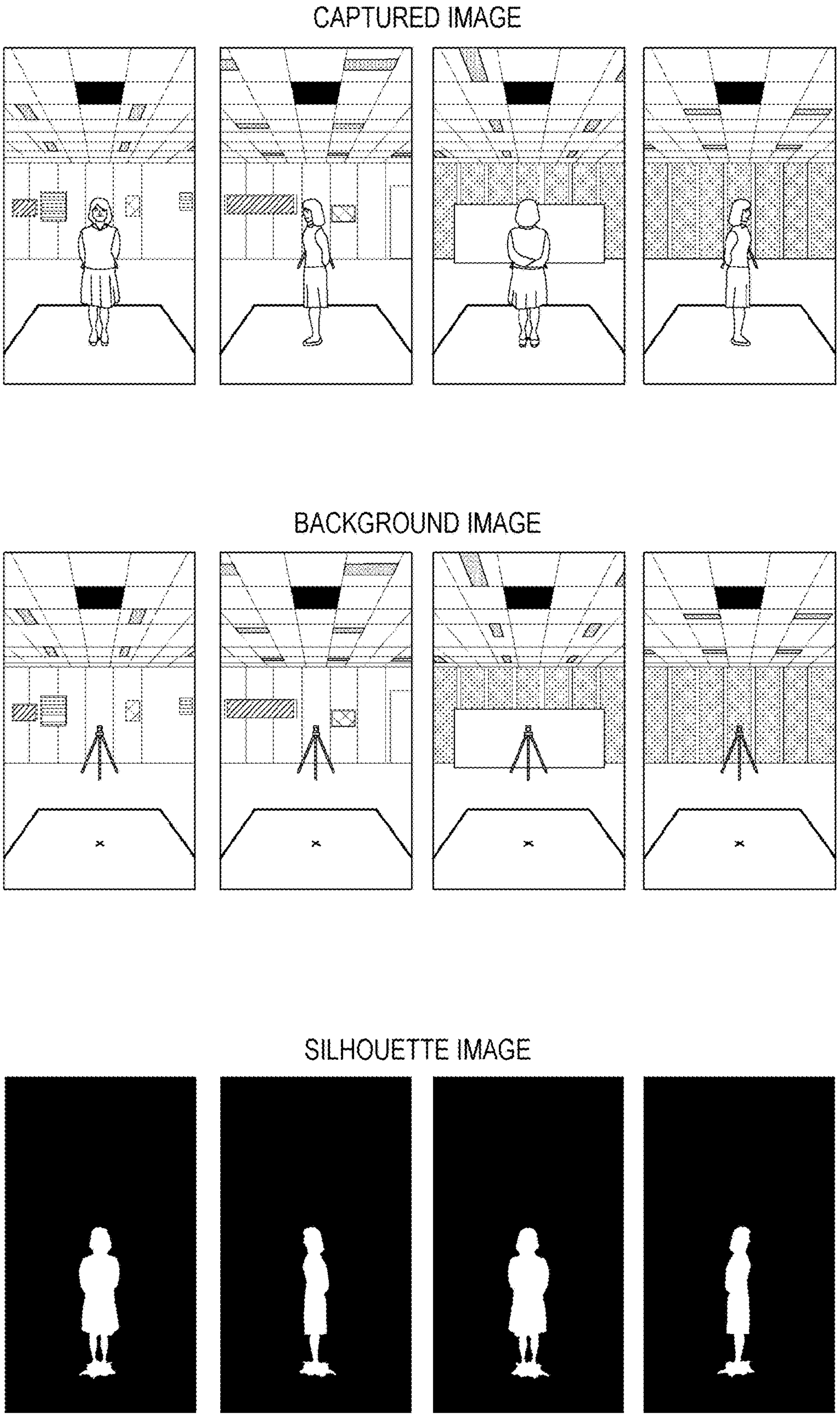
FIG. 12 is an explanatory diagram of 3D model generation by live-action imaging according to the embodiment.

FIG. 12 is an explanatory diagram about the silhouette image data.

In the foreground extraction processing P1 in FIG. 11, a background image as exemplified in the middle part of FIG. 12 is generated for each camera for subject sensing, on the basis of the captured image data for sensing as exemplified in the upper part of FIG. 12. When the free viewpoint image is generated, since a target subject is, for example, a moving subject such as a player, the background image can be generated, for example, by extracting a difference between frames, or the like. By obtaining the difference between this background image and the captured image data for sensing, a foreground image in which an image portion of the target subject is extracted can be obtained for each camera for subject sensing.

Then, regarding these foreground images, for example, by generating image data in which an image area of the subject is set to "1" and the other area is set to "0", silhouette image data indicating a silhouette of the subject, as exemplified in the lower part of FIG. 12 can be obtained for each viewpoint of the camera for subject sensing.

In FIG. 11, in 3D data generation processing P2, 3D data of the subject is generated by the visual hull, using the silhouette image data for each viewpoint and parameter data of each camera. The parameter data is data including an external parameter and an internal parameter of the camera (camera for subject sensing) and information of a focal distance.

Figure 13:
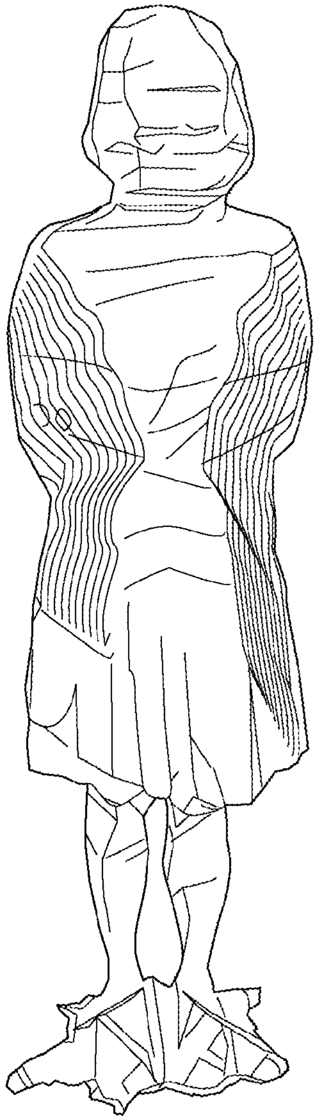
FIG. 13 is an explanatory diagram of a 3D model by live-action imaging according to the embodiment.

FIG. 13 illustrates an image diagram of the 3D data corresponding to the subject illustrated in FIG. 12. The 3D data can be rephrased as data indicating an area of the subject in the three-dimensional space.

Here, the 3D data is not individually generated for each target subject, for example, each player or the like. In a case where a plurality of target subjects is captured in the field of view of the camera and the silhouette image data is data indicating silhouettes of the plurality of subjects, a single piece of 3D data indicating a three-dimensional image of the plurality of subjects is generated, according to the silhouette image data.

In FIG. 11, the 3D data is used for free viewpoint image generation by the VDP method as FV generation processing P5.

Specifically, the FV generation processing P5 generates the free viewpoint image by the VDP method on the basis of the 3D data, the captured image data of the camera for texture, and the parameter data of the camera for texture.

Furthermore, the 3D data is used to generate a 3D model that enables to generate the free viewpoint image by the VIDP method described above.

Specifically, according to 3D model generation processing P3 in the drawing, polygon mesh data as the 3D model of the subject is generated from the 3D data. In the present example, the polygon mesh data is generated for each subject.

Figure 14:
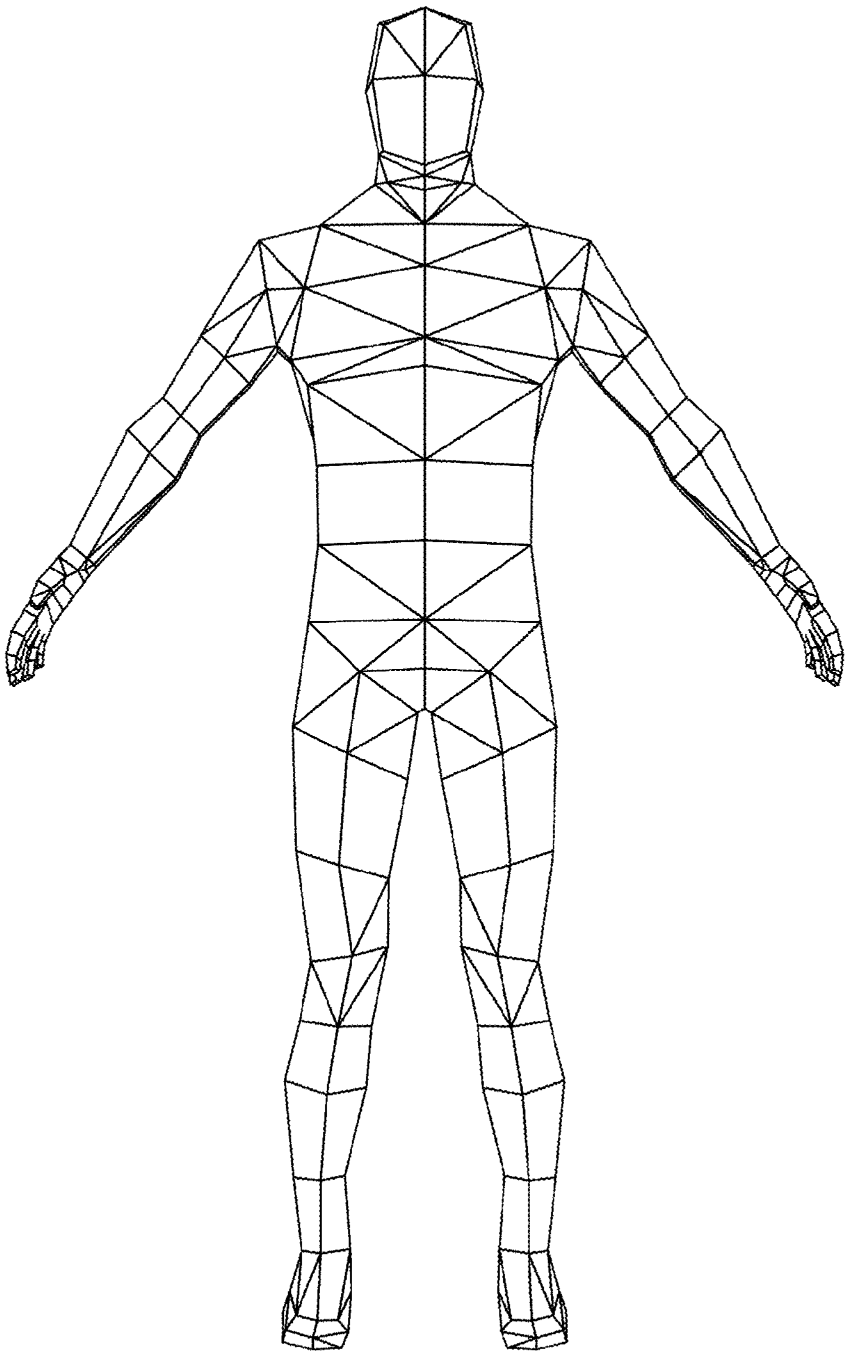
FIG. 14 is an explanatory diagram of a 3D model by live-action imaging according to the embodiment.

For reference, FIG. 14 illustrates an image diagram of polygon mesh data for a certain subject.

Furthermore, the UV map texture described above is used to generate the free viewpoint image by the VIDP method. The UV map texture is generated on the basis of the captured image data of the camera for texture, according to texture generation processing P4 illustrated in FIG. 11.

In the texture generation processing P4 in the present example, the UV map texture is generated for each subject, in response to the 3D model generation processing P3 generating polygon mesh data for each subject.

FV generation processing P6 generates the free viewpoint image by the VIDP method, on the basis of the 3D model of the subject obtained by the 3D model generation processing P3 (polygon mesh data) and the UV map texture obtained by the texture generation processing P4.

Here, since the VDP method is a method for pasting a texture image prepared for each viewpoint, the VDP method has an advantage such that degradation in the image quality of a free viewpoint image can be suppressed even in a case where 3D data to be pasted is coarse.

On the other hand, while the VIDP method has an advantage such that it is no need to prepare the texture image for each viewpoint, in a case where a polygon mesh is coarse, the coarse polygon mesh is reflected in the image quality of the free viewpoint image.

4. Example of Produced Image

Next, an example of an image produced by the image production system according to the embodiment will be described. Hereinafter, examples of images G1 to G10 will be described. Note that, in the description of each of the images G1 to G10 (FIGS. 15 to 23), an image including an FV clip that is a free viewpoint image based on live-action imaging generated by the FV render 12 will be described as "live-action FV", and an image including an FV clip that is a free viewpoint image by CG generated by the 3D render 27 will be described as "CGFV", and examples using these "live-action FV" and "CGFV" will be described. However, each image having the features described in the images G1 to G10 does not necessarily include the free viewpoint image. That is, there is also a case where normal live-action imaging can be applied instead of the "live-action FV".

Furthermore, the "live-action FV" described below may be a clip including only an FV clip, or may be an output clip including the previous clip, the live-action FV, and the subsequent clip as illustrated in FIG. 7. That is, the "live-action FV" may be regarded as a clip including the FV clip.

Furthermore, a 3D image by CG does not need an actual imaging device in the first place, and the camera viewpoint is a virtual position. Therefore, it can be said that all CG clips reproduced using the EPTS data are free viewpoint images. Therefore, whether it is a clip whose viewpoint position is changed in the middle of a moving image like the FV clip described above or a clip of a moving image whose viewpoint is fixed, the image generated in the 3D render 27 may be considered to be included in "CGFV".

Figure 15:
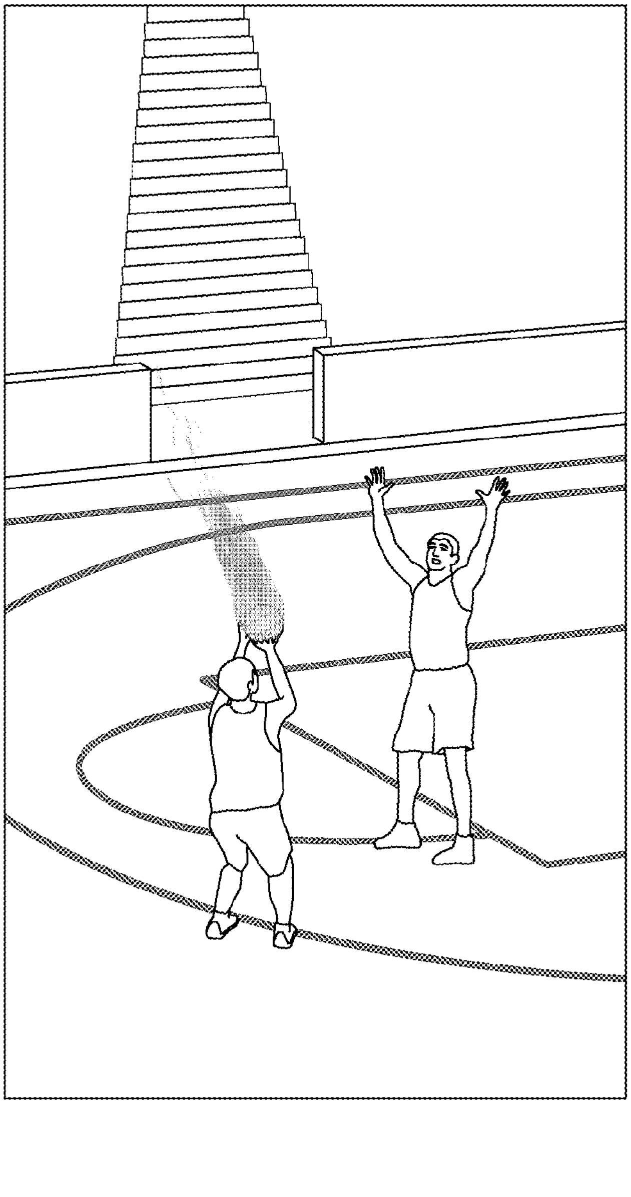
FIG. 15 is an explanatory diagram of an example of an image generated in the embodiment.

The image G1 in FIG. 15 is an example of an image using the EPTS data and the live-action FV, and is an example of generating an image obtained by adding an image effect based on the EPTS data to the live-action FV generated by the FV render 12.

For example, the 2D render 31 receives a live-action FV of a predetermined scene from the storage 16 as an input, and applies an image effect. In this case, the 2D render 31 determines the position and trajectory of the ball from the EPTS data, and performs processing of combining the image of flame on the position and trajectory, thereby obtaining an image in which the shooting ball raises the flame.

Note that the position information in the three-dimensional space based on the EPTS data is converted into the position information in the two-dimensional plane from the viewpoint corresponding to the camera path of the scene by the coordinate system conversion unit 26, whereby the 2D render 31 can appropriately combine the effect image in accordance with the position and trajectory of the ball.

Figure 16:
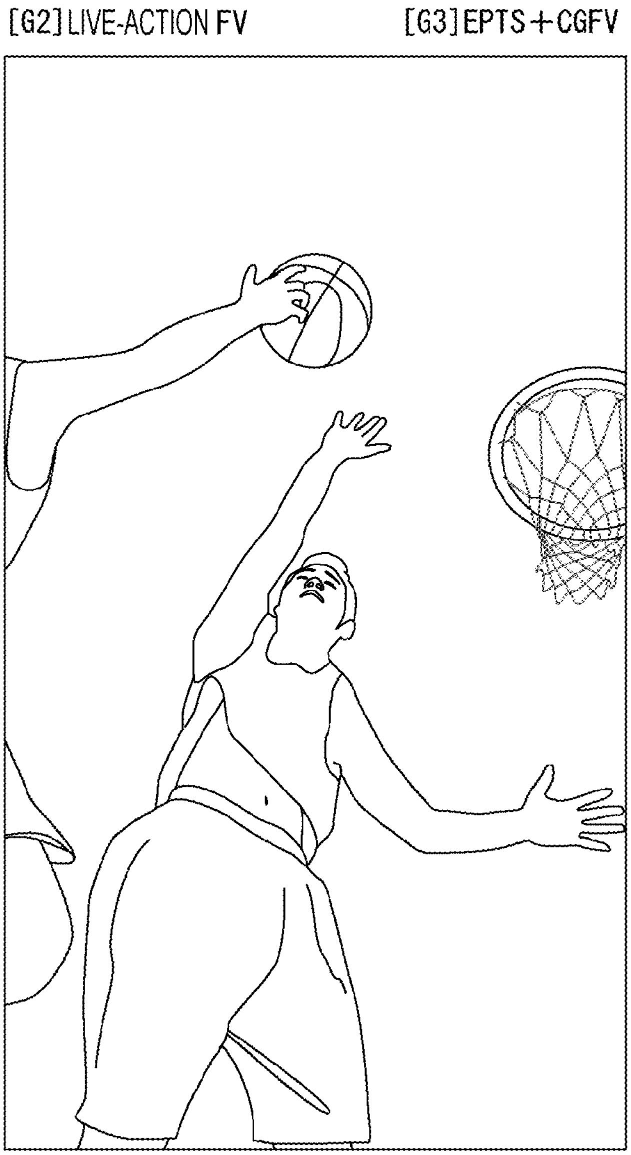
FIG. 16 is an explanatory diagram of an example of an image generated in the embodiment.

An image G2 in FIG. 16 is an example of an image using the live-action FV, and illustrates an image from an angle that is impossible in a normal camera arrangement.

The image G2 is an image, by a free viewpoint image, from a low angle in a court that cannot be captured. The 2D render 31 can output the image G2 by receiving the live-action FV by the camera path including such a viewpoint position from the storage 16 as an input.

Similarly, the image as illustrated in FIG. 16 can also be realized as an image using the EPTS data and the CGFV as an image G3. That is, this is an example of generating an image in a state where the image is viewed from a viewpoint position where the imaging device 10 is not arranged using the EPTS data.

The 3D render 27, as the CGFV, can generate an image from a low angle in the court that cannot be normally captured and the like similarly to the live-action FV by the CG image of the player or the like and the EPTS data. Therefore, the 2D render 31 can read such 3D images from the storage 28, perform 2D rendering, and output the 3D images as 2D images.

Figure 17:
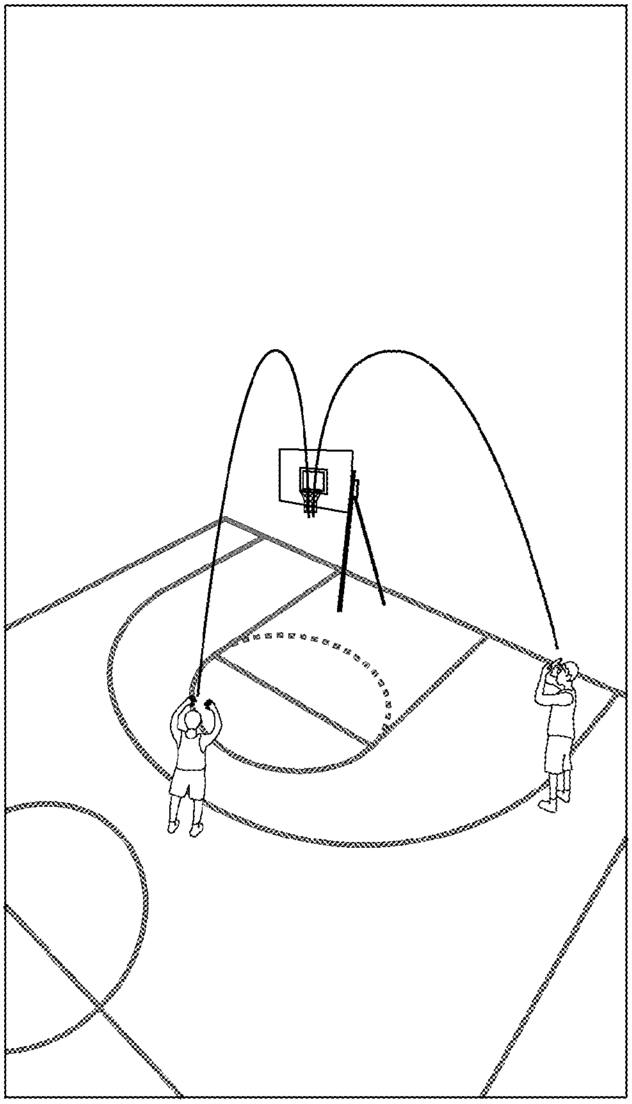
FIG. 17 is an explanatory diagram of an example of an image generated in the embodiment.

An image G4 in FIG. 17 is an example in which the EPTS data and the CGFV are used. This is an example of generating an image obtained by combining 3D images at a plurality of time points on the basis of the EPTS data.

For example, FIG. 17 illustrates an image in which shot locations and ball trajectories of all three-point shots in one basketball game are represented by afterimages.

For example, the 2D render 31 can generate a 2D image as illustrated by reading the CGFV of the scene of each three-point shot from the storage 16, combining the CGFV, and applying image processing such as by determining the trajectory of the ball from the EPTS data.

Figure 18:
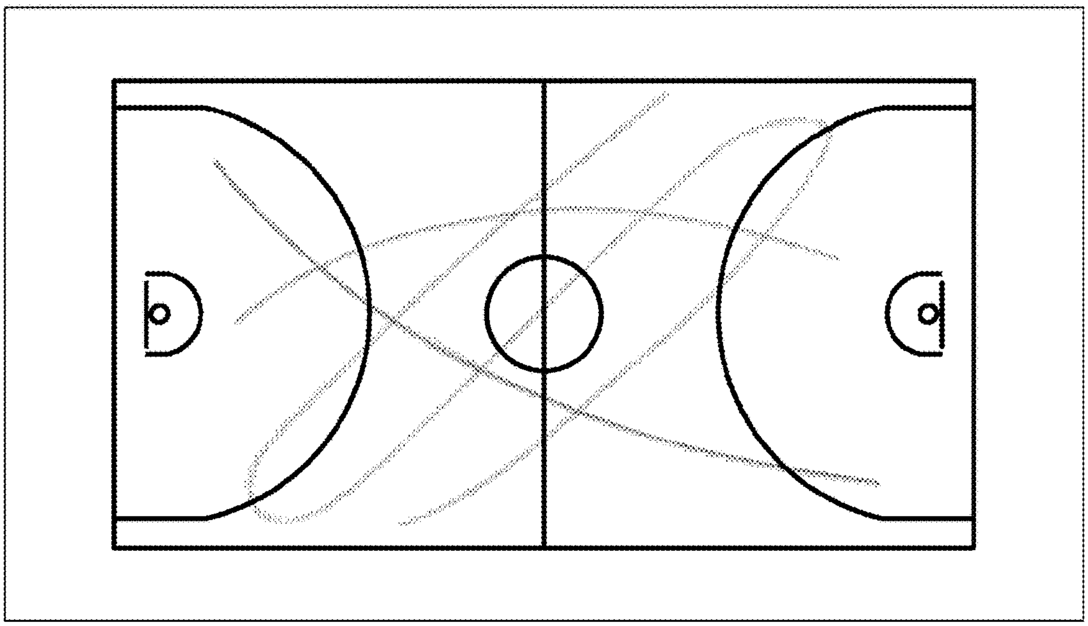
FIG. 18 is an explanatory diagram of an example of an image generated in the embodiment.

An image G5 in FIG. 18 is an example of an image generated by image processing using the EPTS data. That is, FIG. 18 is an example in which an image that presents a flow line of a subject is generated on the basis of the EPTS data within a predetermined period.

For example, this is an image in which, in a bird's eye angle from above a basketball court, a trajectory of a ball during a predetermined period such as during a game or during focused play is represented as a graphic image.

For example, the 2D render 31 or the 3D render 27 can generate such an image using the EPTS data.

Figure 19:
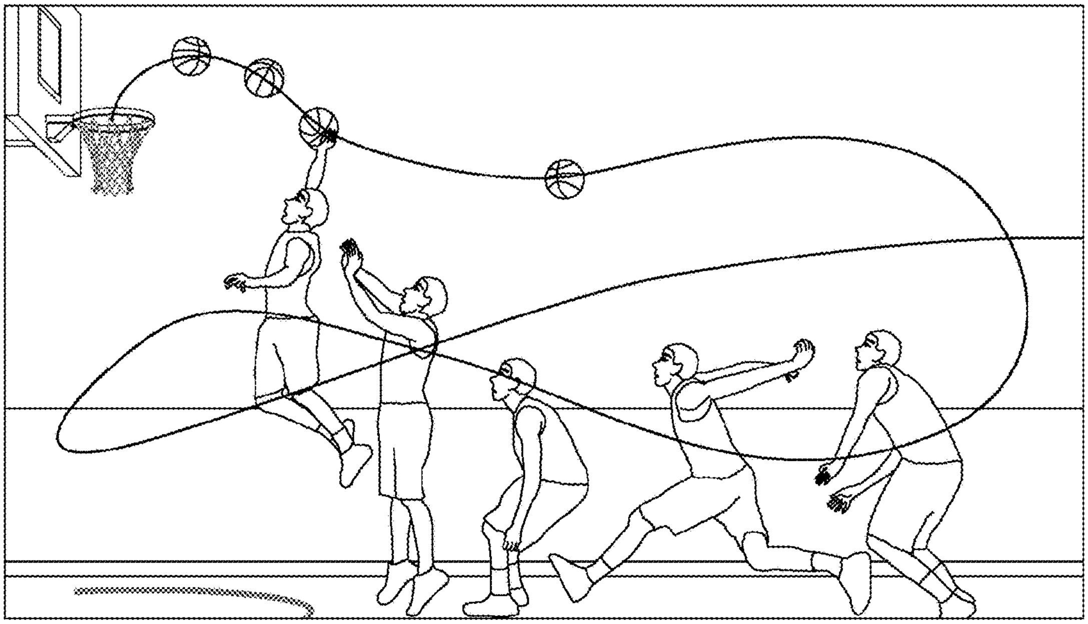
FIG. 19 is an explanatory diagram of an example of an image generated in the embodiment.
Figure 20:
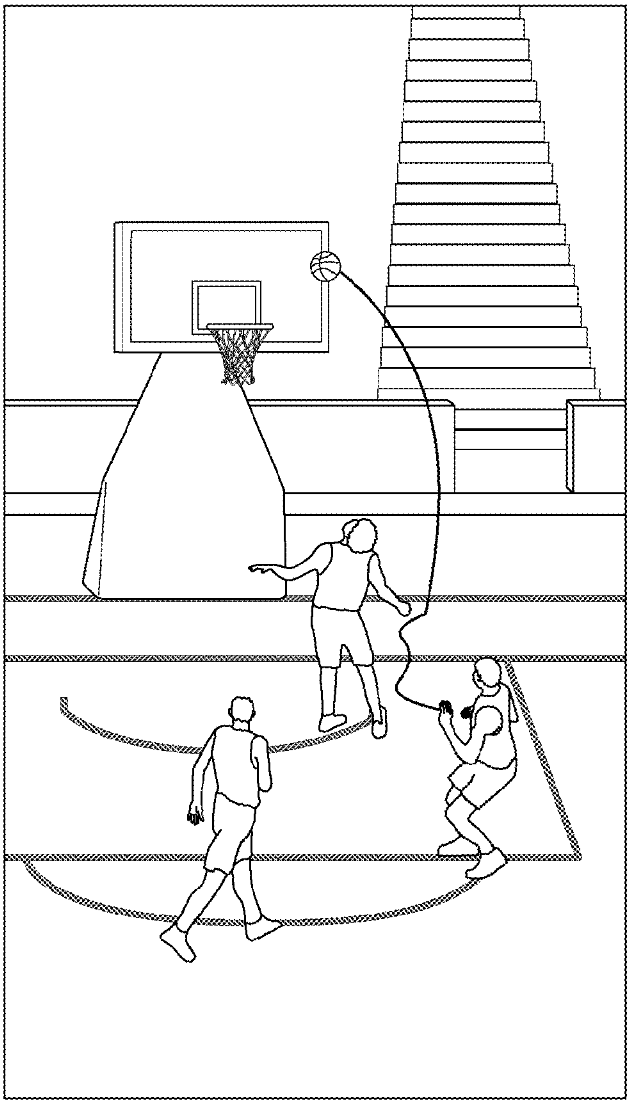
FIG. 20 is an explanatory diagram of an example of an image generated in the embodiment.

An image G6 in FIG. 19 and an image G7 in FIG. 20 are examples of images using the EPTS data and the live-action FV, and are examples of generating an image in which an image presenting a flow line of the subject based on the EPTS data is combined with the live-action FV generated by the FV render 12.

The image G6 in FIG. 19 graphically represents the trajectory including the lateral movement and the height direction of the ball from the viewpoint right beside the player.

The image G7 in FIG. 20 graphically represents the trajectory in the height direction of the ball from the viewpoint of the rear of the player, for example, as a representation on a vertically long screen.

These images G6 and G7 can be generated, for example, by the 2D render 31 reading necessary live-action FV from the storage 16 and performing drawing processing of the ball trajectory on the basis of the EPTS data.

Figure 21:
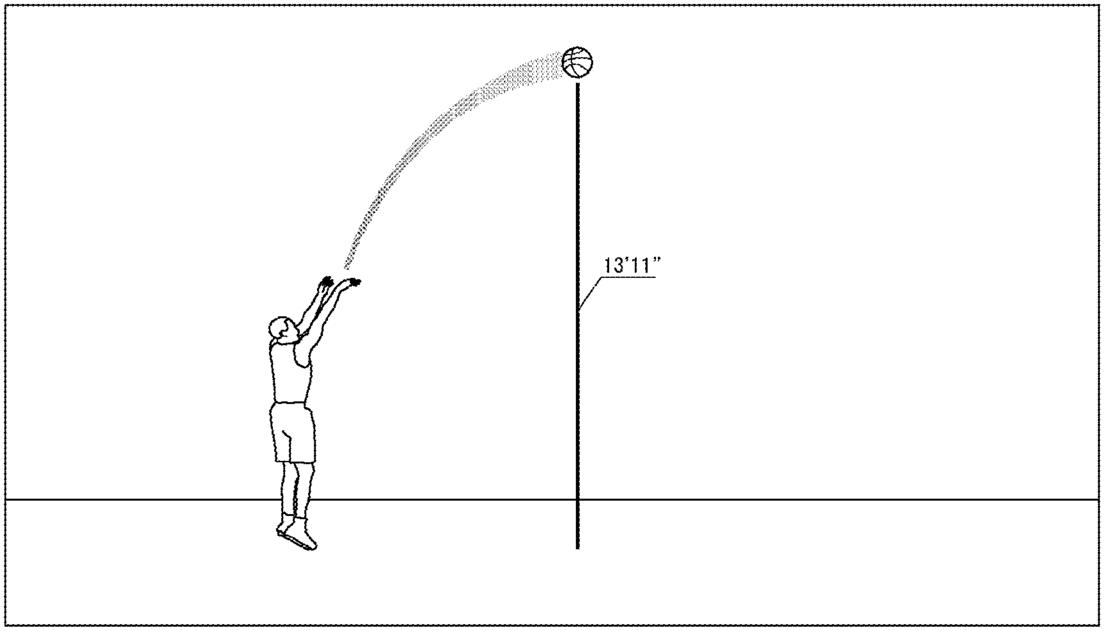
FIG. 21 is an explanatory diagram of an example of an image generated in the embodiment.

An image G8 in FIG. 21 is an example of an image using the EPTS data and the live-action FV, and this is an example of generating an image in which an image presenting a value based on the EPTS data is combined with the live-action FV generated by the FV render 12. For example, this is an image representing advanced play performed by the player with a numerical value.

The image G8 displays a value indicating the height when the ball is at the highest position.

Furthermore, as an example of an image using the EPTS data and the live-action FV, there is also an image in which the height when a player jumps for shooting is superimposed with scales and numerical values.

Such an image G8 can be generated, for example, by the 2D render 31 reading necessary live-action FV from the storage 16 and performing drawing processing of characters, numerical values, and accompanying lines, scales, and the like on the basis of the EPTS data.

Furthermore, examples of the image using the EPTS data and the live-action FV or CGFV include an example of generating an image G9 (not illustrated) obtained by combining an image based on the EPTS data with the live-action FV generated by the FV render 12 or the CGFV generated by the 3D render 27.

For example, the positions of five players of the same team on the court are dynamically connected by a line, whereby the resulting zone is colored, and the color is changed, for example, along the progress of the 24-second shot clock. As a result, the movement of each player and the ball of the team with the progress of time is represented.

Such an image G9 can be generated, for example, by the 2D render 31 reading necessary clips from the storage 16 or the storage 28 and performing processing of drawing or coloring a line on the basis of the EPTS data.

Figure 22:
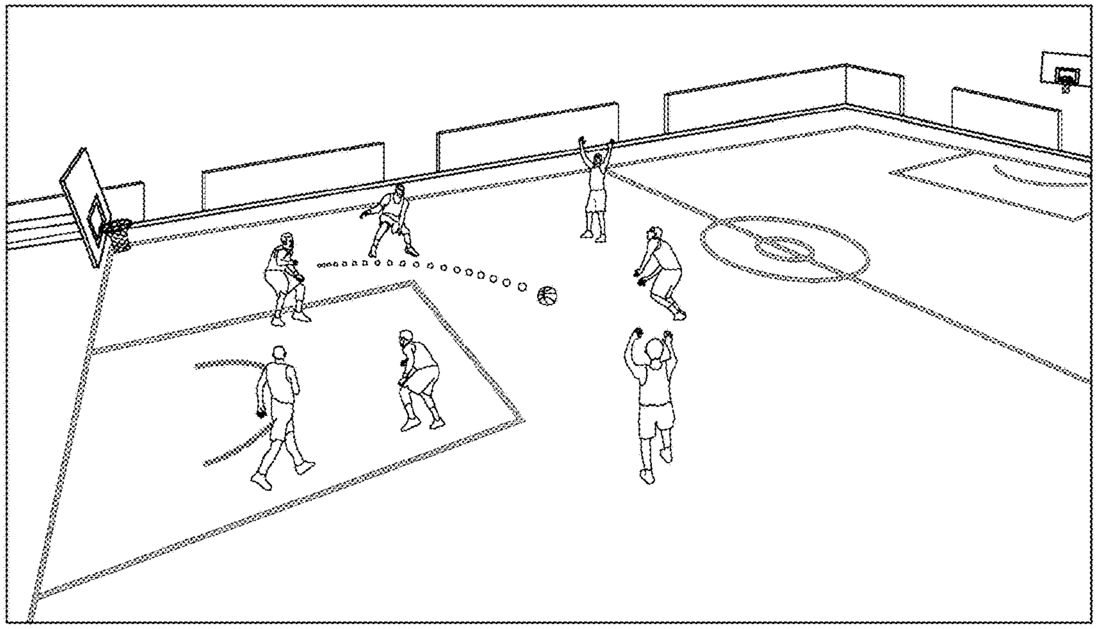
FIG. 22 is an explanatory diagram of an example of an image generated in the embodiment.
Figure 23:
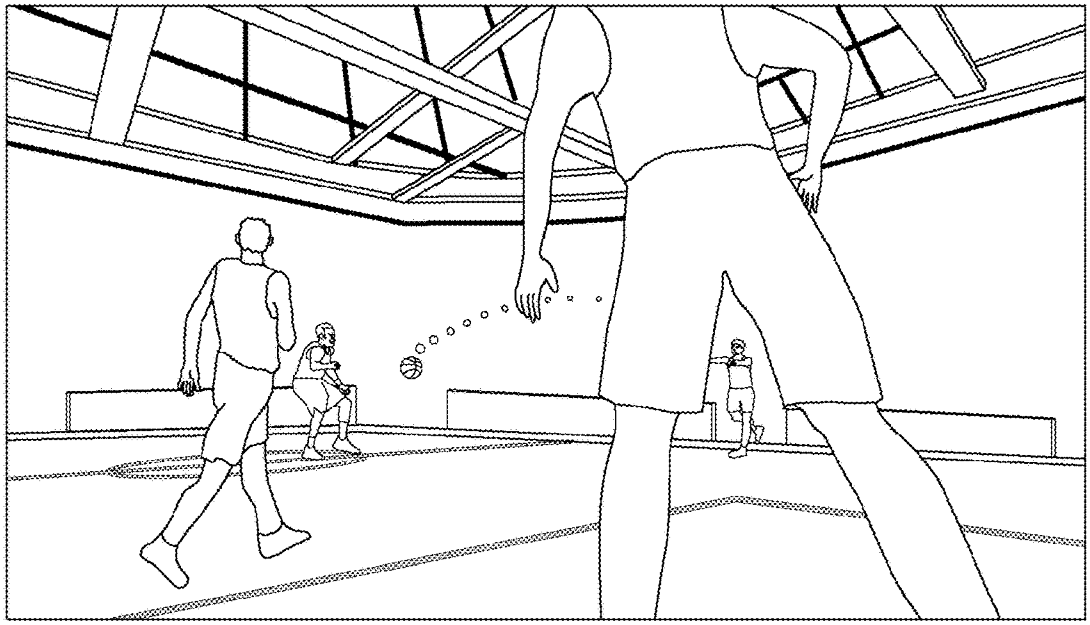
FIG. 23 is an explanatory diagram of an example of an image generated in the embodiment.

FIG. 22 illustrates an image G10-1, and FIG. 23 illustrates an image G10-2. These are examples of the image G10. The image G10 is an example of an image using the EPTS data, the live-action FV, and the CGFV. That is, this is an example of generating an image obtained by combining the live-action FV generated by the FV render 12 and the CGFV generated by the 3D render 27 on the basis of the EPTS data.

The image G10-1 is an image capturing each player as an image of a viewpoint from above the court that cannot be normally arranged, and the image G10-2 is an image capturing each player as an image of a viewpoint from a low position in the court that cannot be normally arranged. In this case, for example, in an FV clip as a live-action FV, some players are represented by CG and some players are represented by live-action imaging. Furthermore, in the image G10-1 and the image G10-2, an additional image representing the trajectory of the ball is also combined.

Such an image G10 can be generated, for example, by the 2D render 31 reading necessary live-action FV and CGFV from the storage 16 or the storage 28 and performing composition on the basis of the EPTS data.

Note that an example is described in which the images G1 to G10 described above are generated by, for example, the processing of the 2D render 31 as output as a 2D image, but the processing of the 2D render 31 described above can also be performed by the FV render 12 or the 3D render 27.

Furthermore, in a case where the CGFV is used as the image G3, the image G4, the image G9, and the image G10, it is also conceivable to output these images as 3D images without performing 2D rendering.

5. Example of Image Production Processing

A processing example in the case of producing the images from the images G1 to G10 described above will be described with reference to FIGS. 24 to 28. Each processing example described below can be considered as processing of any of the EPTS data generation unit 22, the 2D render 31, the FV render 12, and the 3D render 27 in the system of FIG. 2, or processing performed by these in cooperation. Therefore, each processing will be described as processing of the image processing unit 85 of the information processing device 70 in FIG. 5 configured as the EPTS data generation unit 22, the 2D render 31, the FV render 12, or the 3D render 27. That is, the processing examples in FIGS. 24 to 28 can be considered as processing examples executed by one information processing device 70, or may be considered as processing examples executed by cooperation of a plurality of information processing devices 70.

Then, in the following description, the storages 15, 16, 23, 24, 25, 28, and 32 illustrated in FIGS. 2 and 4 may also be referred to, but these storages from which the image processing unit 85 reads information may be considered as storage devices separate from the storage unit 79 of the information processing device 70 and the information processing device 70.

Note that the processing examples in FIGS. 24 to 28 can be considered as processing of the image processing unit 85 of one or a plurality of information processing devices 70 functioning as the estimation information generation unit 4, the free viewpoint image generation unit 3, the three-dimensional image generation unit 5, and the output image generation unit 6 in FIG. 1.

Furthermore, each processing will be described as a processing example of a period after the start of a game of a competition or an event such as basketball or soccer.

Figure 24:
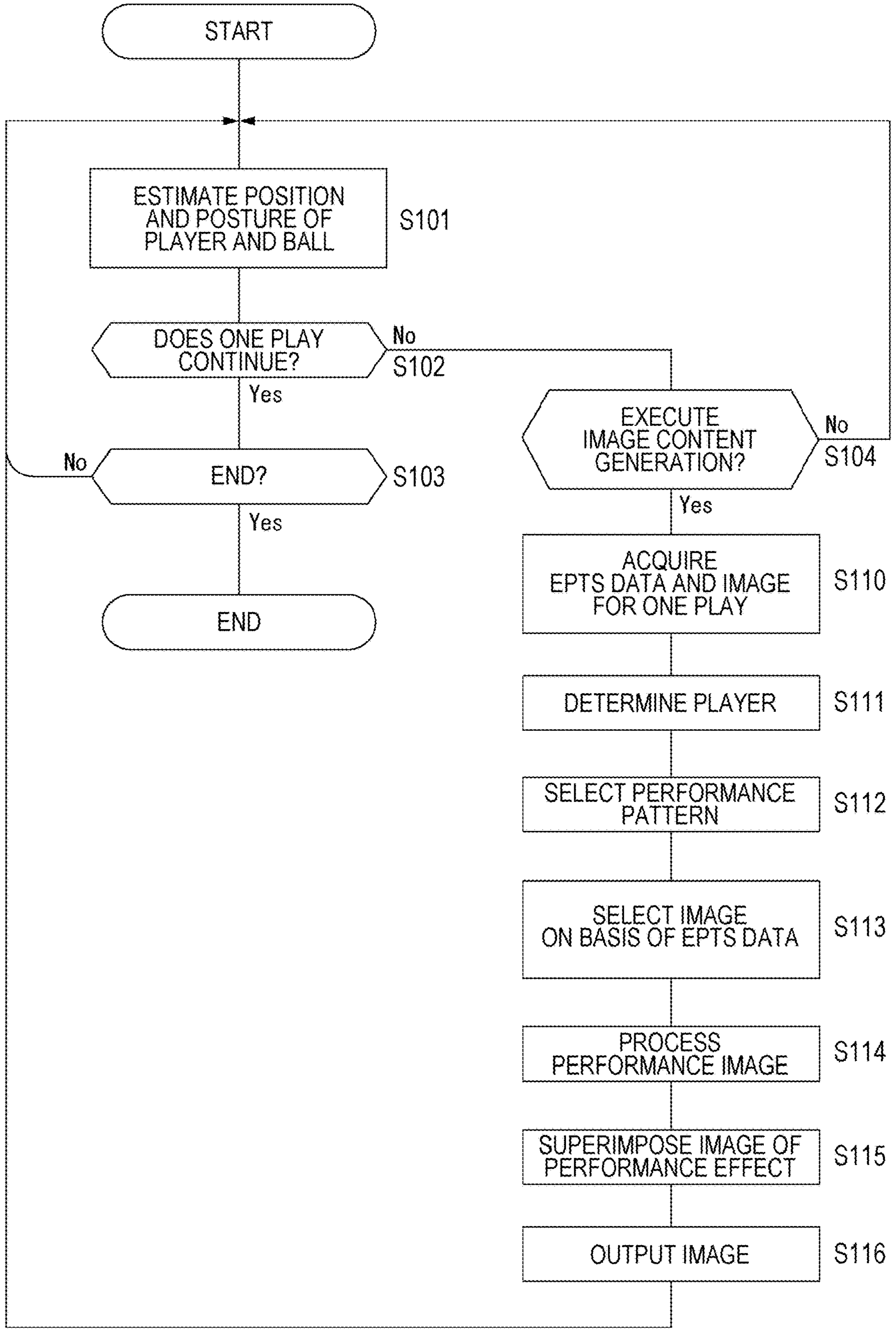
FIG. 24 is a flowchart of an example of image production processing according to the embodiment.

FIG. 24 illustrates a processing example for image content production including contents such as the image G1, the image G6, the image G7, the image G8, and the image G9.

In step S101, the image processing unit 85 obtains estimation information such as the position and posture of the player and the ball. That is, the EPTS data is generated from captured image of the imaging device 20 and stored in the storage 23.

In step S102, the image processing unit 85 determines whether or not one play in the game continues. One play mentioned here may be determined according to the type of a competition or an event. For example, in basketball or soccer, it is only required to determine that one play ends by determining that the game is temporarily interrupted, such as a break due to the ball going out of the court, a break due to scoring, or a break due to fouling, or the end of the play time (end of one set, interval, halftime).

Furthermore, the break timing of the game does not necessarily need to be the end of one play. For example, a period from immediately before shooting to after shooting may be determined as one play even if the game continues as it is.

The determination that the continuation of one play is interrupted may be automatically determined by the image processing unit 85 performing image analysis or the like, or may be determined by the image processing unit 85 according to an operator input or the like.

In step S103, the image processing unit 85 determines the end of the processing. For example, if the end of the game is set as the end timing of the processing, the image processing unit 85 determines the end of the game automatically or according to an operator input or the like.

While one play continues, the image processing unit 85 repeats steps S101, S102, and S103 described above. That is, while the EPTS data at each time point is acquired in step S101, the break of one play, the end of the game, and the like are monitored.

At the timing when one play is interrupted, the image processing unit 85 determines in step S104 whether or not to execute image content generation, that is, to execute processing of generating clips as exemplified in the image G1, the image G6, the image G7, the image G8, and the image G9. For example, it is conceivable to ask the operator whether or not to perform image content generation every time one play ends, and detect the answer input to make a determination. Alternatively, the image processing unit 85 may analyze the content of the captured image of one play so far, and may automatically determine that content generation is performed in a case where the captured image is determined to be a specific scene, for example.

If the image content generation is not executed, the image processing unit 85 returns to step S101.

In a case where it is determined that the image content generation is executed, the image processing unit 85 proceeds to step S110 and acquires the EPTS data for one play of this time. For example, the EPTS data of one play period is read from the storage 23.

In step S111, the image processing unit 85 performs processing of determining a player to be featured in the image content to be generated. For example, a player to be represented as an FV clip from a free viewpoint or a player to which an image effect is given is determined. That is, the processing is processing of determining a player to be a main subject in the generated image.

This processing may be performed in accordance with an operator input or may be automatically performed. In a case where the operator has designated a specific player in advance or in a case where the operator has performed an operation to designate a specific player for one play this time, the image processing unit 85 determines the designated player to be the main subject. Furthermore, from the image content of one play, for example, a player who has performed a specific play such as a player who has taken a shot may be automatically determined, and the player may be determined to be the main subject. Furthermore, the image processing unit 85 may present a plurality of players imaged in one play this time or a plurality of players making main movements, and the operator may select players from the presented players.

In step S312, the image processing unit 85 selects a performance pattern. This is, for example, processing of selecting one of the types of performance of the image G1, the image G6, the image G7, the image G8, and the image G9.

For example, it is selected whether to give an effect such as the image G1, to perform composition of an image presenting a flow line of a subject such as the image G6 and the image G7, to generate an image presenting a numerical value or the like based on the EPTS data such as the image G8, or to generate an image combining an image with a clip such as the image G9.

This processing may be performed in accordance with an operator input or may be automatically performed. In a case where the operator has designated a specific performance in advance or in a case where the operator has performed an operation to designate a specific performance for one play this time, the image processing unit 85 determines the performance pattern by the designation. Furthermore, the image processing unit 85 can automatically select the performance pattern from the image content of one play according to, for example, a shot scene, a pass scene, a foul scene, a type of a shot, and the like.

In step S113, the image processing unit 85 selects a necessary image on the basis of the EPTS data acquired in step S110 to be set as a processing target. At least an image of an angle that is not hidden in step S111 is selected. Since the position of the player can be confirmed by the EPTS data, the image of the imaging device 10 capturing the player can be determined.

Therefore, the image processing unit 85 can select and read, from the storages 16 and 28, an FV clip or a 3D image capturing the player to be set as a processing target, or can select an image of a necessary angle from the recording unit 11 for a necessary period at this point of time to generate an FV clip.

In step S114, the image processing unit 85 performs processing of the performance image to be added to the selected image. For example, a CG image for a performance effect is generated on the basis of the EPTS data.

For example, in a case where the performance patterns such as the image G1, the image G6, the image G7, and the image G9 are selected in step S112, the image processing unit 85 performs smoothing of the EPTS data in step S114, and generates a CG image on the basis of the smoothed EPTS data.

The smoothing of the EPTS data is, for example, processing of smoothly changing a change in position information of a player or a ball at each time point. Since position information of a player or a ball based on actual EPTS data has many fine variations and it is difficult to draw a smooth trajectory as it is, a smooth trajectory is grasped by smoothing.

Then, in the case of the performance pattern such as the image G1, the image processing unit 85 determines the trajectory of the ball by the smoothed EPTS data, and generates a CG image as an effect to be superimposed on the trajectory.

In the case of the performance pattern such as the image G6 and the image G7, the image processing unit 85 determines the trajectory of the ball by the smoothed EPTS data, and generates a CG image representing the trajectory.

In the case of the performance pattern such as the image G9, the image processing unit 85 determines the trajectory of each player by the smoothed EPTS data, and generates a CG image representing the color of the line or the area connecting the players according to the position of each player in each frame.

Furthermore, for example, in a case where the performance pattern such as the image G8 is selected in step S112, the image processing unit 85 performs processing of converting a value obtained by the EPTS data into display data in step S114. That is, a numerical value or the like to be represented is determined by the EPTS data, and a CG image as the numerical value or an additional image is generated.

In step S115, the image processing unit 85 performs processing of superimposing the CG image of the performance effect generated in step S114 on the image selected (or generated) in step S113.

As a result, image content having contents as exemplified in the image G1, the image G6, the image G7, the image G8, and the image G9 is generated.

In step S116, the image processing unit 85 outputs the generated image content generation. Then, the processing returns to step S101.

With the above processing, image content including scenes such as the image G1, the image G6, the image G7, the image G8, and the image G9 can be output.

Next, a processing example for generating image content including content such as the image G3 will be described with reference to FIG. 25.

Note that, hereinafter, the same processing as the description processing is denoted by the same step number, and detailed overlapping description is avoided.

Figure 25:
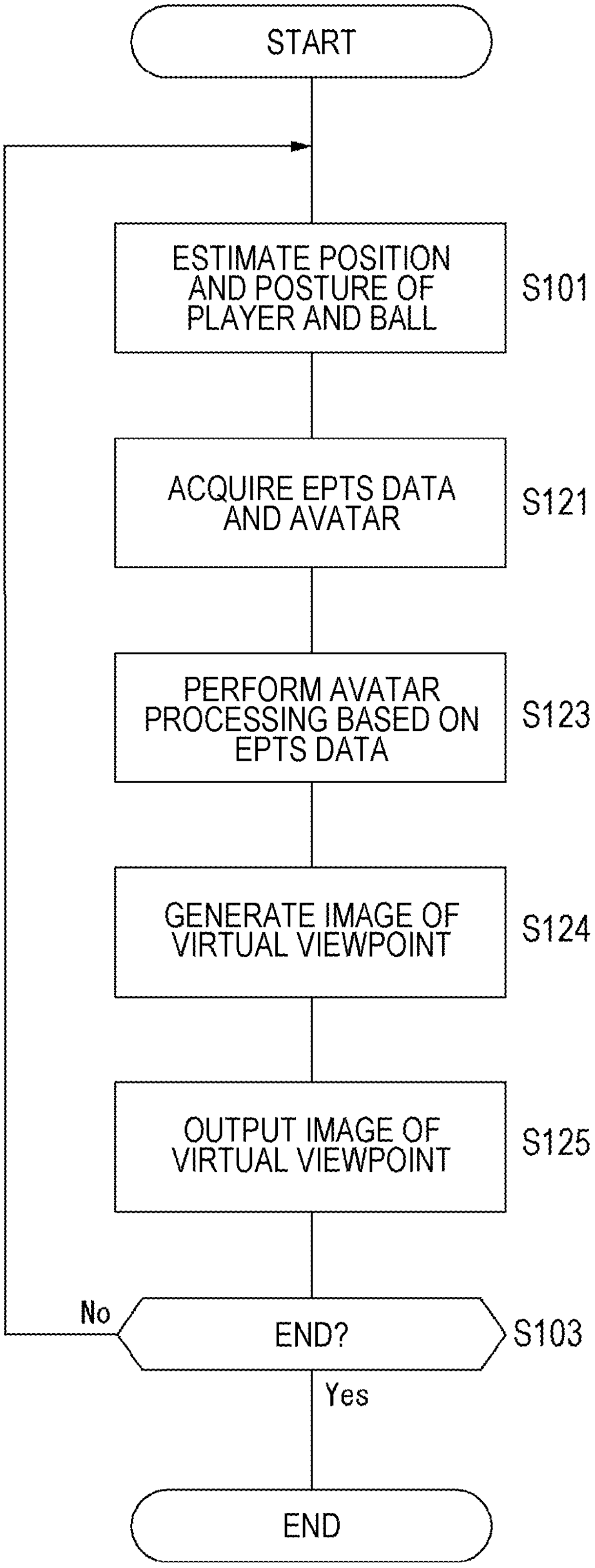
FIG. 25 is a flowchart of an example of image production processing according to the embodiment.

In the processing example in FIG. 25, after the start of the game, the image processing unit 85 performs the processing of step S101 to step S125 until it is determined in step S103 that the game is ended.

In step S101, the image processing unit 85 generates EPTS data from captured image of the imaging device 20 to be stored in the storage 23.

In step S121, the image processing unit 85 acquires the EPTS data and an avatar for the current frame. The avatar is a 3D model of a player, and refers to the CG player model of the storage 24 in the case of this processing example.

In step S123, the image processing unit 85 performs avatar processing based on the EPTS data. That is, the position and posture of the player represented in the current frame are determined by the EPTS data, and the 3D image of each player is generated from the CG player model.

In step S124, the image processing unit 85 generates an image of a virtual viewpoint. That is, an image from an arbitrary viewpoint is generated using a 3D image by CG of each player. For example, it is also possible to generate an image at an angle that cannot be normally captured, such as the image G3.

In step S125, the image processing unit 85 outputs the generated image content generation of the virtual viewpoint. Then, if it is not determined in step S103 that the process is ended, the process returns to step S101.

Therefore, it is possible to generate and output image content that reproduces a game from various virtual viewpoints.

Next, a processing example for image content generation using the EPTS data, the live-action FV, and the CGFV such as the image G10 will be described with reference to FIG. 26.

Here, an example will be described in which an image of the player is generated by CGFV at the start of the game, and by obtaining the live-action image, processing of replacing the image of the player with the live-action FV is performed.

After the start of the game, the image processing unit 85 generates the EPTS data in step S101, determines whether one play continues in step S102, and performs the processing from step S121 to step S125 until it is determined in step S103 that the game is ended.

That is, while one play continues, reproduction images of the game from various viewpoints are generated and output in step S121 to step S125 similarly to FIG. 25 described above.

Figure 26:
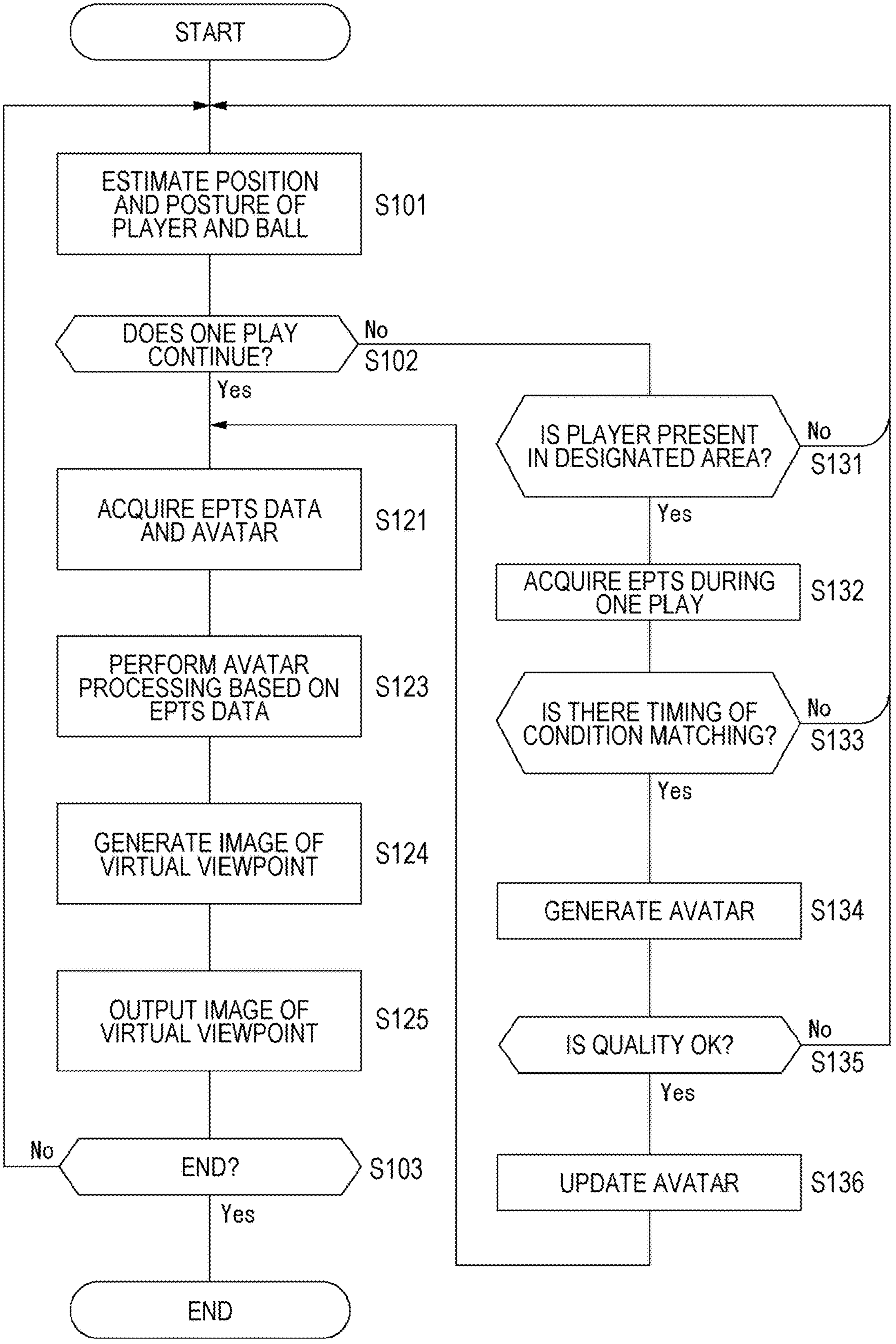
FIG. 26 is a flowchart of an example of image production processing according to the embodiment.

However, the avatar acquired by the image processing unit 85 in step S121 is the CG player model stored in the storage 24 in FIG. 25, but may be the live-action player model stored in the storage 15 in the case of FIG. 26. For example, since the live-action player model has not yet been created at the start of the game, 3D images of all players are generated using the CG player model. Thereafter, there may be a case where a live-action player model is created from the captured image at a timing when one play is interrupted.

At the timing when one play is interrupted, the image processing unit 85 proceeds from step S102 to step S131, and the image processing unit 85 determines whether or not a player is present in a designated area in the period of this one play.

The designated area mentioned here is an area in which captured images of players can be obtained from various angles by as many imaging devices 10 as possible for convenience of camera arrangement. For example, as illustrated in FIG. 3, a designated area DA is set according to the camera arrangement. For example, the designated area DA can be set in a state where each imaging device 10 is arranged and the calibration is performed, and the visual field range of each imaging device 10 is determined. The designated area DA is set as an area in which a highly accurate live-action player model can be generated.

The designated area DA is set in this manner, and the image processing unit 85 determines whether or not the player is present in the designated area DA in step S131. In this case, it may be determined whether or not a specific player is present in the designated area DA, or whether or not a player is present in the designated area DA may be determined without setting any limitation on the player.

If there is no player (or specific player) in the designated area DA in the image in the period of this one play, the image processing unit 85 returns to step S101. That is, in that case, the generation of the live-action player model is not performed.

In a case where it is determined in step S131 that there is a player in the designated area DA, the image processing unit 85 proceeds to step S132 and acquires EPTS data for one play of this time. For example, the EPTS data in one play period is read from the storage 23.

In step S133, the image processing unit 85 determines whether or not there is a timing of condition matching for generating a live-action player model (avatar by live-action imaging) for the player who is present in the designated area DA during the one play of this time.

For example, the following conditions are determined.

The number of captured images without occlusion is a predetermined number or more.

The posture of the player is appropriate.

A captured image in a state of not moving violently is obtained.

Occlusion is a state where an object in front hides an object behind. In this case, a state where another player is present around a target player in the designated area DA and the target player is hidden from the viewpoint of the captured image is referred to as occlusion.

As the captured image of each viewpoint by the plurality of imaging devices 10 at a certain timing during one play, the condition that there are a predetermined number or more of images in which the target player is captured in a state where there is no occlusion is one of the conditions for generating a high-accuracy live-action player model of the player.

The condition that the posture is appropriate is a condition that a posture suitable for 3D modeling, such as what is called a T pose or A pose, or a posture close thereto is desirable. The fact that the target player in the designated area DA is in a pose suitable for 3D modeling may be one of the conditions for generating a high-accuracy live-action player model.

This is because there is a high possibility that motion blur occurs in a captured image at the time of intense movement, and the captured image is not suitable for generating a high-accuracy live-action player model. Therefore, one of the conditions may be that a captured image in a state of not moving violently is obtained.

For example, one or more conditions as described above have been set, and the image processing unit 85 determines whether or not there is a timing at which the conditions are satisfied in one play of this time.

If it is determined that there is no timing to satisfy the conditions, that is, there is no timing to obtain an appropriate captured image for 3D modeling in the image in the period of this one play, the image processing unit 85 returns to step S101. That is, in that case, the generation of the live-action player model is not performed.

In a case where it is determined that there is a condition matching timing, the image processing unit 85 proceeds to step S134 and generates an avatar for the player. That is, 3D modeling is performed using the captured images of the plurality of viewpoints at the timing when the conditions are met, and a live-action player model is generated.

In step S135, the image processing unit 85 branches the processing by quality determination. Whether or not the generated live-action player model can be said to have sufficient quality is automatically determined or whether or not the generated live-action player model, which is displayed on the display unit 77, has sufficient quality is determined according to the operator's operation.

In a case where the quality is determined to be insufficient, the image processing unit 85 returns to step S101. In this case, the live-action player model created this time is discarded.

If the quality is sufficient, the image processing unit 85 proceeds to step S136 and updates the avatar. For example, the live-action player model is stored in the storage 16 so that the live-action player model can be used in the processing as the 3D render 27. Then, the process proceeds to step S121.

For the player whose avatar as the live-action player model is generated as described above, an image using the live-action player model is generated instead of the CG player model in the subsequent processing of steps S121 to S125.

For this reason, for example, the image content to be produced gradually changes from the CG image to the live-action image as the game progresses.

By the way, as a modification example of FIG. 26, the image using the live-action player model instead of the CG player model may be generated only for a specific player. For example, one or a plurality of players of interest is set in advance as a specific player. Then, in a case where it is determined in step S131 that the specific player is present in the designated area DA and there is a timing of condition matching in step S133 for the specific player, processing of generating an avatar in step S134 is performed. As a result, in a case where image content featuring a specific player is generated, efficient processing can be performed.

Furthermore, in addition to sequentially generating images using the live-action player model instead of the CG player model during the game as illustrated in FIG. 26, for example, for a player for which the live-action player model is generated at a point of time after the game, at a point of time of an interval, a halftime, or the like, an image using the live-action player model may be set to be generated thereafter.

Moreover, until the live-action player model is generated for all the players, the CG player model is used for all the players, and once the live-action player model is generated for all the players, images using the live-action player model may be generated all at once thereafter.

Furthermore, as a modification example of FIG. 26, in step S124, an additional image based on the EPTS data may be further superimposed. For example, in the image G10-1 and the image G10-2 in FIG. 23, an additional image representing the trajectory of the ball is also included. In step S124, the image processing unit 85 can also combine such additional images. That is, this is an example of combining the image of the player by the live-action FV, the image of the player by the CGFV based on the EPTS data, and further combining the additional image based on the EPTS data. Examples of the additional image include an image representing a trajectory of a player or a ball, an image representing a flow line, characters, and numbers.

Next, a processing example for generating image content including content such as the image G4 will be described with reference to FIG. 27.

After the start of the game, the image processing unit 85 performs the processing of step S101 to step S140 until it is determined in step S103 that the game is ended.

In step S101, the image processing unit 85 generates EPTS data from captured image of the imaging device 20 to be stored in the storage 23.

In step S140, the image processing unit 85 determines whether or not it is the timing of the break of the game. Here, for example, an interval between basketball quarters, halftime, a timing of the end of a game, or the like is determined to be the timing of the break of the game.

In a case where it is determined that the timing of the break of the game has come by analysis of the captured image, input by the operator, or the like, the image processing unit 85 proceeds from step S140 to step S141, and determines whether or not to execute image content generation, that is, processing of generating a clip as exemplified in the image G4. This determination can be performed by operator input or automatic processing as in step S104 in FIG. 24.

If the image content generation is not executed, the image processing unit 85 returns to step S101.

In a case where it is determined that the image content generation is executed, the image processing unit 85 proceeds to step S142 and acquires the EPTS data in a necessary period. For example, at the timing of the interval at the end of the first quarter, the EPTS data in the period of the first quarter is read from the storage 23.

In step S143, the image processing unit 85 generates a CG image on the basis of the EPTS data of the target scene. For example, if an image in which shot scenes within a period are collected is generated, the positions of players and balls are determined on the basis of the EPTS data of the shot scenes, and a composition image by CG is generated.

In step S144, the image processing unit 85 outputs the generated image content generation. Then, if it is not a timing of the end of the game or the like, the process returns to step S101 through step S103.

Next, a processing example for generating image content including content such as the image G5 will be described with reference to FIG. 28.

After the start of the game, the image processing unit 85 performs the processing of step S101 to step S140 until it is determined in step S103 that the game is ended.

In step S101, the image processing unit 85 generates EPTS data from captured image of the imaging device 20 to be stored in the storage 23.

In step S140, the image processing unit 85 determines whether or not it is the timing of the break of the game.

In a case where it is determined that the timing of the break of the game has come, the image processing unit 85 proceeds from step S140 to step S141, and determines whether or not to execute image content generation, that is, processing of generating a clip as exemplified in the image G5.

If the image content generation is not executed, the image processing unit 85 returns to step S101.

In a case where it is determined that the image content generation is executed, the image processing unit 85 proceeds to step S142 and acquires the EPTS data in a necessary period.

In step S151, the image processing unit 85 performs smoothing of the EPTS data in the period acquired in step S142. This is because a smooth trajectory is represented by smoothing as described as one of the processing in step S114 in FIG. 24.

The EPTS data smoothed in step S152 is converted into display data to be an image within the period. As a result, an image by CG such that a movement trajectory of a ball, a player, or the like on the basis of the EPTS data in the period acquired in step S142 is represented is generated. The image may be a moving image in which the movement trajectory is gradually drawn with the movement trajectory at each time point in the period as each frame, or may be a still image indicating the trajectory by combining images of movement positions in the period.

In step S144, the image processing unit 85 outputs the generated image content generation. Then, if it is not a timing of the end of the game or the like, the process returns to step S101 through step S103.

FIGS. 24 to 28 described above are examples of processing that can be executed in the system according to the present embodiment.

Furthermore, although FIGS. 24 to 28 are described as examples of processing in a period after the start of a game, the same processing can be performed as processing when a game image is played back. However, in that case, since the EPTS data has been already stored in the storage 23, step S101 is unnecessary.

6. Selection/Composition of Live-Action Free Viewpoint Image and CG Image

Next, in the system according to the embodiment, processing for improving image quality in a case where an output image is generated by switching or fusing a free viewpoint image (live-action FV) based on live-action imaging by the FV render 12 and a 3D image (CGFV) using CG by the 3D render 27 will be described.

Figure 29:
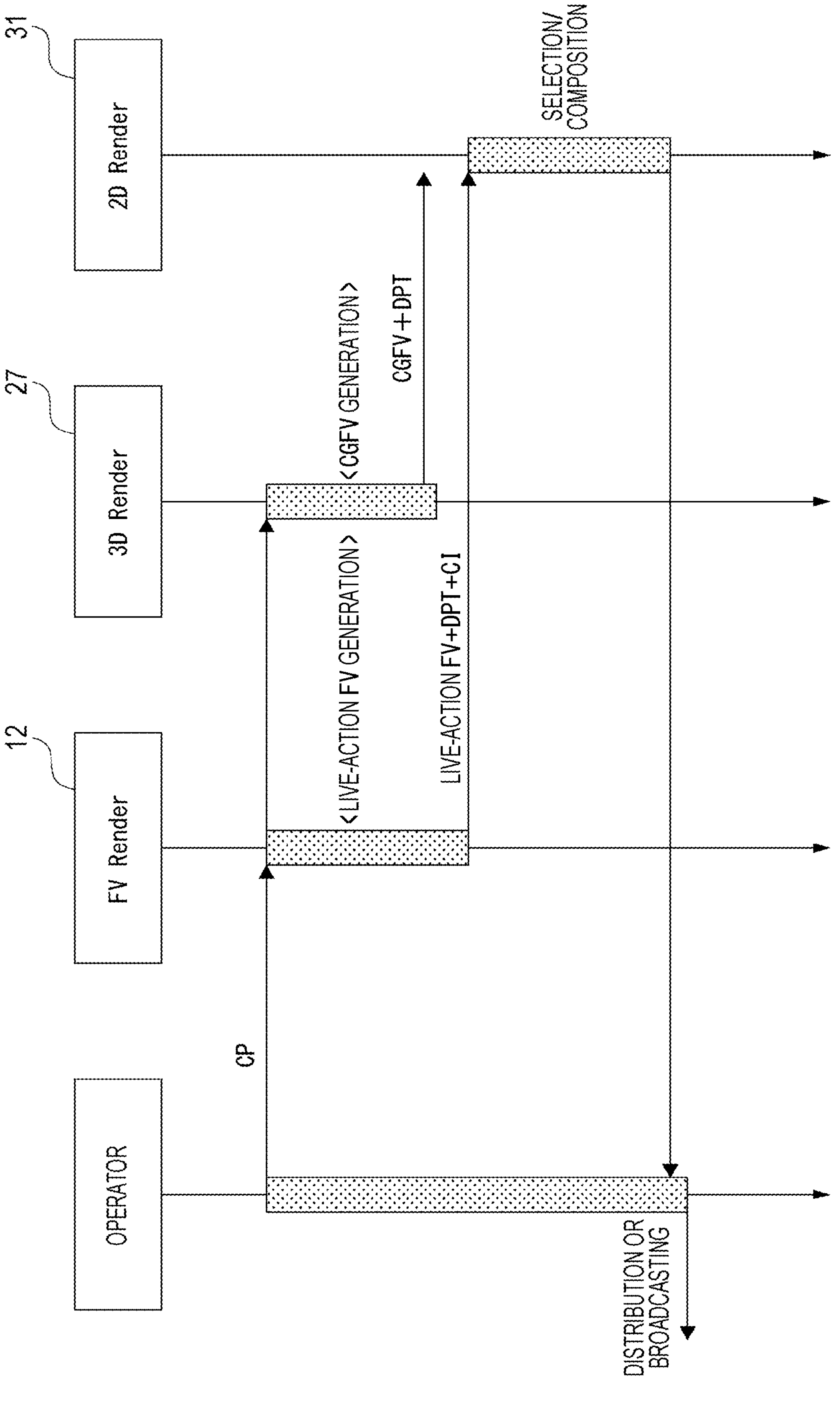
FIG. 29 is an explanatory diagram of a processing sequence of selection/composition of a live-action free viewpoint image and a CG image according to the embodiment.

A sequence as illustrated in FIG. 29 is assumed. FIG. 29 illustrates a flow of the operation of the operator, the processing of the FV render 12, the processing of the 3D render 27, and the processing of the 2D render 31.

The camera path designation information CPD is supplied to the FV render 12 and the 3D render 27 at the time of generating a free viewpoint image according to the operation of the operator.

The FV render 12 can generate a free viewpoint image by the designated camera path, that is, a live-action FV according to the camera path designation information CPD.

The 3D render 27 can generate a free viewpoint image by the designated camera path, that is, CGFV according to the camera path designation information CPD.

The 2D render 31 can acquire the live-action FV generated by the FV render 12, depth information DPT, and quality determination information CI. The depth information DPT is depth information of each subject (player or ball) viewed from the viewpoint position of each frame of the live-action FV. The quality determination information CI is information used for quality determination, and includes time information of each frame and information of an area where a player of a subject is present.

Furthermore, the 2D render 31 can acquire the CGFV generated by the 3D render 27 and the depth information DPT.

The 2D render 31 selects or combines the live-action FV and the CGFV to generate an output image. The depth information DPT and the quality determination information CI are used at the time of the selection and the composition.

The generated output image is distributed or broadcast, for example, according to an operator's operation.

In this sequence example, the 2D render 31 selects and combines two free viewpoint images of the live-action FV and the CGFV to generate an output image. As image content as the output image, the content obtained by selecting or combining the live-action FV and the CGFV is used.

Specifically, there is an example in which one of the live-action FV and the CGFV is selected as the output image. There is also an example in which the live-action FV and the CGFV are selected for each frame of the output image in the time axis direction. Moreover, there is also an example in which a subject is combined in an image of one frame of the output image.

Note that the processing of generating the output image by "selection" of the live-action FV and the CGFV includes a processing example of generating both the live-action FV and the CGFV and then selecting one of the live-action FV and the CGFV as the output image. Alternatively, there is a processing example in which the live-action FV and the CGFV are selected first on the basis of the camera path or the like, and in a case where the live-action FV is selected, the live-action FV is generated by the FV render 12, and the 2D render 31 generates the output image using the live-action FV, and in a case where the CGFV is selected, the CGFV is generated by the 3D render 27, and the 2D render 31 generates the output image using the CGFV. Any of the above may be adopted.

First, an example of the selection of the live-action FV and the CGFV will be described.

In the case of generating the image content to be output, there is an example in which either the live-action FV or the CGFV is selected by simply determining which quality is better. For example, quality determination is performed using the quality determination information CI, and in a case where the live-action FV can be generated with high quality, the live-action FV is set as the output image as it is, on the other hand, in a case where the live-action FV cannot be generated with high quality, the CGFV is set as the output image.

In addition to selecting one of the live-action FV and the CGFV as the entire FV clip in this manner, selection may be performed such that the live-action FV is used in a certain period of the FV clip and the CGFV is used in a certain period of the FV clip.

Figure 30:
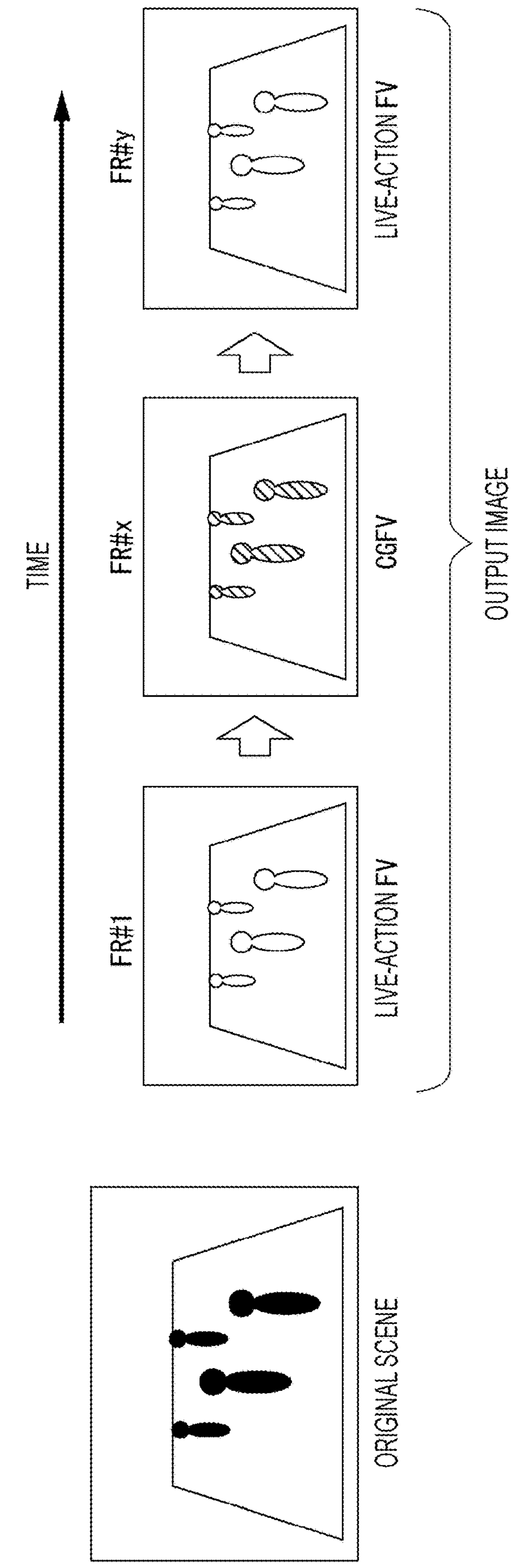
FIG. 30 is an explanatory diagram of an example of selection in a time direction according to the embodiment.

FIG. 30 illustrates an example of the output image in which the live-action FV is used in the period from the frame FR #1, the CGFV is used in the period from the frame FR #x, and the live-action FV is used in the period from the frame FR #y. This is an example of a result in a case where the quality determination using the quality determination information CI is performed and the live-action FV and the CGFV are selected for each frame.

For example, in a case where the quality of each frame in the period from the frame FR #x to the frame FR #(y-1) (not illustrated) is degraded in the live-action FV, the CGFV is selected for each frame in this period, so that the output image is as illustrated in FIG. 30.

As described above, the quality determination for selecting the live-action FV and the CGFV for the entire FV clip or for each frame is performed as follows, for example.

First, there is a factor for determining the relationship between the camera path and the arrangement of the plurality of imaging devices 10 as a determination factor.

From the field of view of each imaging device 10 according to the preset camera arrangement, it is possible to specify an area where the fields of view of a predetermined number or more of imaging devices 10, such as three or more imaging devices 10, overlap in a basket court.

The accuracy of the 3D model for generating a free viewpoint image is improved as captured images from a larger number of viewpoints are obtained. Therefore, an area that can be imaged by a predetermined number or more of imaging devices 10, such as at least three or more imaging devices 10, is specified in advance. For example, the designated area DA in FIG. 3 described above is specified.

Then, determining whether or not the subject in the designated area DA is targeted in the camera path at this time is one of the quality determinations.

That is, if the target subject, which is the target of the free viewpoint image in the camera path at this time, is in the designated area DA, it is a determination factor that the quality is good. Conversely, in a case where the target subject is not in the designated area DA, the quality of the live-action FV may be degraded.

Furthermore, as a relationship between the camera path and the field of view of each of the plurality of imaging devices, it may be determined whether or not the camera path passes through an area exceeding zoom limit.

The zoom limit mentioned here is set as an upper limit of the zoom magnification to be able to maintain the quality required by the live-action FV. For example, in a case where the imaging device 10 uses both the optical zoom and the digital zoom, the maximum magnification of the optical zoom may be set as the zoom limit. Furthermore, not limited to the zoom system, a certain predetermined zoom magnification may be set as the zoom limit.

Whether or not the camera path is within the zoom limit area is a determination factor of the quality of the live-action FV. That is, if the camera path is not within the zoom limit area, it becomes a position determination factor indicating that the quality of the live-action FV is good, and if the camera path is within the zoom limit area, the quality of the live-action FV may be degraded in the live-action FV or in the corresponding camera path section.

FIGS. 31A, 31B, 32A, and 32B illustrate the arrangement relationship between camera paths CP1, CP2, CP3, and CP4 and the plurality of imaging devices 10.

By determining the arrangement of the imaging devices 10, the designated area DA and zoom boundary ZB are specified as illustrated in each drawing. The zoom boundary ZB is a line indicating the zoom limit, and indicates that a subject inside the elliptical shape of the zoom boundary ZB has a magnification exceeding the zoom limit. Furthermore, a target player 90 in the free viewpoint image is indicated by a black circle, and other players 91 are indicated by white circles.

Figure 31B:
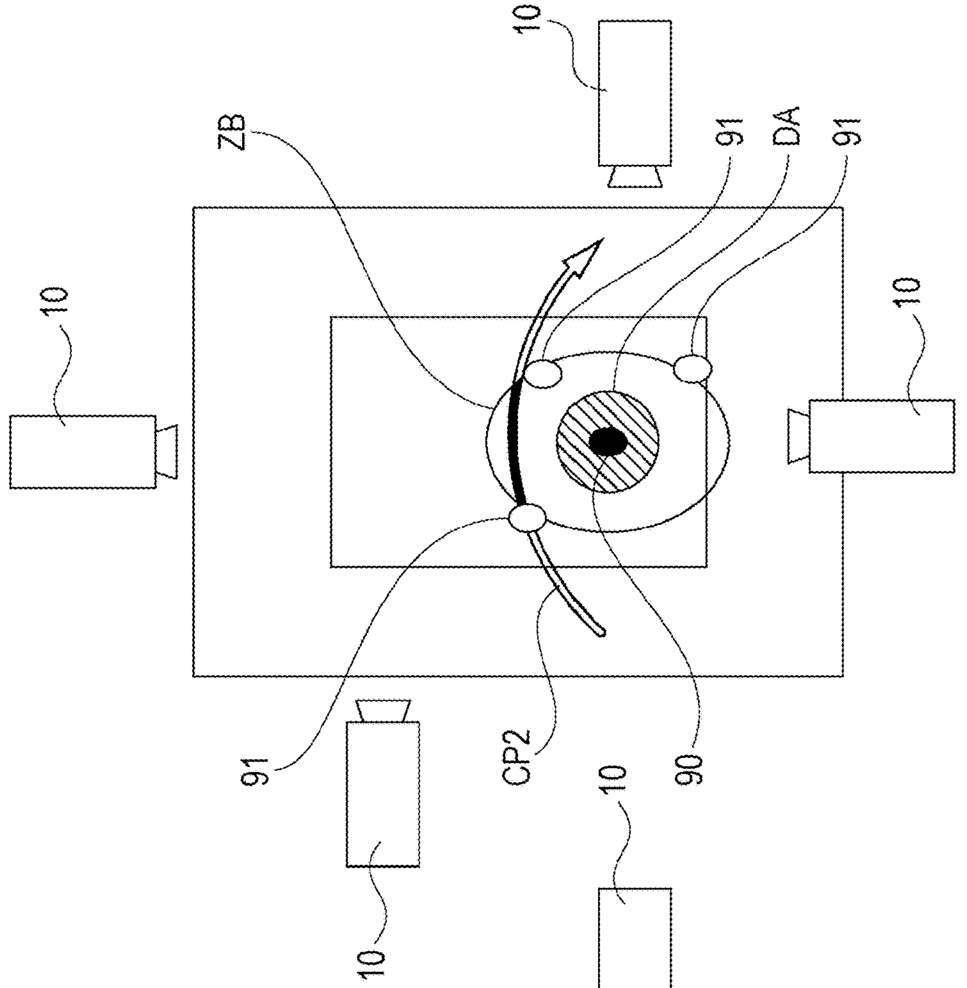
FIGS. 31A and 31B are explanatory diagrams of selection of a live-action free viewpoint image and a CG image according to the embodiment.
Figure 31A:
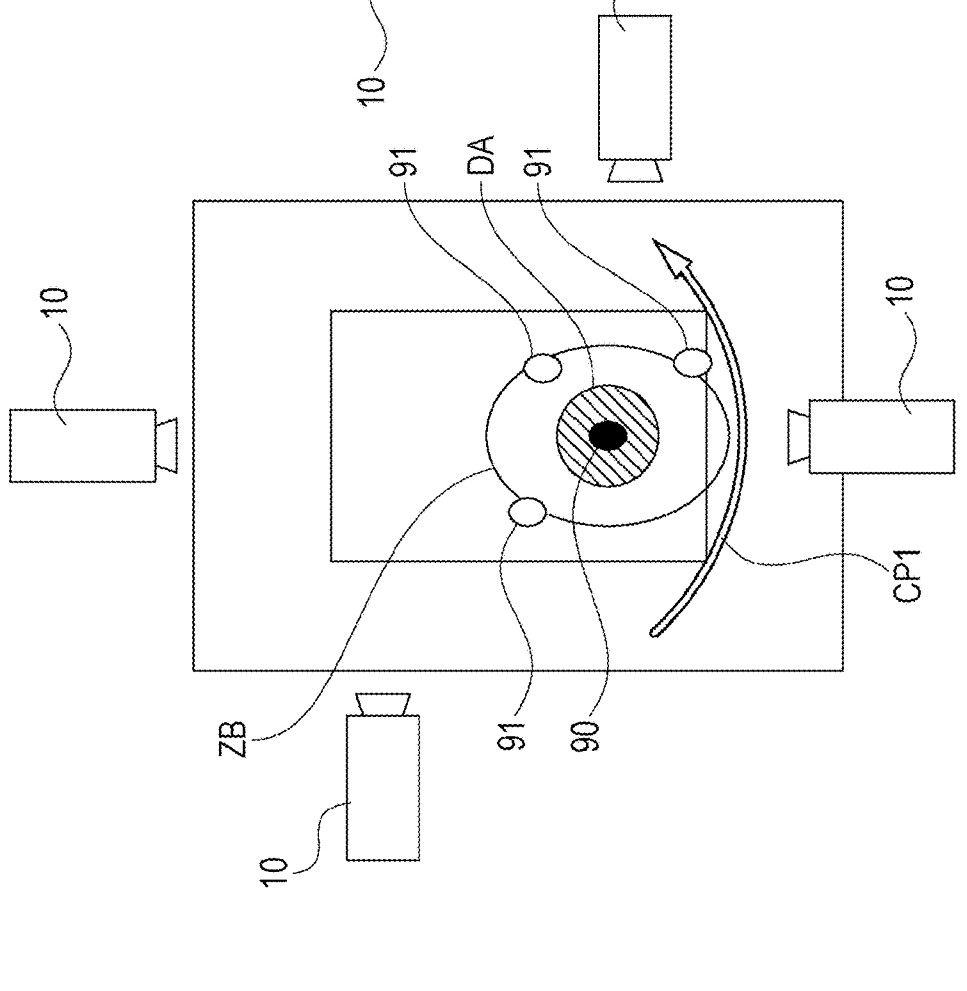

In FIG. 31A, the target player 90 is within the designated area DA. If the camera path CP1 at this time sets the player in the designated area DA as the target player 90, images from a predetermined number or more of viewpoints can be obtained for the target player 90. Furthermore, the camera path CP1 does not exceed the zoom boundary ZB.

Therefore, only from these viewpoints, it is determined that the quality of the live-action FV by the camera path CP1 at this time can be maintained. Therefore, it is conceivable to select the live-action FV in all the frames in the camera path CP1. The camera path CP1 is indicated by a double line, which is a section for selecting the live-action FV.

On the other hand, FIG. 31B illustrates a case where the target player 90 is in the designated area DA, but the camera path CP2 exceeds the zoom boundary ZB in a part thereof (a portion where the double line is thickened).

In this case, the quality of the live-action FV by the camera path CP2 may be degraded in the image in the thick line section. Therefore, it is conceivable that the CGFV is selected for the frame in the thick line section of the camera path CP2, and the live-action FV is selected for the frame in the section indicated by the double line, which does not exceed the zoom boundary.

Note that, in this case, there is also a concept that the entire output image is based on the CGFV in consideration of the quality of a part of the live-action FV.

Figure 32B:
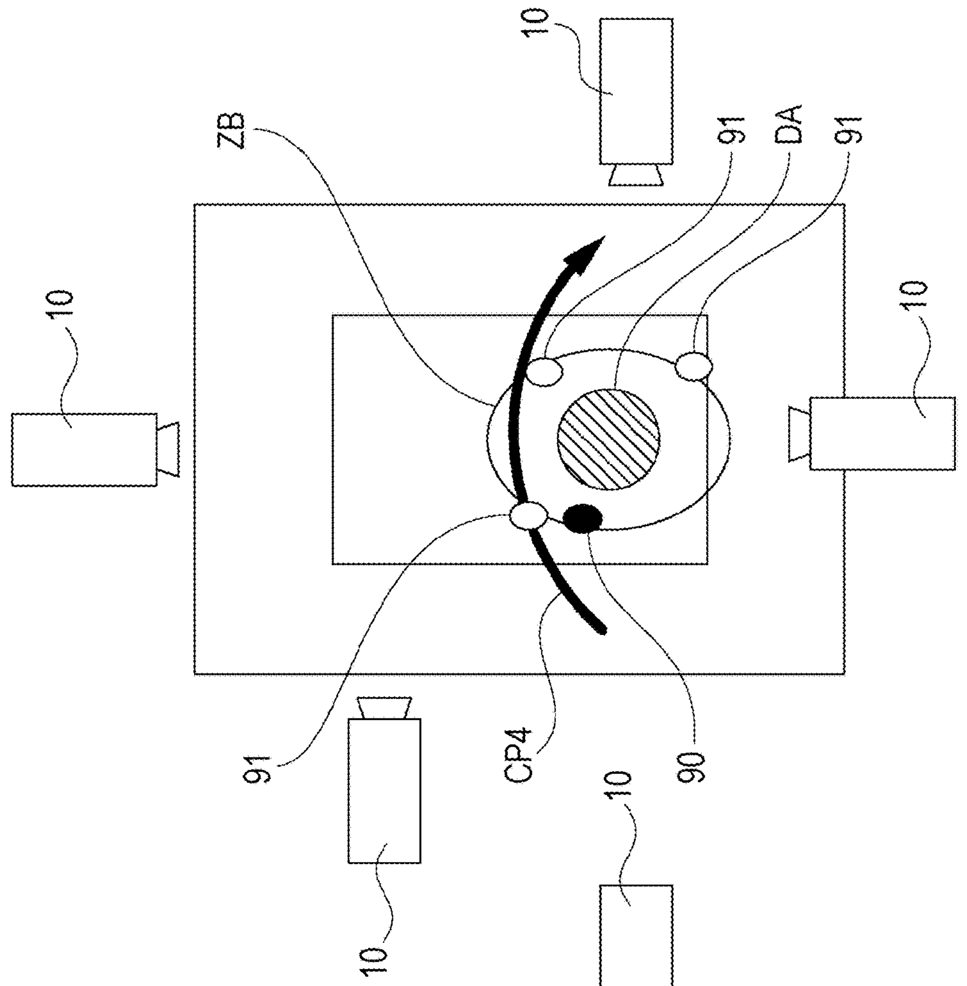
FIGS. 32A and 32B are explanatory diagrams of selection of a live-action free viewpoint image and a CG image according to the embodiment.
Figure 32A:
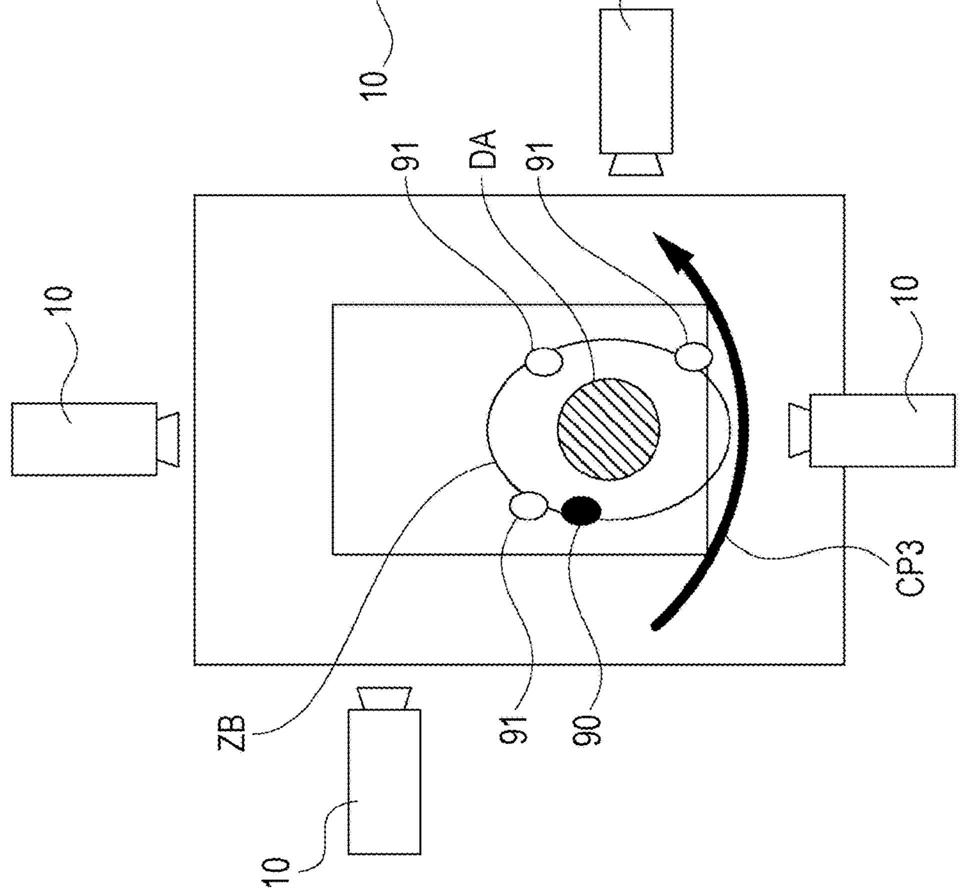

FIG. 32A illustrates a case where the camera path CP3 does not exceed the zoom boundary ZB, but the target player 90 is not within the designated area DA.

FIG. 32B illustrates a case where the camera path CP3 partially exceeds the zoom boundary ZB, and the target player 90 is not within the designated area DA.

In these cases, since it is conceivable that the quality of the free viewpoint image of the target player 90 cannot be maintained, the frames in the entire sections of the camera paths CP3 and CP4 are based on the CGFV.

The above is an example of quality determination by the designated area DA and the zoom boundary ZB, but, moreover, there is also an example of determining an arrangement relationship between a target subject (target player 90) for which a free viewpoint image is generated and other players 91 in the image.

Specifically, congestion degree around the target player 90 is determined.

It is determined whether or not the distance between the players is within a certain distance.

Furthermore, it is determined whether or not occlusion by the other players 91 with respect to the target player 90 is a predetermined number or more as viewed from the imaging device 10 constituting the viewpoint of the camera path.

In a case where the distance between the players is within a certain range, or in a case where occlusion is a predetermined number or more, the accuracy of the 3D model for the target player 90 decreases. Therefore, in such a case, the quality of the live-action FV may not be maintained, whereby the CGFV is selected.

The above is an example in which the live-action FV and the CGFV are selected in the time axis direction. Next, an example in which subjects of the live-action FV and the CGFV are combined in an image of one frame will be described.

Figure 33:
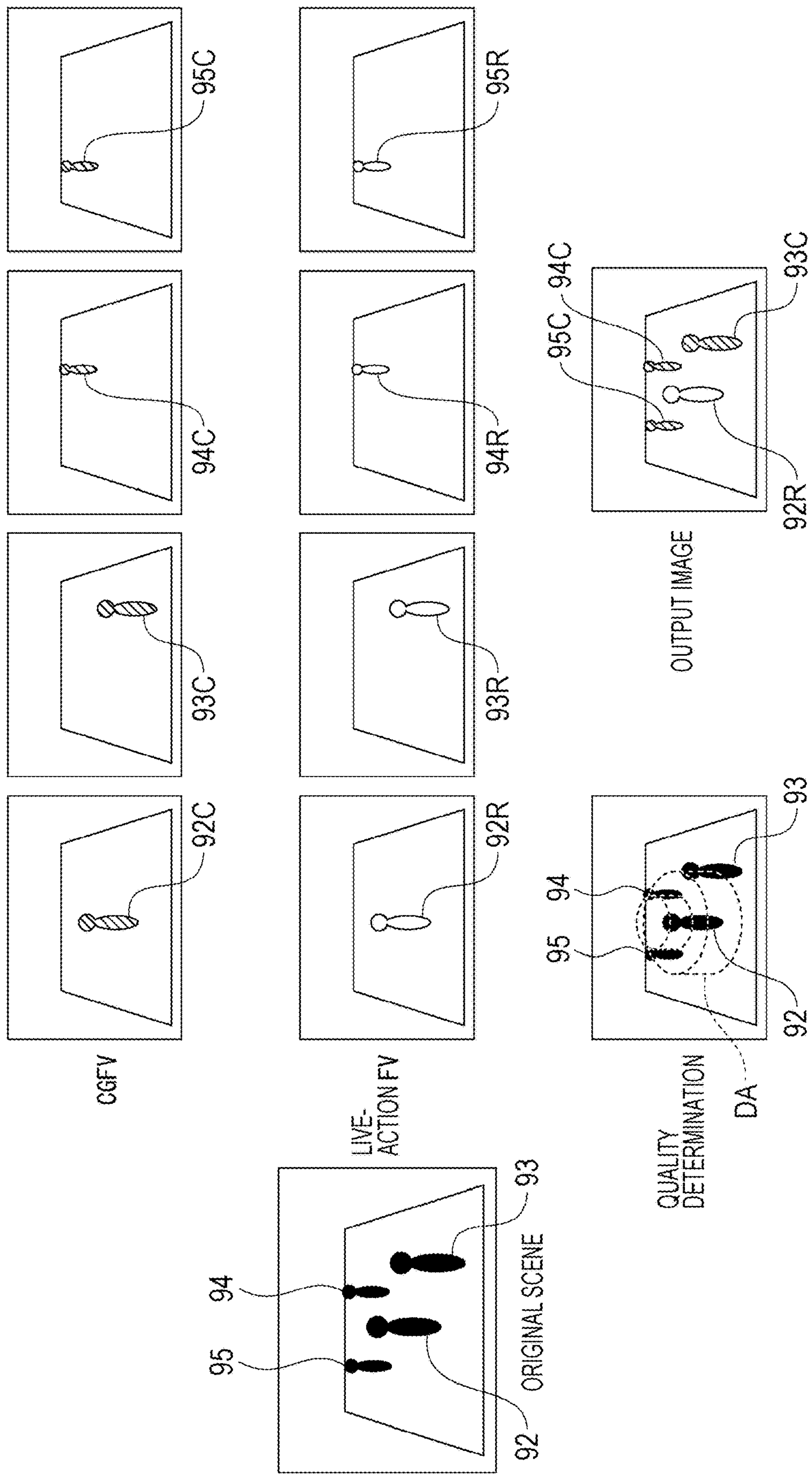
FIG. 33 is an explanatory diagram of an example of composition in a frame according to the embodiment.

FIG. 33 illustrates a captured image of one frame in which players 92, 93, 94, and 95 are captured as original scenes.

Furthermore, player images 92C, 93C, 94C, and 95C obtained by individually rendering players 92, 93, 94, and 95 on the basis of the EPTS data are illustrated as CGFVs, and player images 92R, 93R, 94R, and 95R obtained by individually rendering the players 92, 93, 94, and 95 are illustrated as live-action FVs.

Here, as the quality determination, the designated area DA is indicated in the frame. This is an area where the high-quality live-action FV can be generated, the high-quality live-action FV being calculated from the camera arrangement and the selection arrangement in advance as described above. In the drawing, the designated area DA is three-dimensionally indicated by a broken line.

Then, it is assumed that the player 92 is inside the designated area DA, and the other players 93, 94, and 95 are outside the designated area DA.

In this case, as an output image of the frame, as illustrated in the drawing, a player image 92R by the live-action FV and the player images 93C, 94C, and 95C by the CGFV are combined and generated.

In this way, as the player image in the frame, it is possible to perform composition such that the CGFV is used on the basis of the quality determination while the live-action FV is used as much as possible.

Hereinafter, a specific processing example will be described. Each of the following processing examples is processing of the image processing unit 85 of the information processing device 70 as the 2D render 31 in the sequence of FIG. 29. However, the processing may be considered as processing of the image processing unit 85 of the information processing device 70 as the FV render 12 or the 3D render 27. In FIG. 1, the processing is processing of the image processing unit 85 in the information processing device 70 functioning as the output image generation unit 6.

Figure 34:
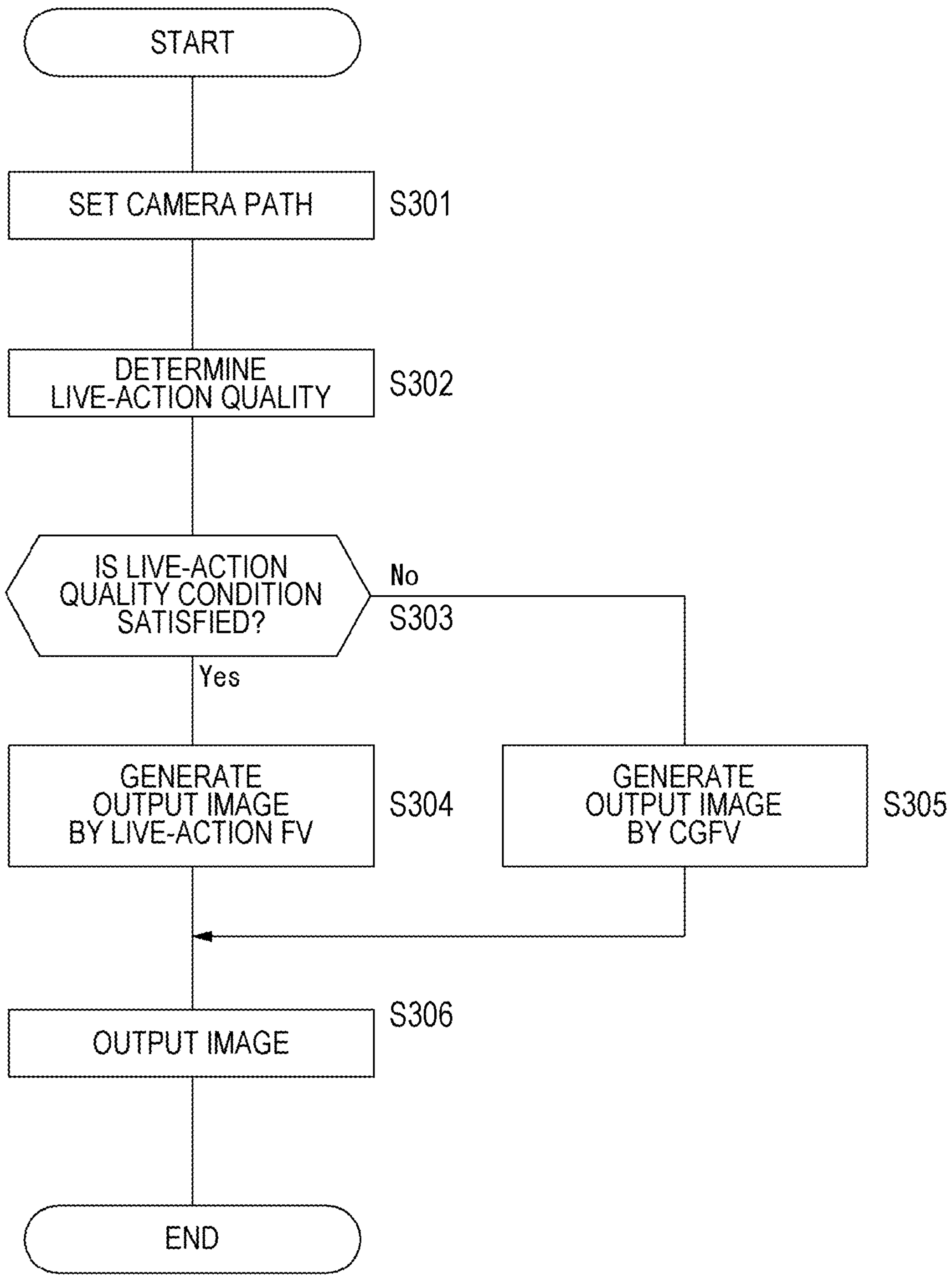
FIG. 34 is a flowchart of an example of image production processing of the embodiment.

FIG. 34 illustrates an example in which one of the live-action FV and the CGFV is selected in a case where the FV clip is output.

In step S301, the image processing unit 85 sets the camera path of the FV clip to be generated this time according to the camera path designation information CPD by the operator's input.

In step S302, the image processing unit 85 performs quality determination processing of the live-action FV. For example, as described above, various types of quality determination factors are determined, such as whether or not the target player 90 of the free viewpoint image by the camera path at this time is present in the designated area DA, whether or not the camera path exceeds the zoom boundary ZB, whether or not the distance between players is within a certain range as player arrangement, and whether or not occlusion is a predetermined number or more.

Then, in a case where it is determined that the live-action FV satisfies the quality condition, the image processing unit 85 proceeds from step S303 to step S304, generates a clip as the live-action FV, and sets the clip as the output image in step S306.

On the other hand, in a case where it is determined that the live-action FV does not satisfy the quality condition, the image processing unit 85 proceeds from step S303 to step S305, generates an FV clip as by the CGFV, and sets the FV clip as the output image in step S306.

With the above processing, the FV clip by the live-action FV or the FV clip by the CGFV is selected according to the quality determination, and is set as the output image.

Figure 35:
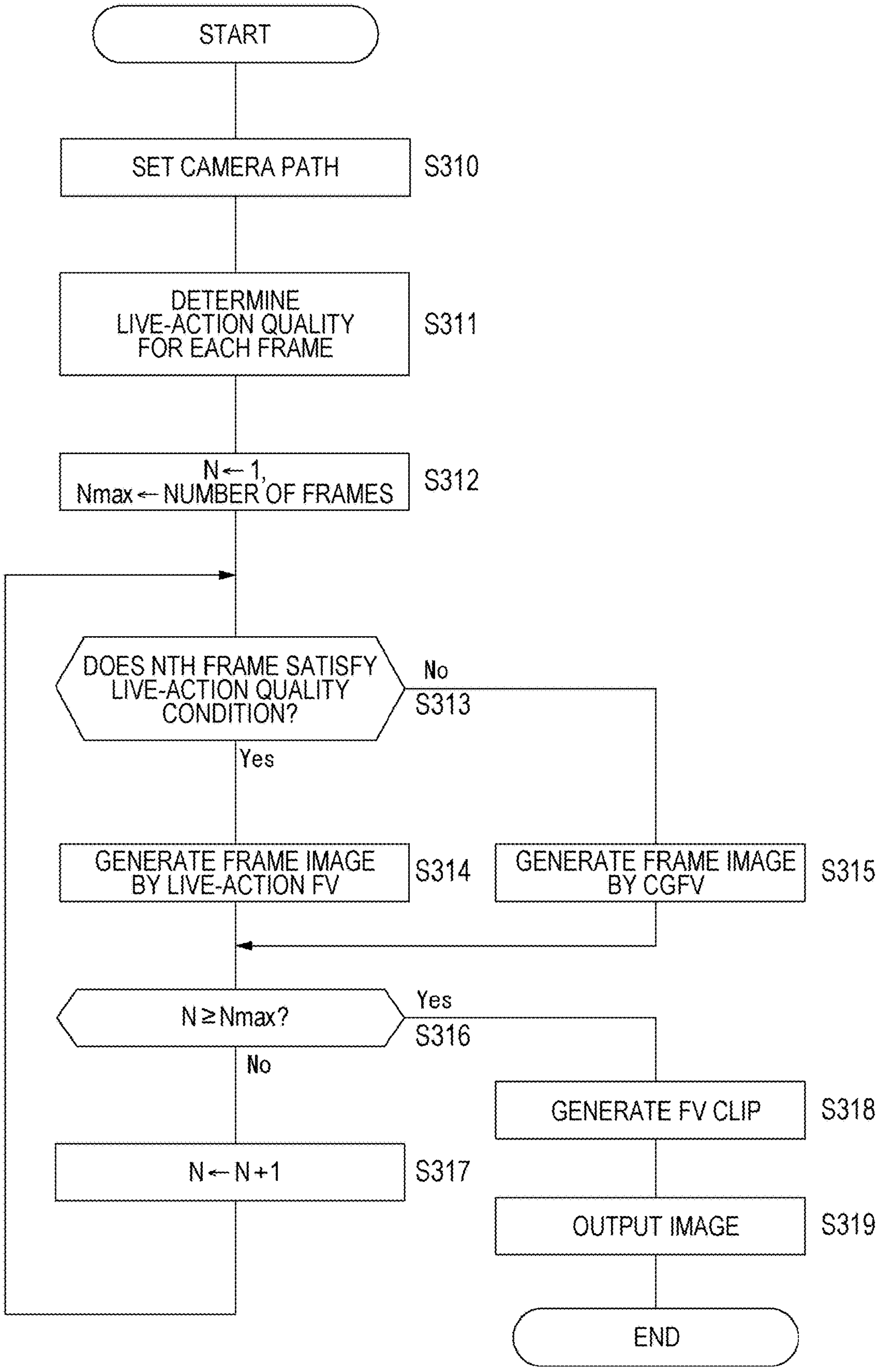
FIG. 35 is a flowchart of an example of image production processing of the embodiment.

FIG. 35 illustrates an example in which one of the live-action FV and the CGFV is selected for each frame in a case where the FV clip is output.

In step S310, the image processing unit 85 sets the camera path of the FV clip to be generated this time according to the camera path designation information CPD by the operator's input.

In step S311, the image processing unit 85 performs quality determination processing of the live-action FV for each frame constituting the camera path. That is, determination factors such as the designated area DA, the zoom boundary ZB, the distance between players, and occlusion are determined for each frame.

In step S312, the image processing unit 85 sets a variable N to "1", and sets a variable Nmax as the total number of frames of the FV clip to be generated.

In step S313, the image processing unit 85 branches the processing with reference to the quality determination result of the Nth frame. In a case where it is determined that the live-action FV in the Nth frame satisfies the quality condition, the image processing unit 85 proceeds to step S314 and generates or selects an image by the live-action FV as the Nth frame of the output image.

Furthermore, in a case where it is determined that the live-action FV in the Nth frame does not satisfy the quality condition, the image processing unit 85 proceeds to step S315 and generates or selects an image by the CGFV as the Nth frame of the output image, as the Nth frame of the output image.

In step S316, the image processing unit 85 confirms whether or not the variable N has reached the variable Nmax. If the variable N has not reached the variable Nmax, the variable N is incremented in step S317, and the process returns to step S313.

Therefore, the live-action FV and the CGFV are selected for each frame according to the quality determination result.

When it is determined in step S316 that the variable N has reached the variable Nmax, the image processing unit 85 proceeds to step S318, generates a clip by the live-action FV and the CGFV selected for each frame, and outputs the clip in step S306.

With the above processing, the live-action FV or CGFV is selected according to the quality determination for each frame, and a clip is generated and, is set as an output image.

Figure 36:
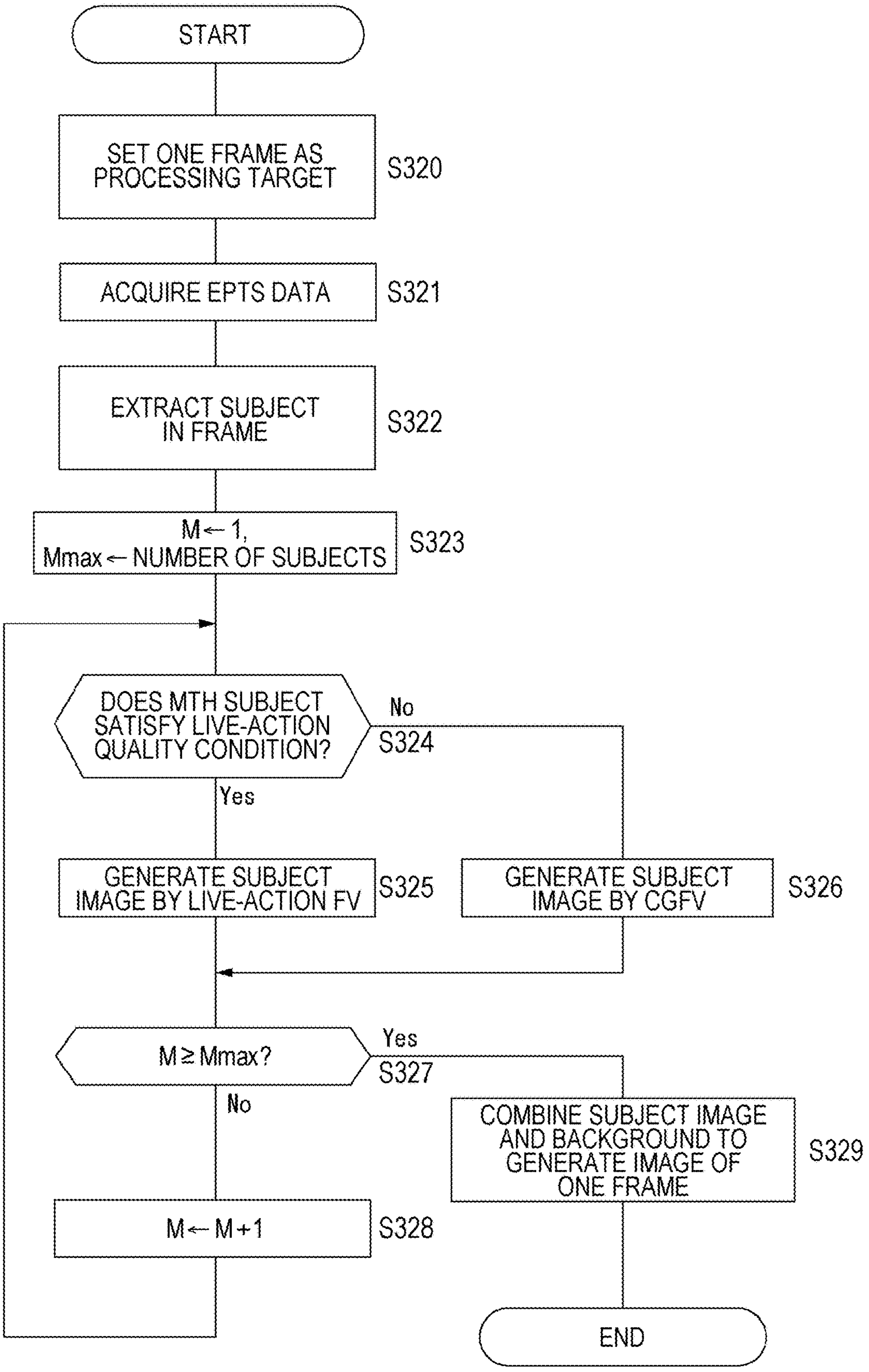
FIG. 36 is a flowchart of an example of image production processing of the embodiment.

FIG. 36 illustrates an example in which composition processing of a subject is performed for each frame of the FV clip to be the output image.

In step S320, the image processing unit 85 sets one frame as a processing target. Since the processing of FIG. 36 is performed sequentially from the start frame to the last frame of the FV clip as the processing target, step S320 is processing of sequentially setting one frame as the processing target of this time.

In step S321, the image processing unit 85 acquires the EPTS data for the frame of the processing target of this time.

In step S322, the image processing unit 85 extracts the subject in the frame. For example, an image of a player or a ball is extracted.

In step S323, the image processing unit 85 sets a variable M to "1", and sets a variable Mmax as the total number of frames of the FV clip to be generated.

In step S324, the image processing unit 85 determines whether or not the live-action FV satisfies the quality condition for the Mth subject. For example, as described with reference to FIG. 33, it is determined whether or not the Mth subject exists in designated area DA. For example, if the Mth subject exists in the designated area DA, the quality condition is satisfied. Furthermore, a quality condition such as no occlusion by another subject with respect to the Mth subject or a quality condition such as a separation distance from another subject may be added.

In a case where it is determined that the live-action FV of the Mth subject satisfies the quality condition, the image processing unit 85 proceeds to step S325 and generates or selects the image of the Mth subject by the live-action FV.

In a case where it is determined that the live-action FV of the Mth subject does not satisfy the quality condition, the image processing unit 85 proceeds to step S326 and generates or selects the image of the Mth subject by the CGFV.

In step S327, the image processing unit 85 confirms whether or not the variable M has reached the variable Mmax. If the variable M has not reached the variable Mmax, the variable M is incremented in step S328, and the process returns to step S324. Therefore, the live-action FV and the CGFV are selected for each subject according to the quality determination result.

When it is determined in step S327 that the variable M has reached the variable Mmax, the image processing unit 85 proceeds to step S329 and combines the selected live-action FV or CGFV for each subject such as a player with a background image to generate an image of one frame.

By performing the above processing of FIG. 36 on each frame of the clip to be output, each frame of the clip becomes an image in which each subject generated by either the live-action FV or the CGFV is combined. Then, an output image is generated by each of such frames.

As described above, FIG. 34 illustrates an example in which the entire FV clip is selected by either the live-action FV or the CGFV, FIG. 35 illustrates an example in which the live-action FV and the CGFV are selected for each frame of the FV clip, and FIG. 36 illustrates an example in which the subject of the live-action FV and the subject of the CGFV are combined in the frame of the FV clip.

These pieces of processing can also be combined.

For example, the processing in FIG. 36 may also be performed in step S304 in FIG. 34 or step S314 in FIG. 35, and the live-action FV and the CGFV may be selected and combined for each subject.

Furthermore, the quality determination processing for the live-action FV is described, but the quality determination processing for the CGFV may be performed.

For example, the EPTS data may be insufficient or inaccurate for some reason. Therefore, it is also conceivable to perform determination on whether or not the EPTS data is sufficient as the quality determination processing of the CGFV, and to select the live-action FV and the CGFV for the entire FV clip, for each frame, or for each subject on the basis of the determination.

7. Summary and Modifications

According to the above-described embodiments, the following effects can be obtained.

The image production system 300 according to the embodiment includes the EPTS data generation unit 22 (estimation information generation unit 4) that generates EPTS data (estimation information) regarding a subject on the basis of at least one of captured image or sensor information. Furthermore, the image production system 300 includes the FV render 12 (free viewpoint image generation unit 3) that generates a live-action player model (first three-dimensional model) that is a three-dimensional model of the subject on the basis of a plurality of pieces of captured image data obtained by simultaneously capturing images from a plurality of viewpoints, and generates a free viewpoint image that is an image of an arbitrary viewpoint for the subject using the live-action player model. Furthermore, the image production system 300 includes the 3D render 27 (three-dimensional image generation unit 5) that can generate a three-dimensional image on the basis of the EPTS data and a CG player model (second three-dimensional model) that is a virtual three-dimensional model of the subject.

The image production system 300 can generate various image contents by switching and fusing the free viewpoint image based on live-action imaging and the three-dimensional image using the virtual three-dimensional model using the EPTS data. For example, in some cases, the FV render 12 can generate an image of a free viewpoint without position restriction from the multi-viewpoint video by the plurality of imaging devices 10 as the free viewpoint image. Furthermore, in some cases, the 3D render 27 can generate an image including a viewpoint that cannot be captured in reality, a subject that does not exist in reality, and the like. By fusing or selecting the images by such an FV render 12 and a 3D render 27 on the basis of on the EPTS data, it is possible to produce new and various image contents.

In the embodiment, the 3D render 27 can generate a 3D image using the live-action player model and the CG player model.

That is, the 3D render 27 can receive the live-action player model and the CG player model as an input, and can generate a 3D image using these models. Therefore, as in the processing example in FIG. 26, for example, when no live-action image of a player exists, a 3D image is generated using the CG player model, and for a player whose live-action player model is generated on the basis of a live-action image, it is possible to generate a 3D image using the live-action player model.

In the embodiment, an example is described in which the 3D render 27 generates a 3D image by selectively using the live-action player model and the CG player model for a specific subject.

For example, as described as a modification in FIG. 26, the 3D render 27 can generate a 3D image using the CG player model until a live-action image of a specific player is obtained, and can switch the image of the player to a 3D image generated using the live-action player model at the time when the live-action player model is generated.

In the embodiment, an example is described in which the 2D render 31 (two-dimensional image generation unit) that generates a 2D image by selectively using a live-action image including the free viewpoint image generated by the FV render 12 and a 3D image generated by the 3D render 27 is included.

The 2D render 31 receives a free viewpoint image or a 3D image as an input, and can generate a 2D image by selectively using these images. As a result, the 3D image and the free viewpoint image obtained by the image production system 300 in which the volumetric system 100 and the EPTS 200 are fused can be 2D displayed. That is, image display using a general display device can be realized.

In the embodiment, as estimation information, EPTS data including position information of a person or an object as a subject in the captured image or a person or an object that can be sensed by the sensor 29 is exemplified.

In 3D render 27, by using the position information in the EPTS data, it is possible to generate an image reflecting the position of the actual subject as a non-live-action image using CG.

Furthermore, in the embodiment, the estimation information is EPTS data including posture information of a person or an object as a subject in the captured image or a person or an object that can be sensed by the sensor 29 is exemplified. In 3D render 27, by using the posture information in the EPTS data, it is possible to generate an image reflecting the posture of a player or the like of the actual subject as a non-live-action image using CG.

Note that the estimation information is not limited to the EPTS data. For example, the estimation information may be information that can be detected from an image by image analysis.

In the embodiment, as in the image G1 in FIG. 15, an example of generating an image obtained by adding an image effect based on EPTS data to a live-action image including the free viewpoint image generated by the FV render 12 is described.

For example, the 2D render 31 can receive a live-action image including the free viewpoint image generated by the FV render 12 from the storage 16 as an input and generate a 2D image to which an image effect is added on the basis of the effect designation information EF (see FIG. 24).

As a result, for example, it is possible to produce image content in which an image by an effect that cannot be actually viewed and a live-action image (particularly, a free viewpoint image) are fused.

In the embodiment, an example of generating an image in a state where the image is viewed from a viewpoint position where the imaging device 10 is not arranged using EPTS data is described.

For example, in the 3D render 27, an image from an angle that cannot be captured in reality, as in the image G3 in FIG. 16, can be generated (see FIG. 25). The FV render 12 can also generate an image from an angle that cannot be captured as in the image G2 in FIG. 16. By using these images, it is possible to output image content including images of various viewpoints regardless of the actual camera arrangement.

In the embodiment, an example of generating an image in which 3D images at a plurality of time points are combined on the basis of EPTS data as in the image G4 of FIG. 17 is described.

Figure 27:
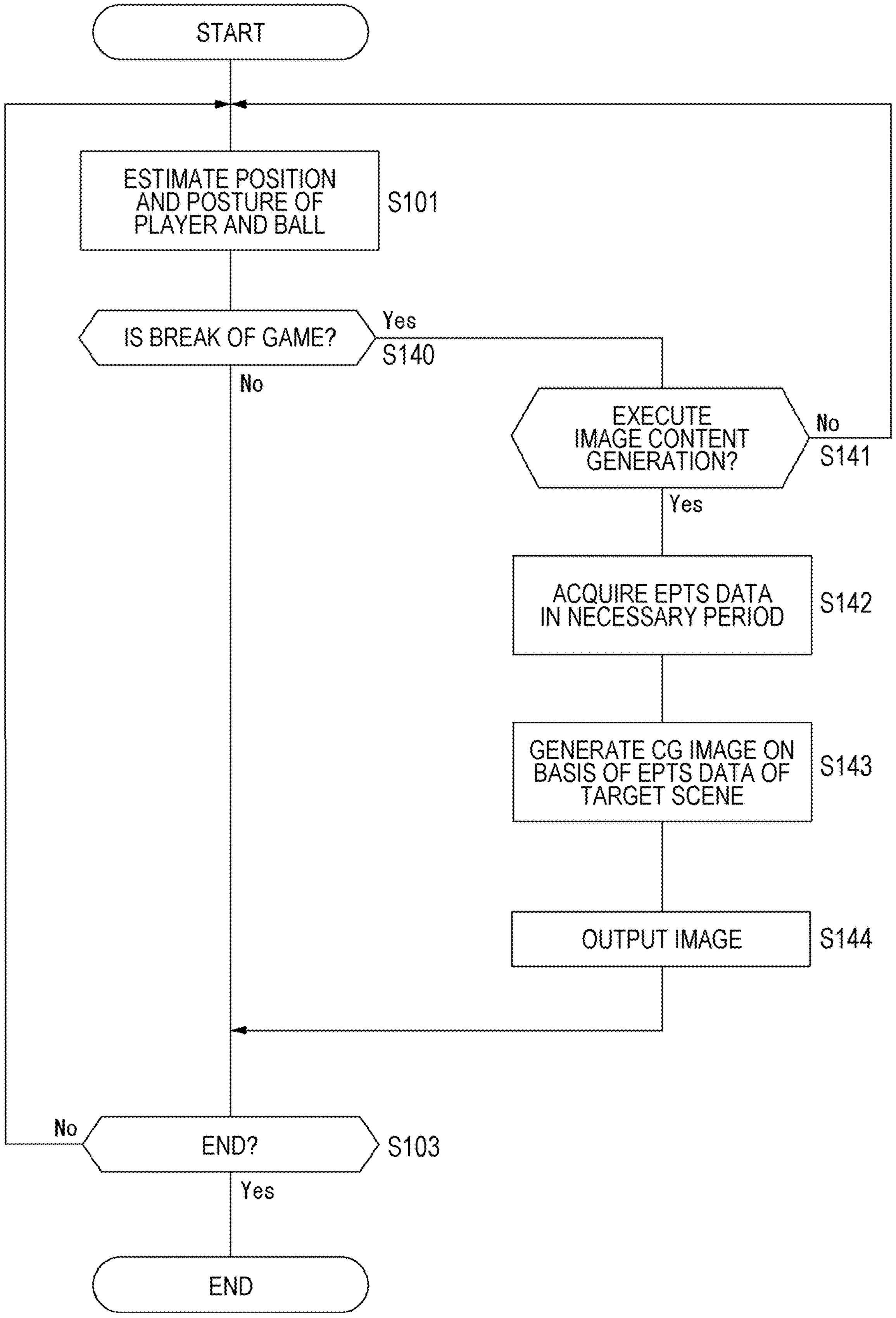
FIG. 27 is a flowchart of an example of image production processing according to the embodiment.

For example, the 3D render 27 can generate an image obtained by combining images such as trajectories of players and balls at a plurality of time points on the basis of, for example, the EPTS data in a period during a game or the like (see FIG. 27). As a result, for example, image content including images in which highlight scenes of a game or the like are collected can be output.

In the embodiment, as in the image G5 in FIG. 18, an example of generating an image that presents a flow line of a subject on the basis of EPTS data within a predetermined period is described.

Figure 28:
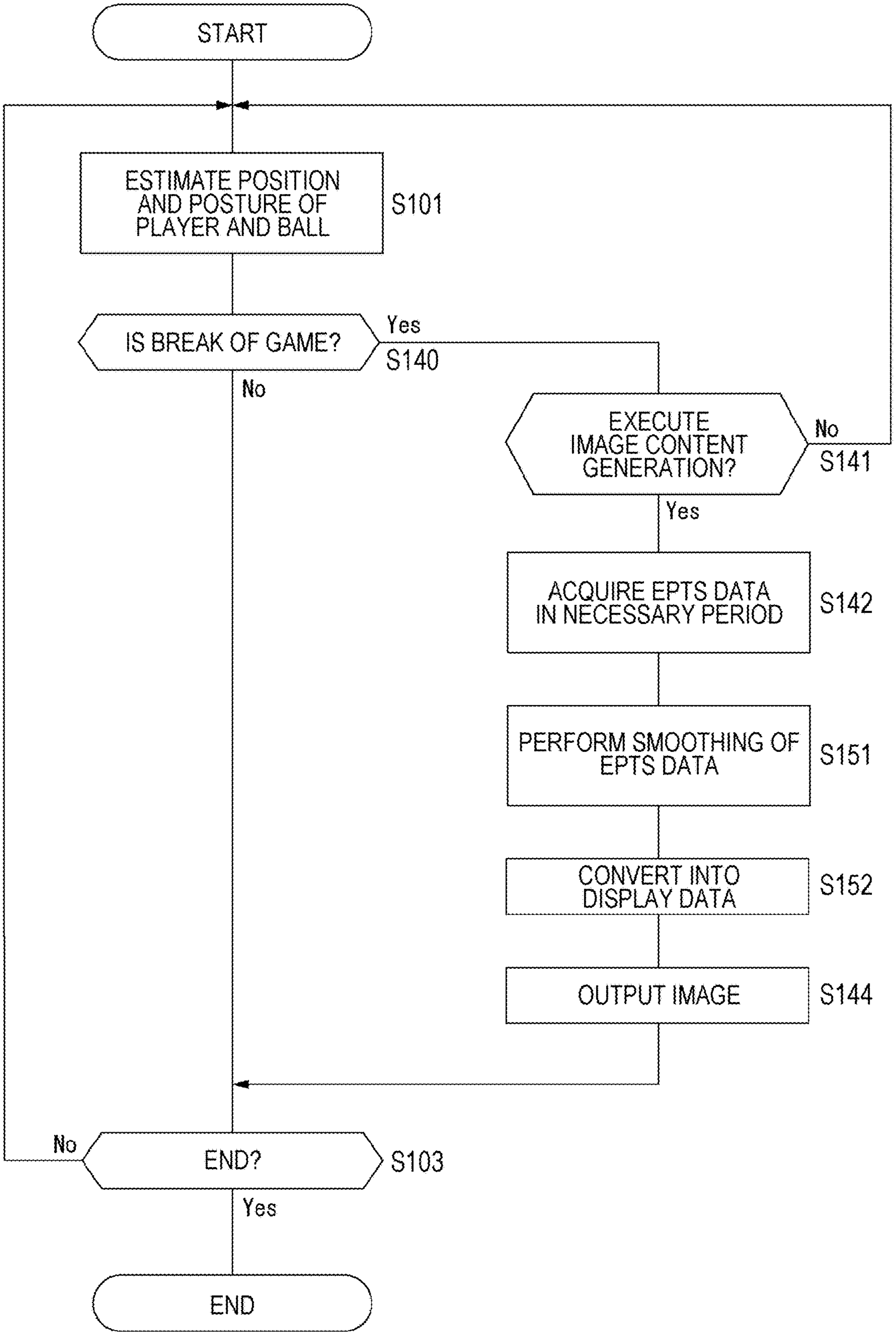
FIG. 28 is a flowchart of an example of image production processing according to the embodiment.

For example, the 3D render 27 can generate an image representing the trajectory of movement of a player or ball on the basis of the EPTS data in a certain period, for example, in a period during a game or the like (see FIG. 28). As a result, for example, it is possible to output image content including an image in which the flow line of the subject can be seen, such as movement of a player or a ball.

In the embodiment, as in the image G6 in FIG. 19 and the image G7 in FIG. 20, an example of generating an image in which an image presenting a flow line of a subject based on EPTS data is combined with a live-action image including the free viewpoint image generated by the FV render 12 is described.

For example, the 2D render 31 can combine a live-action image including the free viewpoint image generated by the FV render 12 and an image indicating the flow line of the subject generated by the 3D render 27 on the basis of the EPTS data (see FIG. 24). As a result, image content including an image indicating a trajectory of a ball or the like such as the image G6 or the image G7 can be output.

In the embodiment, as in the image G8 in FIG. 21, an example of generating an image in which an image presenting a value based on EPTS data is combined with a live-action image including the free viewpoint image generated by the FV render 12 is described.

For example, the 2D render 31 can combine a live-action image including the free viewpoint image generated by the FV render 12 and an image obtained by converting numerical values based on the EPTS data into display data by the 3D render 27, for example, an image indicating characters, numbers, or scales (see FIG. 24). As a result, it is possible to output image content including an image representing the intensity of play or the like by a numerical value or the like.

In the embodiment, as in the image G9 (not illustrated), an example of generating an image in which an image based on EPTS data is combined with a live-action image including the free viewpoint image generated by the FV render 12 or the 3D image generated by the 3D render 27 is described.

For example, the 2D render 31 can combine an additional image further generated by the 3D render 27 on the basis of the EPTS data with a live-action image including the free viewpoint image generated by the FV render 12 or the 3D image generated by the 3D render 27 (see FIG. 24). As a result, it is possible to output image content including an additional image that visualizes and represents play such as the image G9.

In the embodiment, an example is described in which an image is generated by combining a live-action image including the free viewpoint image generated by the FV render 12 and the 3D image generated by the 3D render 27 on the basis of the EPTS data, such as the image G10, for example, the image G10-1 in FIG. 22 and the image G10-2 in FIG. 23.

For example, the 2D render 31 can combine a live-action image including the free viewpoint image generated by the FV render 12 and the 3D image generated by the 3D render 27 on the basis of the EPTS data (see FIG. 24). As a result, it is possible to output image content including an image in which live-action imaging and CG are mixed.

Note that, for example, in addition to the live-action image including the free viewpoint image generated by the FV render 12 and the 3D image generated by the 3D render 27 on the basis of the EPTS data, an additional image (image of character, number, flow line, trajectory, and the like) further generated by the 3D render 27 on the basis of the EPTS data may be combined.

The image production system 301 according to the embodiment includes EPTS data generation unit 22 (estimation information generation unit 4) that generates the EPTS data (estimated information) regarding a subject on the basis of at least one of captured image or sensor information. Furthermore, the image production system 301 includes the FV render 12 (free viewpoint image generation unit 3) that generates a three-dimensional model of the subject on the basis of a plurality of pieces of captured image data obtained by simultaneously capturing images from a plurality of viewpoints, and generates a free viewpoint image that is an image of an arbitrary viewpoint for the subject using the three-dimensional model. Furthermore, the image production system 301 includes the 3D render 27 (three-dimensional image generation unit 5) that can generate a three-dimensional image on the basis of the EPTS data and the three-dimensional model of the subject. The image production system 301 further includes the 2D render 31 (output image generation unit 6) that generates an output image on the basis of the free viewpoint image generated by the FV render 12 and the three-dimensional image generated by the 3D render 27. The FV render 12 and the 3D render 27 can also function as the output image generation unit 6.

In the image production system 301, in a case where the output image is generated on the basis of the free viewpoint image based on live-action imaging and the three-dimensional image using a virtual three-dimensional model, for example, the output image can be generated by switching or fusing the free viewpoint image and the three-dimensional image. For example, as illustrated as the sequence of FIG. 29, by fusing or selecting the images by such an FV render 12 and a 3D render 27 on the basis of on EPTS data, it is possible to produce new and various output images.

In the embodiment, an example is described in which the output image generation unit 6 generates an output image by selectively using a live-action image including the free viewpoint image generated by the FV render 12 and the 3D image generated by the 3D render 27 (see FIGS. 30, 34, 35).

For example, the 2D render 31 functions as the output image generation unit 6 in FIG. 1. Furthermore, the FV render 12 and the 3D render 27 can also function as the output image generation unit 6 in FIG. 1.

Such an output image generation unit 6 generates the output image by selectively using the live-action image (for example, the live-action FV) including the free viewpoint image generated by the FV render 12 and the 3D image (for example, the CGFV) generated by the 3D render 27, so that the image content in which the live-action image and the CG are fused can be output.

An example is described in which the output image generation unit 6 according to the embodiment generates an output image by selectively using a live-action image including the free viewpoint image generated by the FV render 12 and the 3D image generated by the 3D render 27 for each period (see FIGS. 30, 34, 35).

For example, the output image generation unit 6 selects the live-action FV and the CGFV for each frame period and generates an FV clip as an output image. As a result, it is possible to output image content as live-action imaging during a certain period and as CG during a certain period in a moving image.

An example is described in which the output image generation unit 6 according to the embodiment generates an output image by combining a live-action image including the free viewpoint image generated by the FV render 12 and the 3D image generated by the 3D render 27 (see FIGS. 33, 36).

As a result, it is possible to output image content in which live-action imaging (for example, live-action FV) and CG (for example, CGFV) are mixed in a frame in a moving image.

An example is described in which the output image generation unit 6 according to the embodiment generates an output image by combining the subject image by a live-action image including a free viewpoint image generated by the FV render 12 and the subject image by a 3D image generated by the 3D render 27 (see FIGS. 33, 36).

For example, the output image generation unit 6 selects whether to use the image generated by the FV render 12 or the image generated by the 3D render 27 for each subject such as a player, and combines the images in one frame. As a result, it is possible to output image content in which live-action imaging and CG are combined for each frame.

In the embodiment, an example is described in which the output image generation unit 6 generates an output image by selectively using a live-action image including the free viewpoint image generated by the FV render 12 and the 3D image generated by the 3D render 27 on the basis of the camera path of the free viewpoint image (see FIGS. 30, 31A, 31B, 32A, 32B, 34, 35).

According to the camera path, it can be determined which of the live-action image generated by the FV render 12 and the 3D image generated by the 3D render 27 is appropriate. As a result, the image quality of image content selectively using live-action imaging and CG can be improved.

In the embodiment, an example is described in which the output image generation unit 6 performs the quality determination processing of a free viewpoint image, and generates an output image by selectively using a live-action image including the free viewpoint image generated by the FV render 12 and the three-dimensional image generated by the 3D render 27 according to the quality determination result (see FIGS. 30, 31A, 31B, 32A, 32B, 34, 35).

For example, by the quality determination processing, for example, it is possible to determine which of the live-action FV generated by the FV render 12 and the CGFV generated by the 3D render 27 is appropriate. As a result, the image quality of image content selectively using live-action imaging and CG can be improved.

In the quality determination processing according to the embodiment, an example is described in which the quality of the free viewpoint image is determined on the basis of the relationship of the arrangement of the plurality of imaging devices 10 (see FIGS. 31A, 31B, 32A, and 32B).

Since the quality of the free viewpoint image is improved by being imaged by a larger number of imaging devices 10, determining which of the live-action free viewpoint image and the CG image is suitable from the arrangement relationship of the imaging devices 10 is suitable for improving the quality of the output image.

In the quality determination processing according to the embodiment, an example is described in which it is determined whether or not the subject to be the target of the free viewpoint image exists in the designated area DA in the field of view of the predetermined number or more of imaging devices 10 on the basis of the relationship of the arrangement of the plurality of imaging devices 10 (see FIGS. 31A, 31B. 32A, and 32B).

A designated area DA imaged by a larger number of imaging devices 10 is set, and it is determined whether or not the target player 90 is within the designated area DA in the free viewpoint image. This determines whether or not the live-action FV is qualitatively suitable.

In the quality determination processing according to the embodiment, an example of determining a section in which the zoom magnification of the imaging device 10 is a predetermined value or more in the camera path is described (see FIGS. 31A. 31B, 32A, and 32B).

Even when the subject is in the field of view of the imaging device 10, the image quality may be degraded in a case where the zoom magnification is the predetermined value or more. Therefore, a section in which the zoom magnification is the predetermined value or more is determined in the camera path. This determines a frame section in which the live-action free viewpoint image is not qualitatively suitable.

In the quality determination processing according to the embodiment, an example is described in which the arrangement relationship in an image between the target subject for which the free viewpoint image is generated and the other subjects at the viewpoint defined by the camera path is determined.

For example, in a case where a free viewpoint image of a certain player is generated, the quality of the free viewpoint image changes depending on the arrangement state of the player in the image. Therefore, it is preferable to determine which of the live-action free viewpoint image and the CG image is suitable from the arrangement relationship between the target player and the other players in each viewpoint by the camera path at this time.

In the quality determination processing according to the embodiment, an example of determining the degree of congestion of the subject around the target subject for which the free viewpoint image is generated is described.

In a case where the surroundings of the target player for which the free viewpoint image is to be generated are congested, the 3D model generation accuracy of the target player may decrease, and the quality of the free viewpoint image may also be degraded. Therefore, determining the degree of congestion is appropriate for determining which of the live-action free viewpoint image and the CG image is suitable.

Specifically, the degree of congestion is only required to be determined by determining whether or not the distance between the players is a certain value or more, or by determining the amount of occlusion.

The program according to the embodiment is a program for causing, for example, a CPU, a DSP, an AI processor, or the like, or an information processing device including the CPU, the DSP, the AI processor, or the like, to execute the processing illustrated in FIGS. 24 and 28.

The program according to the embodiment is a program for causing an information processing device in an image production system to execute processing of: generating estimation information regarding a subject on the basis of at least one of a captured image or sensor information; generating a first three-dimensional model that is a three-dimensional model of a subject on the basis of a plurality of pieces of captured image data obtained by simultaneously capturing images from a plurality of viewpoints, and generates a free viewpoint image that is an image of an arbitrary viewpoint for the subject using the first three-dimensional model; and generating a three-dimensional image on the basis of the estimation information and a second three-dimensional model that is a virtual three-dimensional model of the subject.

Furthermore, the program according to the embodiment is also a program for causing, for example, a CPU, a DSP, an AI processor, or the like, or an information processing device including the CPU, the DSP, the AI processor, or the like, to execute the processing illustrated in FIGS. 34 and 36.

That is, the program according to the embodiment is a program for causing an information processing device in an image production system to execute processing of: generating estimation information regarding a subject on the basis of at least one of a captured image or sensor information; generating a three-dimensional model of the subject on the basis of a plurality of pieces of captured image data obtained by simultaneously capturing images from a plurality of viewpoints, and generating a free viewpoint image that is an image of an arbitrary viewpoint for the subject using the three-dimensional model; generating a three-dimensional image on the basis of the estimation information and the three-dimensional model of the subject; and generating an output image on the basis of the free viewpoint image and the three-dimensional image.

With such a program, a device constituting the image production system 300 or 301 according to the embodiment can be realized in, for example, a computer device, a mobile terminal device, or other devices capable of executing information processing.

Such a program can be recorded in advance in an HDD as a recording medium built in a device such as a computer device, a ROM in a microcomputer having a CPU, or the like.

Alternatively, the program can be temporarily or permanently stored (recorded) in a removable recording medium such as a flexible disk, a compact disc read-only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as what is called package software.

Furthermore, such a program may be installed from the removable recording medium into a personal computer or the like, or may be downloaded from a download site via a network such as a local area network (LAN) or the Internet.

Furthermore, such a program is suitable for providing the information processing device 70 constituting the image production system 300 or 301 according to the embodiment in a wide range. For example, by downloading the program to a mobile terminal device such as a smartphone or a tablet, an imaging device, a mobile phone, a personal computer, a game device, a video device, a personal digital assistant (PDA), or the like, the smartphone or the like can be caused to function as the information processing device 70 constituting the image production system 300 or 301 of the present disclosure.

Note that, the effects described in the present specification are merely examples and are not limited, and other effects may be provided.

Note that the present technology can also have the following configurations.

(1)

An image production system including:

an estimation information generation unit that generates estimation information regarding a subject on the basis of at least one of a captured image or sensor information;

a free viewpoint image generation unit that generates a three-dimensional model of the subject on the basis of a plurality of pieces of captured image data obtained by simultaneously capturing images from a plurality of viewpoints, and generates a free viewpoint image that is an image of an arbitrary viewpoint for the subject using the three-dimensional model;

a three-dimensional image generation unit capable of generating a three-dimensional image on the basis of the estimation information and the three-dimensional model of the subject; and an output image generation unit that generates an output image on the basis of the free viewpoint image generated by the free viewpoint image generation unit and the three-dimensional image generated by the three-dimensional image generation unit.

(2)

The image production system according to (1), in which the output image generation unit generates an output image by selectively using a live-action image including a free viewpoint image generated by the free viewpoint image generation unit and a three-dimensional image generated by the three-dimensional image generation unit.

(3)

The image production system according to (1) or (2), in which the output image generation unit generates an output image by selectively using a live-action image including a free viewpoint image generated by the free viewpoint image generation unit and a three-dimensional image generated by the three-dimensional image generation unit for each period.

(4)

The image production system according to any one of (1) to (3), in which the output image generation unit generates an output image by combining a live-action image including a free viewpoint image generated by the free viewpoint image generation unit and a three-dimensional image generated by the three-dimensional image generation unit.

(5)

The image production system according to any one of (1) to (4), in which the output image generation unit generates an output image by combining a subject image by a live-action image including a free viewpoint image generated by the free viewpoint image generation unit and a subject image by a three-dimensional image generated by the three-dimensional image generation unit.

(6)

The image production system according to any one of (1) to (3), in which the output image generation unit generates an output image by selectively using a live-action image including a free viewpoint image generated by the free viewpoint image generation unit and a three-dimensional image generated by the three-dimensional image generation unit, on the basis of a camera path of the free viewpoint image.

(7)

The image production system according to any one of (1), (2), (3), and (6), in which the output image generation unit performs quality determination processing of a free viewpoint image, and generates an output image by selectively using a live-action image including a free viewpoint image generated by the free viewpoint image generation unit and a three-dimensional image generated by the three-dimensional image generation unit according to a result of the quality determination.

(8)

The image production system according to (7), in which the quality determination processing determines quality of a free viewpoint image on the basis of an arrangement relationship between a plurality of imaging devices.

(9)

The image production system according to (8), in which the quality determination processing determines whether or not a target subject of a free viewpoint image exists in an area within a field of view of a predetermined number or more of imaging devices on the basis of an arrangement relationship between a plurality of imaging devices.

(10)

The image production system according to (8) or (9), in which the quality determination processing determines a section in which zoom magnification of an imaging device is a predetermined value or more in camera path.

(11)

The image production system according to any one of (7) to (10), in which the quality determination processing determines an arrangement relationship between a target subject for which a free viewpoint image is generated and another subject in an image at viewpoint specified by camera path.

(12)

The image production system according to (11), in which the quality determination processing determines degree of congestion of a subject around a target subject for which a free viewpoint image is generated.

(13)

The image production system according to any one of (1) to (12), in which the free viewpoint image generation unit can generate a first three-dimensional model that is a three-dimensional model of a subject on the basis of a plurality of pieces of captured image data obtained by simultaneously capturing images from a plurality of viewpoints, and generate a free viewpoint image that is an image of an arbitrary viewpoint for the subject using the first three-dimensional model, and the three-dimensional image generation unit can generate a three-dimensional image on the basis of estimation information generated by the estimation information generation unit and a second three-dimensional model that is a virtual three-dimensional model of the subject.

(14)

An image production method including:

generating estimation information regarding a subject on the basis of at least one of a captured image or sensor information;

generating a three-dimensional model of the subject on the basis of a plurality of pieces of captured image data obtained by simultaneously capturing images from a plurality of viewpoints, and generating a free viewpoint image that is an image of an arbitrary viewpoint for the subject using the three-dimensional model;

generating a three-dimensional image on the basis of the estimation information and the three-dimensional model of the subject; and generating an output image on the basis of the free viewpoint image and the three-dimensional image.

(15)

A program for causing an information processing device in an image production system to execute processing of:

generating estimation information regarding a subject on the basis of at least one of a captured image or sensor information;

generating a three-dimensional model of the subject on the basis of a plurality of pieces of captured image data obtained by simultaneously capturing images from a plurality of viewpoints, and generating a free viewpoint image that is an image of an arbitrary viewpoint for the subject using the three-dimensional model;

generating a three-dimensional image on the basis of the estimation information and the three-dimensional model of the subject; and generating an output image on the basis of the free viewpoint image and the three-dimensional image.

REFERENCE SIGNS LIST

3 Free viewpoint image generation unit
4 Estimation information generation unit
5 Three-dimensional image generation unit
6 Output image generation unit
10, 20 Imaging device
11, 21 Recording unit
12 FV render
15, 16, 23, 24, 25, 28, 32 Storage
22 EPTS data generation unit
26 Coordinate system conversion unit
27 3D render
31 2D render
33 2D display unit
34 3D display unit
40 Recording unit
70 Information processing device
71 CPU
85 Image processing unit
100 Volumetric system
200 EPTS
150 Integrated system
300 Image production system
301 Image production system

The invention claimed is:

1. An image production system, comprising:

at least one processor configured to:

generate estimation information for a subject based on at least one of a captured first image or sensor information;

obtain, based on a simultaneous capture of a plurality of second images from a plurality of viewpoints, a plurality of pieces of captured image data;

generate a first three-dimensional model of the subject based on the plurality of pieces of captured image data;

generate a free viewpoint image based on the first three-dimensional model, wherein the free viewpoint image is an image of an arbitrary viewpoint for the subject;

generate a three-dimensional image based on the estimation information and the first three-dimensional model of the subject; and generate an output image by selectively using the three-dimensional image and a live-action image including the free viewpoint image.

2. The image production system according to claim 1, wherein the at least one processor is further configured to generate the output image, for each time period, by selectively using the three-dimensional image and the live-action image including the free viewpoint image.

3. The image production system according to claim 1, wherein the at least one processor is further configured to generate the output image based on a combination of the three-dimensional image and the live-action image including the free viewpoint image.

4. The image production system according to claim 1, wherein the at least one processor is further configured to generate the output image based on a combination of a subject image by the three-dimensional image and a subject image by the live-action image including the free viewpoint image.

5. The image production system according to claim 1, wherein the at least one processor is further configured to:

select, based on a camera path of the free viewpoint image, one of the three-dimensional image or the live-action image including the free viewpoint image; and generate the output image based on the selected one of the three-dimensional image or the live-action image.

6. The image production system according to claim 1, wherein the at least one processor is further configured to:

perform quality determination processing on the free viewpoint image;

select, based on a result of the quality determination processing, one of the three-dimensional image or the live-action image including the free viewpoint image; and generate the output image based on the selected one of the three-dimensional image or the live-action image.

7. The image production system according to claim 6, wherein the at least one processor is further configured to determine a quality of the free viewpoint image based on an arrangement relationship between a plurality of imaging devices.

8. The image production system according to claim 7, wherein the at least one processor is further configured to determine, based on the arrangement relationship between the plurality of imaging devices, whether a target subject of the free viewpoint image exists in an area within a field of view of at least a specific number of imaging devices of the plurality of imaging devices.

9. The image production system according to claim 7, wherein the at least one processor is further configured to determine a section in a camera path in which a zoom magnification of an imaging device of the plurality of imaging devices is at least a specific value.

10. The image production system according to claim 6, wherein the at least one processor is further configured to determine an arrangement relationship between a target subject and specific subjects in an image of the plurality of second images at a viewpoint defined by a camera path, and the free viewpoint image is generated for the target subject.

11. The image production system according to claim 10, wherein the at least one processor is further configured to determine a degree of congestion around the target subject.

12. The image production system according to claim 1, wherein the at least one processor is further configured to generate the three-dimensional image based on the estimation information and a second three-dimensional model, and the second three-dimensional model is a virtual three-dimensional model of the subject.

13. An image production method, comprising:

generating, by at least one processor, estimation information for a subject based on at least one of a captured first image or sensor information;

obtaining, by the at least one processor based on a simultaneous capture of a plurality of second images from a plurality of viewpoints, a plurality of pieces of captured image data;

generating, by the at least one processor, a first three-dimensional model of the subject based on the plurality of pieces of captured image data;

generating, by the at least one processor, a free viewpoint image based on the first three-dimensional model, wherein the free viewpoint image is an image of an arbitrary viewpoint for the subject;

generating, by the at least one processor, a three-dimensional image based on the estimation information and the first three-dimensional model of the subject; and generating, by the at least one processor, an output image by selectively using the three-dimensional image and a live-action image including the free viewpoint image.

14. A non-transitory computer-readable medium having stored thereon, computer executable instructions, which when executed by at least one processor, cause the at least one processor to execute operations, the operations comprising:

generating estimation information for a subject based on at least one of a captured first image or sensor information;

obtaining, based on a simultaneous capture of a plurality of second images from a plurality of viewpoints, a plurality of pieces of captured image data;

generating a first three-dimensional model of the subject based on the plurality of pieces of captured image data;

generating a free viewpoint image based on the first three-dimensional model, wherein the free viewpoint image is an image of an arbitrary viewpoint for the subject;

generating a three-dimensional image based on the estimation information and the first three-dimensional model of the subject; and generating an output image by selectively using the three-dimensional image and a live-action image including the free viewpoint image.

15. An image production system, comprising:

at least one processor configured to:

generate estimation information regarding a subject based on at least one of a captured first image or sensor information;

obtain, based on a simultaneous capture of a plurality of second images from a plurality of viewpoints, a plurality of pieces of captured image data;

generate a three-dimensional model of the subject based on the plurality of pieces of captured image data;

generate a free viewpoint image based on the three-dimensional model, wherein the free viewpoint image is an image of an arbitrary viewpoint of the subject;

generate a three-dimensional image based on the estimation information and the three-dimensional model of the subject; and generate an output image, for each time period, by selectively using the three-dimensional image and a live-action image including the free viewpoint image.

* * * * *